United States Patent
Tehrani et al.

(10) Patent No.: US 6,961,545 B2
(45) Date of Patent: Nov. 1, 2005

(54) METHOD AND SYSTEM FOR PROVIDING ANTENNA DIVERSITY

(75) Inventors: Ardavan Maleki Tehrani, Mountain View, CA (US); William McFarland, Los Altos, CA (US)

(73) Assignee: Atheros Communications, Inc., Sunnyvale, CA (US)

(*) Notice: Subject to any disclaimer, the term of this patent is extended or adjusted under 35 U.S.C. 154(b) by 813 days.

(21) Appl. No.: 09/832,029

(22) Filed: Apr. 9, 2001

(65) Prior Publication Data

US 2002/0164963 A1 Nov. 7, 2002

(51) Int. Cl.$^7$ .............................. H04B 1/02; H04B 7/02
(52) U.S. Cl. ................. 455/101; 455/67.13; 455/575.7; 455/277.2; 455/278.1
(58) Field of Search ................... 455/25, 67.11–67.16, 455/101, 129, 575.7, 114.2, 269–279.1, 286–294, 115.2–115.4, 13.3, 562.1, 287.1

(56) References Cited

U.S. PATENT DOCUMENTS

| | | | |
|---|---|---|---|
| 3,670,275 A | 6/1972 | Kalliomaki et al. | 325/370 |
| 3,693,088 A | 9/1972 | Rustako et al. | 325/56 |
| 3,922,685 A | 11/1975 | Opas | 343/854 |
| 4,317,218 A | 2/1982 | Perry | 455/54 |
| 4,337,376 A | 6/1982 | Gruenberg | 179/2 |
| 4,404,563 A | 9/1983 | Richardson | 343/100 SA |
| 4,506,385 A | 3/1985 | Fedde et al. | 455/226 |
| 4,513,412 A | 4/1985 | Cox | 370/29 |
| 4,599,734 A | 7/1986 | Yamamoto | 375/40 |
| 4,639,914 A | 1/1987 | Winters | 370/110.1 |
| 4,704,473 A | 11/1987 | Nakamura et al. | 455/33 |
| 4,710,944 A | 12/1987 | Nossen | 375/40 |
| 4,797,947 A | 1/1989 | Labedz | 455/33 |
| 4,797,948 A | 1/1989 | Milliorn et al. | 455/54 |
| 4,850,036 A | 7/1989 | Smith | 455/179 |
| 4,887,265 A | 12/1989 | Felix | 370/94.1 |
| 4,932,049 A | 6/1990 | Lee | 379/60 |
| 4,953,197 A | 8/1990 | Kaewell, Jr. et al. | 379/58 |
| 4,985,707 A | 1/1991 | Schmidt et al. | 342/370 |
| 5,101,501 A | 3/1992 | Gilhousen et al. | 455/33 |
| 5,274,629 A | 12/1993 | Helard et al. | 370/50 |
| 5,276,730 A | 1/1994 | Cimini, Jr. et al. | 379/60 |
| 5,276,920 A | 1/1994 | Kuisma | 455/101 |
| 5,307,376 A | 4/1994 | Castelain et al. | 375/38 |
| 5,481,570 A | 1/1996 | Winters | 375/347 |
| 5,515,378 A | 5/1996 | Roy, III et al. | 370/95.1 |

(Continued)

FOREIGN PATENT DOCUMENTS

| | | |
|---|---|---|
| EP | 0 622 911 | 11/1994 |
| EP | 0 624 007 | 11/1994 |

(Continued)

OTHER PUBLICATIONS

U.S. Appl. No. 09/778,254, filed Feb. 07, 2001, Cimini, Jr. et al.

OFDM Communication System and Method having a reduced peak–to–average power ratio; inventor: Cimini, Leonard Joseph, Jr, et al.; Nov. 1, 2001; US class 370/210.

*Primary Examiner*—Charles Craver
(74) *Attorney, Agent, or Firm*—Pillsbury Winthrop Shaw Pittman LLP

(57) ABSTRACT

An antenna switch diversity algorithm, and systems and methods to provide antenna diversity by implementing the algorithm in, for example, an IEEE 802.11a compliant environment, are presented. In accordance with the algorithm, one antenna of at least two antennas is designated as a default antenna at a communications device that sends and receives transmit and receive packets. The default antenna designation is changed depending on long-term and short-term learning processes implemented in, for example, software and hardware. The long-term and short-term learning processes analyze packet transmission and reception results of the antennas. The antenna switch diversity algorithm is applicable to multiple antennas.

33 Claims, 10 Drawing Sheets

U.S. PATENT DOCUMENTS

| | | | |
|---|---|---|---|
| 5,528,581 A | 6/1996 | De Bot | 370/19 |
| 5,533,011 A | 7/1996 | Dean et al. | 370/18 |
| 5,542,107 A | 7/1996 | Kay | 455/33.1 |
| 5,543,806 A | 8/1996 | Wilkinson | 342/268 |
| 5,546,090 A | 8/1996 | Roy, III et al. | 342/174 |
| 5,566,355 A | 10/1996 | Kanai | 445/25 |
| 5,577,265 A | 11/1996 | Wheatley, III | 455/33.3 |
| 5,585,003 A | 12/1996 | Van Newenhizen | 210/646 |
| 5,585,803 A | 12/1996 | Miura et al. | 342/372 |
| 5,592,490 A | 1/1997 | Barratt et al. | 370/310 |
| 5,625,880 A | 4/1997 | Goldburg et al. | 455/38.1 |
| 5,627,799 A | 5/1997 | Hoshuyama | 367/121 |
| 5,634,199 A | 5/1997 | Gerlach et al. | 455/63 |
| 5,642,353 A | 6/1997 | Roy, III et al. | 370/329 |
| 5,666,123 A | 9/1997 | Chrystie | 342/373 |
| 5,675,285 A | 10/1997 | Winters | 330/124 |
| 5,719,583 A | 2/1998 | Kanai | 342/378 |
| 5,724,666 A | 3/1998 | Dent | 455/562 |
| 5,732,113 A | 3/1998 | Schmidl et al. | 375/355 |
| 5,742,583 A | 4/1998 | Scott | 370/18 |
| 5,745,858 A | 4/1998 | Sato et al. | 455/562 |
| 5,757,866 A | 5/1998 | Kannari et al. | 375/347 |
| 5,784,031 A | 7/1998 | Weiss et al. | 342/373 |
| 5,812,935 A | 9/1998 | Kay | 455/56.1 |
| 5,819,168 A | 10/1998 | Golden et al. | 455/303 |
| 5,828,658 A | 10/1998 | Ottersten et al. | 370/310 |
| 5,832,044 A | 11/1998 | Sousa et al. | 375/347 |
| 5,848,063 A | 12/1998 | Weaver, Jr. et al. | 370/331 |
| 5,861,843 A | 1/1999 | Sorace et al. | 342/372 |
| 5,862,156 A | 1/1999 | Huszar et al. | 371/43.7 |
| 5,862,457 A | 1/1999 | Winters | 455/103 |
| 5,867,478 A | 2/1999 | Baum et al. | 370/203 |
| 5,878,093 A | 3/1999 | Molnar et al. | 375/347 |
| 5,886,988 A | 3/1999 | Yun et al. | 370/329 |
| 5,887,037 A | 3/1999 | Golden et al. | 375/347 |
| 5,898,741 A | 4/1999 | Nagashima | 375/347 |
| 5,898,791 A | 4/1999 | Garcia | 382/103 |
| 5,909,470 A | 6/1999 | Barratt et al. | 375/324 |
| 5,909,471 A | 6/1999 | Yun | 375/343 |
| 5,914,933 A | 6/1999 | Cimini et al. | 370/208 |
| 5,930,243 A | 7/1999 | Parish et al. | 370/334 |
| 5,930,267 A | 7/1999 | Daneshrad et al. | 370/509 |
| 5,943,372 A | 8/1999 | Gans et al. | 375/347 |
| 5,952,963 A | 9/1999 | Shen et al. | 342/367 |
| 5,956,318 A | 9/1999 | Saeki | 370/206 |
| 5,960,039 A | 9/1999 | Martin et al. | 375/267 |
| 5,963,874 A | 10/1999 | Mahler | 455/562 |
| 5,966,095 A | 10/1999 | Hiramatsu et al. | 342/383 |
| RE36,430 E | 12/1999 | Halbert-Lassalle et al. | 370/204 |
| 6,005,876 A | 12/1999 | Cimini, Jr. et al. | 370/525 |
| 6,006,075 A | 12/1999 | Smith et al. | 455/101 |
| 6,006,110 A | 12/1999 | Raleigh | 455/561 |
| 6,009,073 A | 12/1999 | Kaneko | 370/203 |
| 6,014,413 A | 1/2000 | Golden et al. | 375/347 |
| 6,014,570 A | 1/2000 | Wong et al. | 455/500 |
| 6,021,317 A | 2/2000 | Irvin | 455/78 |
| 6,023,703 A | 2/2000 | Hill | 707/100 |
| 6,026,150 A | 2/2000 | Frank et al. | 379/90.01 |
| 6,029,057 A | 2/2000 | Paatelma et al. | 455/277.2 |
| 6,037,898 A | 3/2000 | Parish et al. | 342/174 |
| 6,038,272 A | 3/2000 | Golden et al. | 375/347 |
| 6,040,803 A | 3/2000 | Spall | 343/700 MS |
| 6,043,790 A | 3/2000 | Derneryd et al. | 343/853 |
| 6,044,120 A | 3/2000 | Bar-David et al. | 375/347 |
| 6,047,189 A | 4/2000 | Yun et al. | 455/452 |
| 6,049,705 A | 4/2000 | Xue | 455/277.1 |
| 6,052,599 A | 4/2000 | Driessen | 455/500 |
| 6,058,105 A | 5/2000 | Hochwald et al. | 370/310 |
| 6,061,553 A | 5/2000 | Matsuoka et al. | 455/273 |
| 6,067,449 A | 5/2000 | Jager | 455/277.2 |
| 6,075,808 A | 6/2000 | Tsujimoto | 375/143 |
| 6,088,408 A | 7/2000 | Calderbank et al. | 375/347 |
| 6,091,365 A | 7/2000 | Derneryd et al. | 343/700 MS |
| 6,091,788 A | 7/2000 | Keskitalo et al. | 375/347 |
| 6,094,165 A | 7/2000 | Smith | 342/373 |
| 6,097,771 A | 8/2000 | Foschini | 375/346 |
| 6,101,168 A | 8/2000 | Chen et al. | 370/228 |
| 6,101,399 A | 8/2000 | Raleigh et al. | 455/561 |
| 6,107,963 A | 8/2000 | Ohmi et al. | 342/383 |
| 6,108,323 A | 8/2000 | Gray | 370/335 |
| 6,108,565 A | 8/2000 | Scherzer | 455/562 |
| 6,115,427 A | 9/2000 | Calderbank et al. | 375/267 |
| 6,119,004 A | 9/2000 | Yamada et al. | 455/436 |
| 6,122,260 A | 9/2000 | Liu et al. | 370/280 |
| 6,125,149 A | 9/2000 | Jafarkhani et al. | 375/262 |
| 6,127,971 A | 10/2000 | Calderbank et al. | 342/368 |
| 6,128,276 A | 10/2000 | Agee | 370/208 |
| 6,128,355 A | 10/2000 | Blackman et al. | 375/347 |
| 6,131,016 A | 10/2000 | Greenstein et al. | 455/69 |
| 6,141,542 A | 10/2000 | Kotzin et al. | 455/101 |
| 6,141,567 A | 10/2000 | Youssefmir et al. | 455/562 |
| 6,144,339 A | 11/2000 | Matsumoto et al. | 342/361 |
| 6,144,711 A | 11/2000 | Raleigh et al. | 375/347 |
| 6,147,985 A | 11/2000 | Bar-David et al. | 370/347 |
| 6,151,295 A | 11/2000 | Ma et al. | 370/203 |
| 6,151,310 A | 11/2000 | Dent | 370/330 |
| 6,154,661 A | 11/2000 | Goldburg | 455/562 |
| 6,158,041 A | 12/2000 | Raleigh et al. | 714/792 |
| 6,167,039 A | 12/2000 | Karlsson et al. | 370/342 |
| 6,167,243 A | 12/2000 | Wang et al. | 455/137 |
| 6,177,906 B1 | 1/2001 | Petrus | 342/378 |
| 6,178,196 B1 | 1/2001 | Naguib et al. | 375/148 |
| 6,185,258 B1 | 2/2001 | Alamouti et al. | 375/260 |
| 6,185,440 B1 | 2/2001 | Barratt et al. | 455/562 |
| 6,188,718 B1 | 2/2001 | Gitlin et al. | 375/148 |
| 6,188,736 B1 | 2/2001 | Lo et al. | 375/347 |
| 6,192,026 B1 | 2/2001 | Pollack et al. | 370/203 |
| 6,198,775 B1 | 3/2001 | Khayrallah et al. | 375/265 |
| 6,205,127 B1 | 3/2001 | Ramesh | 370/329 |
| 6,205,166 B1 | 3/2001 | Maruta et al. | 375/130 |
| 6,208,294 B1 | 3/2001 | Kobayakawa et al. | 342/373 |
| 6,208,669 B1 | 3/2001 | Cimini, Jr. et al. | 370/525 |
| 6,212,242 B1 | 4/2001 | Smith et al. | 375/299 |
| 6,212,387 B1 | 4/2001 | McLaughlin et al. | 455/450 |
| 6,212,406 B1 | 4/2001 | Keskitalo et al. | 455/562 |
| 6,215,814 B1 | 4/2001 | Ylitalo et al. | 375/148 |
| 6,215,983 B1 | 4/2001 | Dogan et al. | 455/63 |
| 6,226,507 B1 | 5/2001 | Ramesh et al. | 455/277.1 |
| 6,226,508 B1 | 5/2001 | Takahashi et al. | 455/277.1 |
| 6,240,301 B1 | 5/2001 | Phillips | 455/550 |
| 6,256,290 B1 | 7/2001 | Ramesh | 370/204 |
| 6,256,301 B1 | 7/2001 | Tiedemann et al. | 370/342 |
| 6,266,528 B1 | 7/2001 | Farzaneh | 455/423 |
| 6,275,482 B1 | 8/2001 | Jevremovic et al. | 370/334 |
| 6,275,543 B1 | 8/2001 | Petrus et al. | 375/324 |
| 6,278,752 B1 | 8/2001 | Golden et al. | 375/347 |
| 6,281,840 B1 | 8/2001 | Miyoshi et al. | 342/374 |
| 6,282,167 B1 | 8/2001 | Michon et al. | 370/203 |
| 6,282,168 B1 | 8/2001 | Vijayan et al. | 370/203 |
| 6,282,434 B1 | 8/2001 | Johannisson et al. | 455/562 |
| 6,288,674 B1 | 9/2001 | Sengupta et al. | 342/418 |
| 6,289,062 B1 | 9/2001 | Wang et al. | 375/346 |
| 6,298,035 B1 | 10/2001 | Heiskala | 370/206 |
| 6,298,092 B1 | 10/2001 | Heath, Jr. et al. | 375/267 |
| 6,301,238 B1 | 10/2001 | Hagerman et al. | 370/336 |
| 6,304,611 B1 | 10/2001 | Miyashita et al. | 375/260 |
| 6,317,411 B1 | 11/2001 | Whinnett et al. | 370/204 |
| 6,317,420 B1 | 11/2001 | Schiff | 370/325 |
| 6,320,898 B1 | 11/2001 | Newson et al. | 375/144 |
| 6,324,403 B1 | 11/2001 | Jalloul | 455/453 |
| 6,505,037 B1 * | 1/2003 | Kandala | 455/277.2 |

FOREIGN PATENT DOCUMENTS

| | | | | |
|---|---|---|---|---|
| EP | 0 735 701 | 10/1996 | | |
| EP | 0 740 430 | 10/1996 | | |
| EP | 0 838 928 A2 | 10/1997 | | |
| GB | 2196211 | 4/1988 | ............ | H04B/7/06 |
| GB | 2 223 129 A | 9/1988 | | |
| JP | 62135024 | 6/1987 | ............ | H04B/7/08 |
| JP | 63046823 | 2/1988 | ............ | H04B/7/06 |
| JP | 63061518 | 3/1988 | ............ | H04B/7/06 |
| JP | 401251904 A | 3/1988 | | |
| JP | 401251904 | 10/1989 | ............ | H01Q/3/26 |
| JP | 402007731 | 1/1990 | ............ | H04B/7/26 |
| JP | 02039735 | 2/1990 | ............ | H04B/7/26 |
| JP | 404000804 A | 4/1990 | | |
| JP | 02200018 | 8/1990 | ............ | H04B/7/06 |
| JP | 405041607 A | 8/1991 | | |
| JP | 404000804 | 1/1992 | ............ | H01Q/3/26 |
| JP | 405041607 | 2/1993 | ............ | H01Q/3/26 |
| JP | 407074685 A | 9/1993 | | |
| JP | 407074685 | 3/1995 | ............ | H04B/7/02 |
| JP | 408274530 A | 3/1995 | | |
| JP | 408274530 | 10/1996 | ............ | H01Q/3/26 |
| JP | 411275047 A | 3/1998 | | |
| JP | 02000224097 A | 2/1999 | | |
| JP | 11275047 | 10/1999 | ............ | H04J/11/00 |
| JP | 3098025 | 10/2000 | ............ | H04B/7/06 |
| WO | WO 95/34967 | 12/1995 | | |
| WO | WO 99/56407 | 11/1999 | | |

\* cited by examiner

METHOD AND SYSTEM FOR PROVIDING ANTENNA DIVERSITY

FIELD OF THE INVENTION

The present invention is directed to wireless voice and data communications, and more particularly to systems and methods for providing antenna diversity in wireless transmission and communication systems.

BACKGROUND

An antenna is a device that transmits electrical signals into free space. The signals may be, for example, received by another antenna located at a proximate or a distant location. The antennas may be mounted within, for example, a transmission device in a wireless communication network. Some examples of transmission devices include wireless base station or access point devices, and mobile station devices.

The Institute of Electrical and Electronic Engineers (IEEE) has established a wireless local area network (LAN) standard, 802.11. The IEEE 802.11 standard (IEEE 802.11) outlines Media Access Control (MAC) and Physical Layer (PHY) specifications for wireless LANs. The specification of the IEEE 802.11 addresses transmission of data in wireless LANs. In particular, the IEEE 802.11a standard addresses communication in wireless asynchronous transfer mode (ATM) systems, covering frequencies of operation between 5 gigahertz (GHz, or $10^9$ Hz) and 6 GHz. As is known in the art, IEEE 802.11a requires a modulation method called orthogonal frequency-division multiplexing (OFDM), which allows communication to occur at extremely high data speeds by transmitting data over multiple frequency channels over a wide frequency range.

The IEEE 802.11a specification takes into account successful and unsuccessful transmission of packets, for example data packets, and includes mechanisms designed to thwart problems with packet transmission, such as requiring in-order transmission of packets, and retransmission by a transmitting entity of packets that were not received properly by a receiving entity. As with the Internet protocol (IP) and the Ethernet protocol, no error correction codes are permitted in IEEE 802.11a. Since a packet that is sent by a source and that is received in error at, or missed by, a destination must be retransmitted by the source in order to obtain the correct packet at the destination receiver, retransmission of packets is a central aspect of IEEE 802.11a access points and mobile stations.

It is not unusual for an antenna to receive a signal across a fading channel. Multiple antennas are typically used in communication systems to provide another option to turn to, in the event of poor signal reception due to a fading channel, so that a good channel with no fading can be found. Some examples of causes of a fading channel include phase shift in the signal and multipath interference errors. The RF energy that is transmitted between antennas can experience destructive and constructive interference due to multiple paths taken by the energy with multiple delays on the way to a receive antenna. The interference can cause a receive antenna to receive a packet in error or to miss a packet entirely.

Ideally, antenna diversity techniques are used when a particular channel is fading due to multipath effects so that changing from one antenna to another antenna provides another communication channel that in all probability is not fading.

Traditionally, fast antenna diversity techniques have been used to manage multiple antennas. As an example of this approach with two antennas, when a packet arrives, a first antenna is used to receive the signal. After receiving for a sufficient period of time to judge reception quality, the radio is switched to a second antenna. The second antenna is then used to receive the signal until the quality of reception can be judged. Finally, the radio is switched to using whichever of the antennas had the best reception. In some cases, more than two antennas are used.

Trying and testing multiple antennas using fast antenna diversity typically takes place during a preamble, header, or training portion of the packet. The preamble is examined rather than the data so that no data are lost while the different antennas are being tested.

There are several reasons why this approach is undesirable for the IEEE 802.11a standard, and for any other high data rate radio system. First, the packet preamble in IEEE 802.11a is quite short, for example, eight microseconds total duration. A short preamble is desirable in any high data rate communications system in order to keep the efficiency of the communications system high. As data rates get higher, the duration of standard Ethernet length packets get shorter. If the preamble is a long period in time, then the efficiency is low. While having a short preamble is good for efficiency, the short preamble reduces the time available to test using both, or all, of the antennas. Switching between antennas takes a certain time based on the physical constraints of driving electrical switches. In addition, there is a minimum time needed to measure the signal from a given antenna to effectively determine the quality of the signal. When the measurement time (i.e., the duration of the preamble) is very short, a very poor estimate of the quality may be obtained.

Time that is consumed switching and measuring the signals from different antennas reduces the amount of time available to perform other functions that commonly need to be performed during the packet preamble. These functions may include, for example, correctly setting the gains of amplifiers in the receive chain, extracting the frequency offset of the incoming signal, and finding the proper symbol boundaries. When the preamble is short, the quality of the frequency offset, gain setting, or symbol timing may be compromised if time is spent selecting the best antenna. For these reasons, in practice, the IEEE 802.11a preamble is too short to allow testing of multiple antennas. If one were to try to force antenna selection into the time of the preamble, one would actually degrade the overall performance of the communications system and would typically make poor choices of which antenna to use.

Fast antenna diversity switching during the packet preamble creates an additional challenge that is unique to the IEEE 802.11a OFDM system. Since the OFDM signal is a wideband signal, the differences in performance between two omni-directional antennas will not be the total receive power. More likely, the differences between two antennas will be the narrow notching of certain narrow frequency ranges due to multipath interference.

However, the IEEE 802.11a preamble consists of a relatively few, widely spaced narrow frequencies. Therefore, when considered as a test signal, the IEEE 802.11a preamble cannot be used to sense many of the narrow notches within the narrow frequency bands that might occur due to multipath interference. Testing during the IEEE 802.11a preamble would thus be detrimental to the reception of the normal data portion of the packet, which will span all of the frequency ranges. In IEEE 802.11a systems, it is problematic to apply known approaches, such as sensing the channel using a packet preamble, to make the correct choice between two antennas.

Typically, antenna diversity techniques assume that the decision process has access to signals from two or more antennas. Many of these techniques are based on examining an average of a combination of signals from two or more antennas. One averaging method is ark maximum ratio combining where signals coming from two or more antennas are assigned different weights and are added together to form a weighted combination signal.

In contrast to IEEE 802.11a systems, most wireless systems are narrowband signal systems. Narrowband signals are generally thought of in terms of having signal bandwidths of hundreds of kilohertz (kHz, or $10^3$ Hz), for example, 500 kHz or 1 megahertz (MHz, or $10^6$ Hz), or less, depending on the transmitting and receiving channel response. Wideband and broadband signals are generally thought of in terms of having signal bandwidths above 1 MHz depending on the transmitting and receiving channel response. In IEEE 802.11a systems, the signals have operating frequencies in the neighborhood of between 5 and 6 GHz, so these signals are clearly wideband signals by any definition.

In narrowband systems, because the bandwidths are limited to hundreds of kHz or less, two or more receive signals from two or more respective antennas generally do not show significant variations, i.e. the signals have a relatively flat response, within the signal bandwidth relative to each other. This means that the two or more signals can be combined rather easily using an antenna diversity combining technique with little risk of losing information by deviating from the true signal or of the received signals cancelling each other out. Generally, the amplitude and phase responses of narrowband signals do not vary as significantly across antennas as with a wideband or broadband signal. A narrowband signal from one antenna may be slightly attenuated due to a fading channel but the attenuation typically does not cause problems in combining the antenna signal with a narrowband signal from another antenna.

In a broadband or a wideband signal system such as an IEEE 802.11a compliant communications system at frequencies around 5 GHz, however, the amplitude and phase responses of received signals can be expected to vary widely from each other across multiple antennas. In fact, it can be shown that given sufficient separation distance between antennas, the received signals are completely independent of each other. Combining completely independent signals is troublesome as the signals may cancel each other out. More generally, wideband or broadband RF signals cannot easily be summed up, at least not using traditional combination methods and conventional narrowband diversity techniques. Although antenna diversity techniques are well-known, these techniques are not applicable to a 5 or 6 GHz wideband application.

It is possible to envision brute force implementations of normal fast antenna diversity combining techniques to a 5 GHz system that would imply massive processing capability to combine every subchannel separately. The signals would need to be separated into sections having a narrow bandwidth of hundreds of KHz, for example, sections of 300 kHz bandwidth to drill down to a level at which the variations between the signals would be negligible for purposes of combining the signals. The signals would then have to be combined separately at each section—implying separate combining logic at every section—which would achieve the desired result, but at great complexity and at a huge cost. In effect, normal diversity techniques are prohibitively expensive in an IEEE 802.11a compliant environment, unless the performance benefits derived from the techniques can justify the cost—a situation that is hard to envision in the overwhelming majority of circumstances.

Needed are cost effective antenna diversity techniques that are suited to confront the unique challenges posed by high data rate systems such as IEEE 802.11a compliant systems.

SUMMARY

It is therefore an object of the invention to overcome the above-described problems and challenges.

The present invention fulfills this object and others by providing in a one aspect of the present invention a method of providing antenna diversity in a communications system according to a presently preferred embodiment. The communications system contains a transmission device that sends and receives transmit and receive packets, respectively, at a single location. The transmission device includes two antennas. One antenna of the two antennas is designated as a default antenna. An antenna of the two antennas other than the antenna that is designated as the default antenna is an alternate antenna. Each transmit packet is sent a first time using the default antenna as a transmit antenna. For any transmit packet, the transmit antenna is whichever antenna of the at least two antennas is used to send the transmit packet. Each receive packet that acknowledges a previously sent transmit packet is listened for using as a receive antenna the transmit antenna that was used to send the previously sent transmit packet. For any receive packet, the receive antenna is whichever antenna of the at least two antennas is used to listen for the receive packet. All other receive packets are listened for using the default antenna as the receive antenna. Which antenna of the two antennas is the default antenna and which antenna is the alternate antenna are reversed. Transmission and reception results from only one antenna of the two antennas are used to determine whether to reverse which of the two antennas is the default antenna.

A method of providing antenna diversity in a communications system according to a presently preferred embodiment is presented in another aspect of the present invention. The communications system contains a transmission device that sends and receives transmit and receive packets, respectively, at a single location. The transmission device includes two antennas. One antenna of the two antennas is designated as a default antenna and the other antenna of the two antennas is designated as an alternate antenna. The default antenna and the alternate antenna are redesignated by changing which antenna of the two antennas is designated as the default antenna and which antenna is designated as the alternate antenna. Each transmit packet that acknowledges a previously received receive unicast packet is sent using whichever antenna was used to receive the previously received receive unicast packet. All other transmit packets are sent a first time using the default antenna. Each receive packet that acknowledges a previously sent transmit packet is listened for using whichever antenna was used to send the previously sent transmit packet. All other receive packets are listened for using the default antenna. For any transmit unicast packet, the alternate antenna is used to send the transmit unicast packet to a destination after a number of unsuccessful sends of the transmit unicast packet using the default antenna.

A method of providing antenna diversity in a communications system according to a presently preferred embodiment is presented in another aspect of the present invention. The communications system contains a transmission device that sends and receives transmit and receive packets, respectively, at a single location. The transmission device includes at least two antennas. One antenna of the at least two antennas is designated as a default antenna. Each transmit packet that acknowledges a previously received receive unicast packet is sent using whichever antenna was used to receive the previously received receive unicast packet. All other transmit packets are sent a first time using the default antenna. Each receive packet that acknowledges a previously sent transmit packet is listened for using whichever antenna was used to send the previously sent transmit packet. All other receive packets are listened for using the default antenna. For any transmit unicast packet, if the transmit unicast packet is not successfully transmitted by the default antenna after one or more attempts to send the transmit unicast packet, the transmit unicast packet is sent on an antenna of the at least two antennas other than that antenna that is designated as the default antenna.

A method of providing antenna diversity in a communications system according to a presently preferred embodiment is presented in another aspect of the present invention. The communications system contains a transmission device that sends and receives transmit and receive packets, respectively, at a single location. The transmission device includes at least two antennas. One antenna of the at least two antennas is designated as a default antenna. An antenna of the at least two antennas other than the antenna that is designated as the default antenna is an alternate antenna. Each transmit packet is sent a first time using the default antenna. Each receive packet that acknowledges a previously sent transmit packet is listened for using whichever antenna of the at least two antennas was used to send the previously sent transmit packet. All other receive packets are listened for using the default antenna. Any transmit packet that was not successfully transmitted using one of the default antenna and the alternate antenna is resent until any such transmit packet is successfully transmitted or until a predetermined number of resends is reached. The default antenna is changed between the at least two antennas in response to predetermined criteria that take into account which antenna successfully transmitted any transmit packet during the step of resending such that once the default antenna is changed, both the sending and listening steps will send and receive, respectively, using the changed default antenna.

An antenna diversity system according to a presently preferred embodiment is presented in another aspect of the present invention. The system includes several mobile stations and an access point. The access point sends and receives transmit and receive packets, respectively, at a single location. The access point is configured to communicate with the mobile stations via the transmit and receive packets. The access point includes at least two antennas, a switch, and a transmit management interface. For any transmit packet, a transmit antenna is whichever antenna of the at least two antennas is used to send the transmit packet. For any receive packet, a receive antenna is whichever antenna of the at least two antennas is used to listen for the receive packet. The switch changes between the at least two antennas. The transmit management interface directs the switch and designates one antenna of the at least two antennas as a default antenna. The interface changes which antenna of the at least two antennas is the default antenna in response to predetermined criteria that take into account the success of the transmit antenna in transmission of transmit packets and the success of the receive antenna in reception of receive packets. An antenna of the at least two antennas other than the antenna that is designated as the default antenna is an alternate antenna. The default antenna is used as the transmit antenna to send each transmit unicast packet a first time and to send each transmit broadcast packet. The transmit antenna that was used to send a previously sent transmit packet is used as the receive antenna to listen for each receive packet that acknowledges the previously sent transmit packet. The default antenna is used as the receive antenna to listen for all other receive packets. For any transmit unicast packet, the alternate antenna is used to send the transmit unicast packet if the transmit unicast packet is not successfully transmitted by the default antenna after one or more attempts.

An antenna diversity system according to a presently preferred embodiment is presented in another aspect of the present invention. The system includes an access point and a mobile station. The mobile station sends and receives transmit and receive packets, respectively, at a single location. The mobile station is configured to communicate with the access point via the transmit and receive packets. The mobile station includes at least two antennas, a switch, and a transmit management interface. For any transmit packet, a transmit antenna is whichever antenna of the at least two antennas is used to send the transmit packet to the access point. For any receive packet, a receive antenna is whichever antenna of the at least two antennas is used to listen for the receive packet from the access point. The switch changes between the at least two antennas. The transmit management interface directs the switch and designates one antenna of the at least two antennas as a default antenna. The interface changes which antenna of the at least two antennas is the default antenna in response to predetermined criteria that take into account the success of the transmit antenna in transmission of transmit packets and the success of the receive antenna in reception of receive packets. An antenna of the at least two antennas other than the antenna that is designated as the default antenna is an alternate antenna. The default antenna is used as the transmit antenna to send each transmit unicast packet a first time. The transmit antenna that was used to send a previously sent transmit packet is used as the receive antenna to listen for each receive packet that acknowledges the previously sent transmit packet. The default antenna is used as the receive antenna to listen for all other receive packets. For any transmit unicast packet, the alternate antenna is used to send the transmit unicast packet if the transmit unicast packet is not successfully transmitted by the default antenna after one or more attempts.

An antenna diversity system according to a presently preferred embodiment is presented in another aspect of the present invention. The system includes several mobile stations in an ad hoc network and a first mobile station in the ad hoc network. The first mobile station sends and receives transmit and receive packets, respectively, at a single location. The first mobile station is configured to communicate with the mobile stations via the transmit and receive packets. The first mobile station includes at least two antennas, a switch, and a transmit management interface. For any transmit packet, a transmit antenna is whichever antenna of the at least two antennas is used to send the transmit packet. For any receive packet, a receive antenna is whichever antenna of the at least two antennas is used to listen for the receive packet. The switch changes between the at least two antennas. The transmit management interface directs the switch and designates one antenna of the at least two antennas as a broadcast default antenna and one antenna of the at least two antennas as a destination default antenna. The interface changes which antenna of the at least two antennas is the broadcast default antenna in response to predetermined criteria that take into account the success of the transmit antenna in transmission of transmit packets and the success of the receive antenna in reception of receive packets. The destination default antenna and the broadcast default antenna are not necessarily the same antenna of the at least two antennas. An antenna of the at least two antennas other than the antenna that is designated as the destination default antenna is a destination alternate antenna. The destination default antenna is used as the transmit antenna to send each transmit unicast packet a first time. The broadcast default antenna is used as the transmit antenna to send each transmit broadcast packet. The transmit antenna that was used to send a previously sent transmit packet is used as the receive antenna to listen for each receive packet that acknowledges the previously sent transmit packet. The broadcast default antenna is used as the receive antenna to listen for all other receive packets. For any transmit unicast packet, the destination alternate antenna is used to send the transmit unicast packet if the transmit unicast packet is not successfully transmitted by the destination default antenna after one or more attempts.

A method of providing antenna diversity in a communications system according to a presently preferred embodiment is presented in another aspect of the present invention. The communications system contains a transmission device that sends and receives transmit and receive packets, respectively, at a single location. The transmission device includes at least two antennas. One antenna of the at least two antennas is designated as a default antenna. An antenna of the at least two antennas other than the antenna that is designated as the default antenna is an alternate antenna. Each transmit packet is sent a first time using the default antenna as a transmit antenna. For any transmit packet, the transmit antenna is whichever antenna of the at least two antennas is used to send the transmit packet. Each receive packet that acknowledges a previously sent transmit packet is listened for using as a receive antenna the transmit antenna that was used to send the previously sent transmit packet. For any receive packet, the receive antenna is whichever antenna of the at least two antennas is used to listen for the receive packet. All other receive packets are listened for using the default antenna as the receive antenna. For any transmit unicast packet, if the transmit unicast packet is not successfully transmitted by the default antenna after one or more attempts, the transmit unicast packet is sent on the alternate antenna. Which antenna of the at least two antennas is the default antenna is changed in response to predetermined criteria that take into account the success of the transmit antenna in transmission of transmit packets and the success of the receive antenna in reception of receive packets.

A method of providing antenna diversity in a communications system according to a presently preferred embodiment is presented in another aspect of the present invention. The communications system contains an access point that sends and receives transmit and receive packets, respectively, at a single location. The access point is configured to communicate with several mobile stations via the transmit and receive packets. The access point includes at least two antennas. One antenna of the at least two antennas is designated as a default antenna. An antenna of the at least two antennas other than the antenna that is designated as the default antenna is an alternate antenna. Each transmit packet is sent a first time using the default antenna as a transmit antenna. For any transmit packet, the transmit antenna is whichever antenna of the at least two antennas is used to send the transmit packet. Each transmit broadcast packet is sent using the default antenna as the transmit antenna. Each receive packet that acknowledges a previously sent transmit packet is listened for using as a receive antenna the transmit antenna that was used to send the previously sent transmit packet. For any receive packet, the receive antenna is whichever antenna of the at least two antennas is used to listen for the receive packet. All other receive packets are listened for using the default antenna as the receive antenna. For any transmit unicast packet, if the transmit unicast packet is not successfully transmitted by the default antenna after one or more attempts, the transmit unicast packet is sent on the alternate antenna. Which antenna of the at least two antennas is the default antenna is changed in response to predetermined criteria that take into account the success of the transmit antenna in transmission of transmit packets and the success of the receive antenna in reception of receive packets.

A method of providing antenna diversity in a communications system according to a presently preferred embodiment is presented in another aspect of the present invention. The communications system contains a mobile station that sends and receives transmit and receive packets, respectively, at a single location. The mobile station is configured to communicate with an access point via the transmit and receive packets. The mobile station includes at least two antennas. One antenna of the at least two antennas is designated as a default antenna. An antenna of the at least two antennas other than the antenna that is designated as the default antenna is an alternate antenna. Each transmit packet is sent a first time using the default antenna as a transmit antenna. For any transmit packet, the transmit antenna is whichever antenna of the at least two antennas is used to send the transmit packet to the access point. Each receive packet that acknowledges a previously sent transmit packet is listened for using as a receive antenna the transmit antenna that was used to send the previously sent transmit packet. For any receive packet, the receive antenna is whichever antenna of the at least two antennas is used to listen for the receive packet from the access point. All other receive packets are listened for using the default antenna as the receive antenna. For any transmit unicast packet, if the transmit unicast packet is not successfully transmitted by the default antenna after one or more attempts, the transmit unicast packet is sent on the alternate antenna. Which antenna of the at least two antennas is the default antenna is changed in response to predetermined criteria that take into account the success of the transmit antenna in transmission of transmit packets and the success of the receive antenna in reception of receive packets.

A method of providing antenna diversity in a communications system according to a presently preferred embodiment is presented in another aspect of the present invention. The communications system contains a transmission device that sends and receives transmit and receive packets, respectively, at a single location. The transmission device is configured to communicate with several destination transmission devices via the transmit and receive packets. The transmission device includes at least two antennas. One antenna of the at least two antennas is designated as a broadcast default antenna. One antenna of the at least two antennas is designated as a destination default antenna. The destination default antenna and the broadcast default antenna are not necessarily the same antenna of the at least two antennas. Each transmit packet is sent a first time using the destination default antenna as a transmit antenna. For any transmit packet, the transmit antenna is whichever antenna of the at least two antennas is used to send the transmit packet. An antenna of the at least two antennas other than the antenna that is designated as the destination default antenna is a destination alternate antenna. Each transmit broadcast packet is sent using the broadcast default antenna as the transmit antenna. Each receive packet that acknowledges a previously sent transmit packet is listened for using as a receive antenna the transmit antenna that was used to send the previously sent transmit packet. For any receive packet, the receive antenna is whichever antenna of the at least two antennas is used to listen for the receive packet. All other receive packets are listened for using the broadcast default antenna as the receive antenna. For any transmit unicast packet, if the transmit unicast packet is not successfully transmitted by the destination default antenna after one or more attempts, the transmit unicast packet is sent on the destination alternate antenna. Which antenna of the at least two antennas is the broadcast default antenna is changed in response to predetermined criteria that take into account the success of the transmit antenna in transmission of transmit packets and the success of the receive antenna in reception of receive packets.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF THE PRESENTLY PREFERRED EMBODIMENTS

According to one aspect of the present invention, a presently preferred embodiment leverages retransmission of packets to provide antenna switch diversity in an IEEE 802.11a compliant, 5 to 6 GHz environment. The decision to switch antennas is preferably made according to the signal from one antenna. The antenna diversity systems and methods described herein according to the presently preferred embodiments provide, at a reasonable level of complexity and cost, comparable diversity gain to traditional diversity techniques used in, for example, traditional narrowband signal environments. The presently preferred embodiments of the antenna switch diversity algorithm are advantageously implemented in packet-based transmission environments rather than environments in which antenna are switched according to received power.

The present invention will now be described in detail with reference to the accompanying drawings, which are provided as illustrative examples of preferred embodiments of the present invention.

Figure 1:
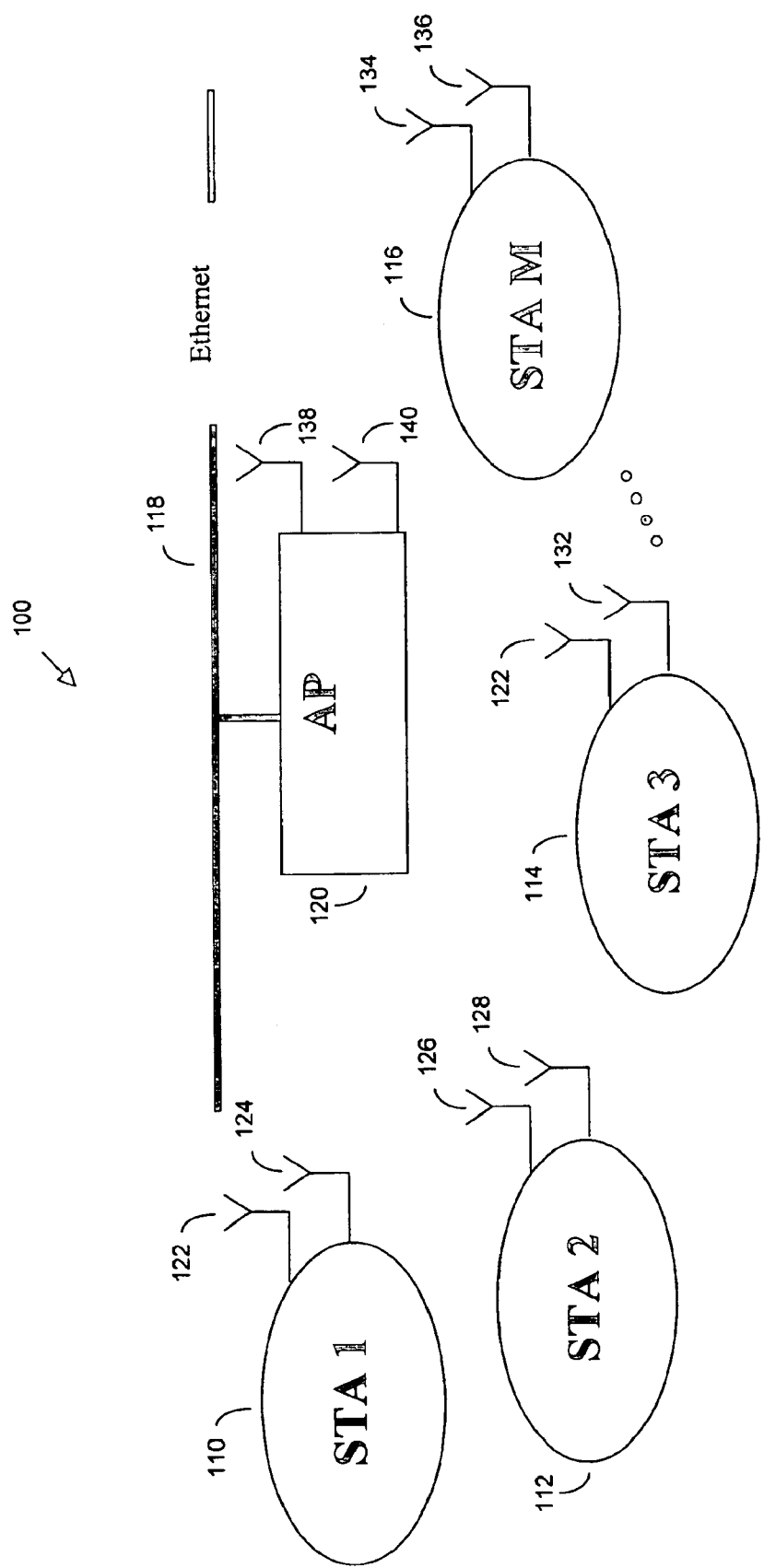
FIG. 1 is a diagram illustrating the structure of a first exemplary wireless communications network according to a presently preferred embodiment.

FIG. 1 is a diagram illustrating the structure of a first exemplary wireless networked communications system 100 that incorporates aspects of the presently preferred methods and systems described herein. In a presently preferred embodiment, the system 100 is an 802.11a compliant wireless system. The system 100 includes several client devices, mobile nodes, or mobile stations (STA) STA 1 110, STA 2 112, STA 3 114, . . . , STA M 116, a base station or access point (AP) 120, and a wired network 118, for example, an Ethernet LAN, coupled to the AP 120. Each of the mobile stations 110, . . . , 116 and the AP 120 include two wireless transceivers, for example, antennas, for transmission and reception of RF energy. The mobile station STA 1 110 includes antennas 122, 124 while the mobile station STA 2 112 includes antennas 126, 128. The mobile station STA 3 114 includes antennas 130, 132, while the mobile station STA M 116 includes antennas 134, 136. The AP 120 includes antennas 138, 140. Of course, the system 100 is not limited to two antennas per device, and any number of antennas may be used as suitable subject to any technological, environmental, manufacturing, or performance limitations. The system 100 represents a Base Station System (BSS) mode network, or non-ad hoc network, because the wireless system 100 includes the AP 120. By contrast, an ad hoc network is a network without a centralized control device, such as an access point. In a BSS mode or non-ad hoc network configuration, a mobile station communicates solely with the access point, while the access point is configured to communicate with any and all of the mobile stations within its range of coverage. The AP 120 is a device that serves to interface the wireless network of mobile stations 110, . . . , 116 with the wired network 118, in this case, the Ethernet LAN. As shown in FIG. 1, multiple mobile stations 110, . . . , 116 may connect to the wired network via the same AP 120. A wireless communications system such as system 100 allows mobility, so that, unlike a conventional wired network, users or mobile stations such as mobile stations 110, . . . , 116 are permitted to move around while remaining connected to the wired network via the AP 120.

Figure 2:
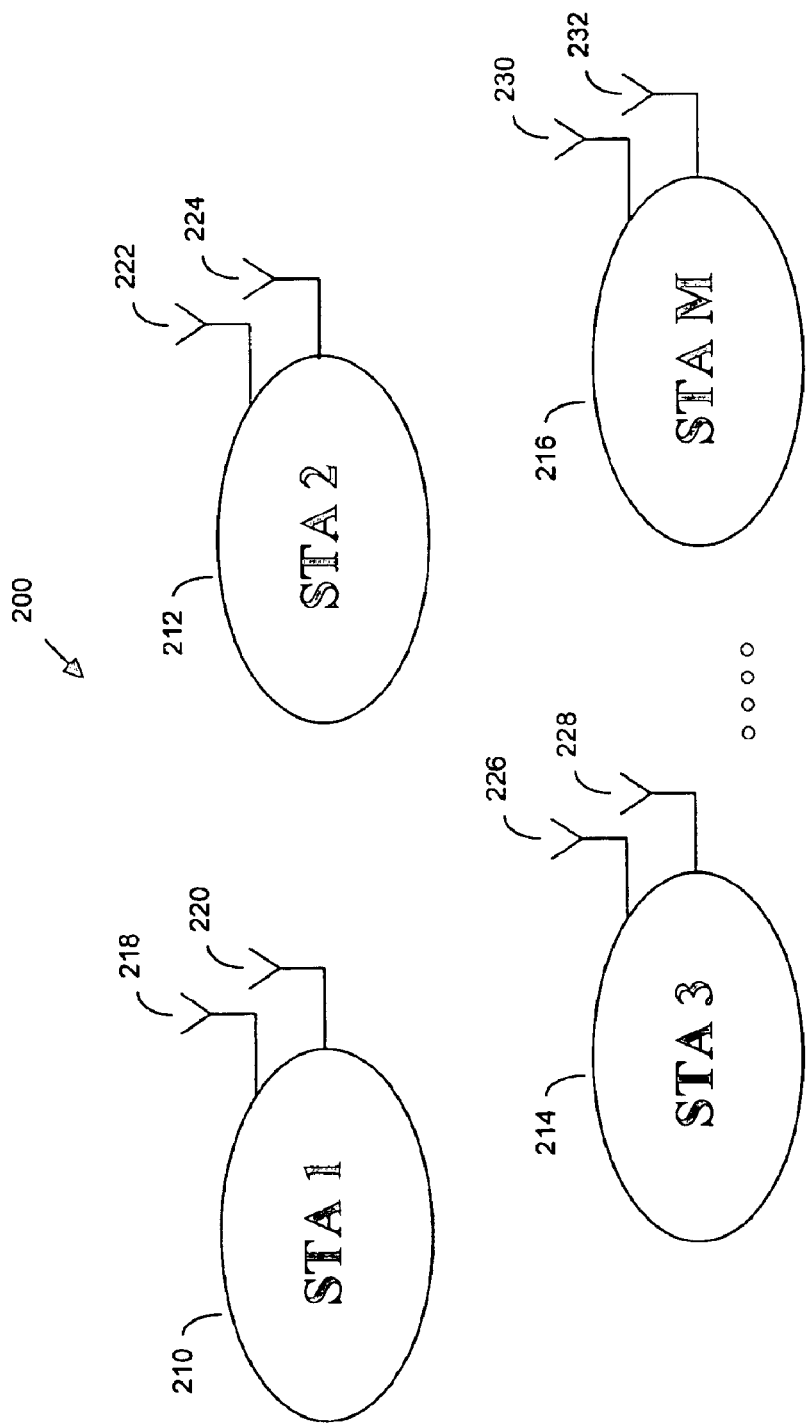
FIG. 2 is a diagram illustrating the structure of a second exemplary wireless communications network according to a presently preferred embodiment.

FIG. 2 is a diagram illustrating the structure of a second exemplary wireless networked communications system 200 that incorporates aspects of the presently preferred methods and systems described herein. In a presently preferred embodiment, the system 200 is an 802.11a compliant wireless system. The system 200 includes several client devices, mobile nodes, or mobile stations (STA) STA 1 210, STA 2 212, STA 3 214, . . . , STA M 216. Each of the mobile stations 210, . . . , 216 include two wireless transceivers, for example, antennas, for transmission and reception of RF energy. The mobile station STA 1 210 includes antennas 218, 220 while the mobile station STA 2 212 includes antennas 222, 224. The mobile station STA 3 214 includes antennas 226, 228, while the mobile station STA M 216 includes antennas 230, 232. Of course, the system 200 is not limited to two antennas per device, and any number of antennas may be used as suitable subject to any technological, environmental, manufacturing, or performance limitations. Contrasting this exemplary system 200 with the system 100 of FIG. 1, the system 200 represents an Independent Basic Service Set (IBSS) mode network, or an ad hoc network, because the wireless system 200 includes only the mobile stations 210, . . . , 216—the system 200 has no access point or base station. An ad hoc network is a network without a centralized control device, such as an access point. In this configuration, the mobile stations such as mobile stations 210, . . . , 216 are permitted to communicate with one another directly.

A broadcast packet refers to a packet that is sent to all destinations in a wireless system. A beacon broadcast packet, or beacon, is the main broadcast packet type. The beacon is a pre-known broadcast packet type and serves as a pilot signal and a synchronization signal for the destinations in the wireless system. The beacon provides destinations with timing information. The beacon is typically short in length and includes pre-specified information.

A multicast packet refers to a packet that is sent to two or more pre-known destinations. A directed or unicast packet refers to a packet that is sent directly to a specific destination and thus typically requires an acknowledgement from the destination that uniquely receives the packet. This is in contrast to broadcast and multicast packets, which are sent to multiple destinations and typically do not require acknowledgements from the various destinations.

In some systems, a request to send (RTS) packet is sent from a source to a destination to ask the destination whether the source can send a packet. If the destination successfully receives the RTS packet and a send is acceptable, the destination responds with a clear to send (CTS) packet. The source can then send a data packet, typically a unicast data packet, to the destination. The source is then sent an acknowledgement packet from the destination if the unicast data packet is received successfully by the destination.

As a user or mobile station moves physically away from an access point such as the AP 120, or as the physical distance between mobile stations increases in an ad hoc network, the probability of a failed transmission between the mobile stations increases. The signals to and from the access point or to and from the mobile stations as applicable become weaker and packets are more likely to be lost due to noise or received in error.

In the case of a failed transmission of a packet, the mobile station or access point can resend the packet. In some cases, the mobile station or access point may resend the packet at a lower data rate to increase the probability that the packet is received correctly.

In the case of the BSS system 100, the AP 120 sends broadcast packets, including beacons to all of the mobile stations 110, . . . , 116. The mobile stations 110, . . . , 116 in the system 100 do not send packets of any type to one another and do not send broadcast packets to the AP 120, nor do the mobile stations 110, . . . , 116 send acknowledgement packets in response to broadcast packets received from the AP 120. Rather, the AP 120 and the mobile stations 110, . . . , 116 transmit unicast packets to each other. The AP 120 is preferably configured to return an acknowledgement packet in response to every unicast packet received at the AP 120. Similarly, the mobile stations 110, . . . , 116 are preferably configured to return acknowledgement packets in response to every unicast packet received at the mobile stations 110, . . . , 116.

In the case of the IBSS (ad hoc) system 200, there is no access point, only the mobile stations 210, . . . , 216. Any of the mobile stations 210, . . . , 216 may send broadcast packets to all of the mobile stations 210, . . . , 216. Preferably, beacon broadcast packets are sent by a different one of the mobile stations 210, . . . , 216 each time a beacon is sent. During the intervals between beacons, any of the mobile stations 210, . . . , 216 may send packets to any other of the mobile stations 210, . . . , 216. In contrast, then, to BSS mode, the mobile stations 210, . . . , 216 in the system 200 do send packets to one another. The mobile stations 210, . . . , 216 do not send acknowledgement packets in response to broadcast packets. Rather, the mobile stations 210, . . . , 216 transmit unicast packets to each other. The mobile stations 210, . . . , 216 are preferably configured to return acknowledgement packets in response to every unicast packet received at the mobile stations 210, . . . , 216.

The exemplary wireless communication systems 100 of FIG. 1 and 200 of FIG. 2 both embody aspects of the presently preferred method and systems described herein. The methods and systems will be described with reference to the exemplary systems 100, 200. Preferably, any mobile station or access point such as those of wireless systems 100 and 200 can assume the position of a source transmitter or a destination receiver. For example, the access point AP 120 of system 100 in FIG. 1 is capable of acting as a source transmitter to transmit packets to the destination node mobile stations 110, . . . , 116, including broadcast packets to all of the mobile stations 110, . . . , 116, multicast packets to some of the mobile stations 110, . . . , 116, and unicast packets to any of the mobile stations 110, . . . , 116, in accordance with the presently preferred embodiments of antenna diversity techniques described herein. Similarly, for example, the mobile station STA 3 114 of the system 100 in FIG. 1 is capable of acting as a source transmitter to transmit unicast packets to the destination AP 120. in accordance with the presently preferred embodiments of antenna diversity techniques described herein. The mobile station STA 2 214 of the system 200 in FIG. 2, for example, is capable of acting as a source transmitter to transmit packets to destination node mobile stations STA 1 210, STA 3 214, . . . , STA M 216, including broadcast packets to all of the mobile stations 210, 214, . . . , 216, multicast packets to some of the mobile stations 210, 214, . . . , 216, and unicast packets to any of the mobile stations 210, 214, . . . 216, in accordance with the presently preferred embodiments of antenna diversity techniques described herein.

Figure 3:
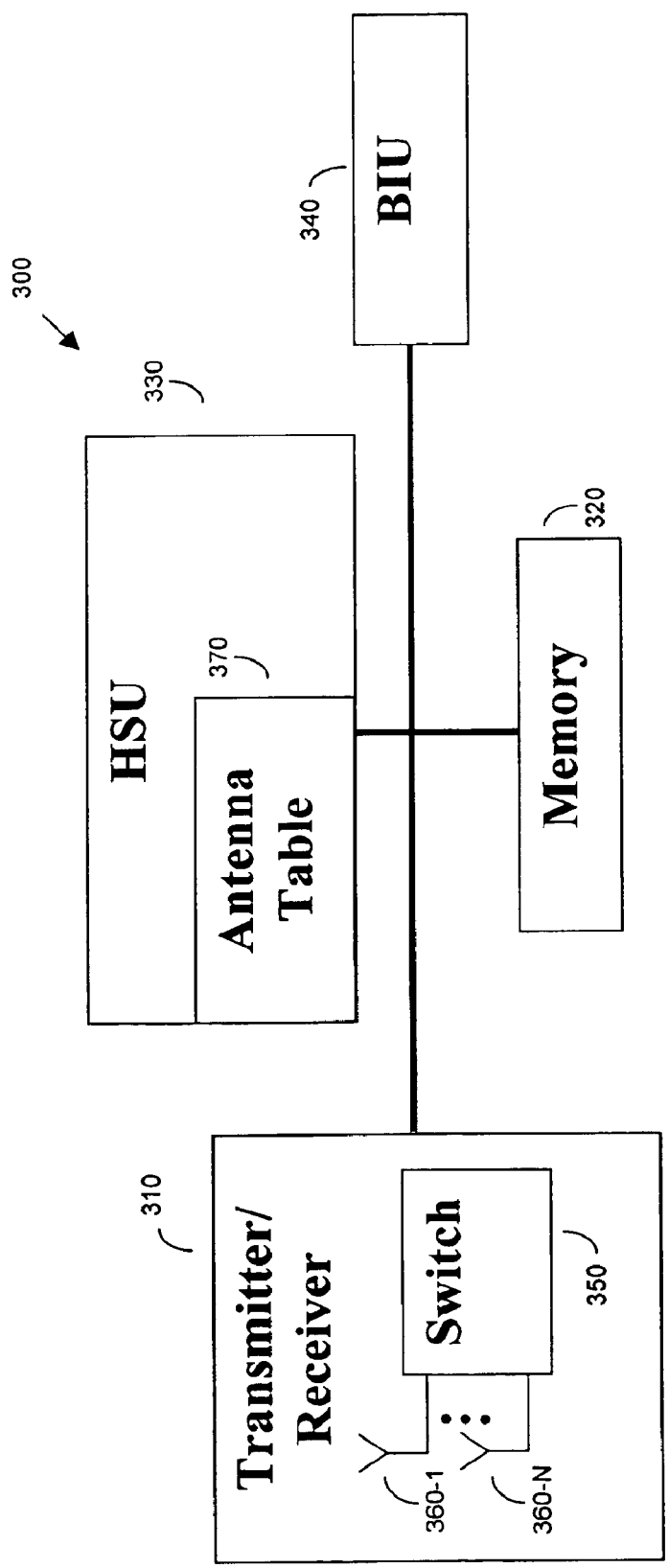
FIG. 3 is a block diagram illustrating a transmission device according to the exemplary networks of FIGS. 1 and 2.

FIG. 3 is a block diagram illustrating an exemplary transmission device 300, such as an access point or a mobile station, according to a presently preferred embodiment. In a preferred embodiment, the transmission device 300 is an IEEE 802.11a compliant device. The device 300 includes a transmitter/receiver (T/R) 310, a memory 320, a bus interface unit (BIU) 340, and a combined hardware/software unit (HSU) 330. The HSU 330 transfers packets from the BIU 340 into the memory 320. In addition, the HSU 330 queues packets for the T/R 310 so that the HSU 330 preferably controls the order in which packets are sent. The T/R 310 preferably includes two or more wireless transceivers, for example, antennas 360-1, . . . , 360-N, for transmission and reception of RF energy and a switch 350 to switch between the antennas 360-1, . . . , 360-N. In a presently preferred embodiment, the number of antennas N is equal to two, and the T/R 310 includes the antennas 360-1, 360-2. More generally, the device 300 is not limited to two antennas, and any number N of antennas may be used as suitable subject to any technological, environmental, manufacturing, or performance limitations.

Describing the transmission device 300 with respect to the systems 100, 200, the device 300 represents any of the AP 120, the mobile stations 110, . . . , 116 of FIG. 1, and the mobile stations 210, . . . , 216 of FIG. 2.

Preferably, in ad hoc network embodiments, the device 300 is a mobile station with the HSU 330 including an antenna table 370. Although the antenna table 370 is illustrated in FIG. 3, in other embodiments the HSU 330 does not include an antenna table. The antenna table 370 is explained in more detail below.

Referring again to FIG. 3, depending on the implementation, the HSU 330 may be used in place of a conventional local processing unit and may partition some of the functions and features of the conventional local processing unit between hardware and software. The HSU 330 may also include functionality of a main host processor, if present on the device 300. For example, an access point generally includes a processor while a mobile station, depending on the implementation, may not include a processor but rather might include a dedicated hardware chip. For example, in a PCMCIA card implementation for a laptop or other device, the card typically does not include a processor.

The software portion of the HSU 330 preferably includes a software device driver that executes on the device 300 of FIG. 3. Preferably, the device driver of the HSU 330 creates transmit and receive descriptors for processing of the packets. The transmit and receive descriptors are HSU 330 software/hardware additions to packets in order to assist the HSU 330 hardware with processing of the packets. Preferably, each packet to be sent by the T/R 310 has at least one corresponding transmit descriptor. A transmit descriptor describes all or part of a particular packet to be sent so that the packet may be sent into the network. Similarly, each packet received by the T/R 310 preferably has at least one corresponding receive descriptor. A receive descriptor describes all or part of a particular packet received so that the packet may be processed by the device 300, and more particularly the HSU 330. A description and explanation of the operation of the packet transmit descriptors is beyond the scope of this description and is not be presented here so as not to distract from the central concepts herein presented.

Without multiple antennas and an algorithm or other method to change between the antennas, an antenna may persistently and fruitlessly attempt to send and/or listen for packets over a bad channel. Antenna switching diversity techniques are implemented by the HSU 330 in order to detect and handle situations where antenna switching may be needed to find a good channel. In a preferred embodiment, the software device driver of the HSU 330 queues the packets, and the hardware portion of the HSU 330 analyzes packets in order to, for example, determine whether a transmit antenna, a receive antenna, or both should be changed. Depending on the situation, the decision to switch between antennas using the switch 350 is determined responsively to hardware processes or to software processes of the HSU 330.

The Switch 350 and Other Design Issues

In IEEE 802.11a compliant environments, i.e., environments with operating frequencies of 5 to 6 GHz, implementing and switching between multiple antennas present design challenges. An involved discussion of the particular design challenges is beyond the scope of this description and is not be presented here so as not to distract from the central concepts herein presented. A high quality design characteristic is important, however, and several issues and areas of concern can be identified.

The physical separation between the multiple antennas is an important concern. In a preferred embodiment, two antennas are mounted on a printed circuit board or similar platform and are physically separated from one another to keep the signals independent of each other. Typically the operational frequency f is fixed by the application and the frequency limits design choices for the dimensional properties of the antenna used in the application. In general, for an antenna arrangement such as a typical monopole antenna, the operating wavelength λ is related to the operating frequency f through the following relation:

$$\lambda = \frac{c}{f\sqrt{\varepsilon_r}} \quad (1)$$

where c is the speed of light in vacuum and e, is a relative permittivity associated with the insulator. For optimum performance of antennas and independent receive performance at a particular frequency f of operation the minimum separation distance between antennas is approximately one-half of the operating wavelength λ at that operating frequency f, or λ/2.

The antennas imply a switch, for example, the switch 350 of FIG. 3, to which the antennas and a receive filter are to be matched. Impedance matching of the antennas to the RF receiver is important at GHz frequencies to prevent reflections and build up of phasors at the RF receiver output. The switch 350 itself is preferably a high tolerance, extremely fast switch able to operate at times on the order of microseconds. One important issue is minimizing leakage, due to switching, between transmitting and receive antennas. The transmitter typically operates at a much higher power than the receiver and as such preventing leakage between the transmitter and the receiver is essential. In most systems, the transmitter operates in a different frequency band than the receiver to avoid leakage. In IEEE 802.11a systems, the transmitter and the receiver operate within the same band and the same channel so that isolating the transmitter from the receiver presents challenges. Other issues are selecting the antenna pattern and designing the shape of the antennas depending on the working environment and on what type of propagation is desired. Overall, multiple antennas create mismatch issues that need to be accounted for in robust and efficient design.

Antenna Switching Strategies And Justification For The Strategies

It is not unusual for an antenna to receive a signal across a fading channel. Multiple antennas are typically used in communication systems to provide another option to turn to, in the event of poor signal reception due to a fading channel, so that a good channel with no fading can be found. Some examples of causes of a fading channel include phase shift in the signal and multipath interference errors. The RF energy that is transmitted between antennas can experience destructive and constructive interference due to multiple paths taken by the energy with multiple delays on the way to a receive antenna. The interference can cause a receive antenna to receive a packet in error or to miss a packet entirely.

Traditionally, fast antenna diversity techniques have been used to manage multiple antennas. For example, the receive signals from two or more antennas of a radio are compared with each other in terms of reception quality, or the signals are otherwise combined. In the case of a comparison of reception quality, the radio is typically switched to using whichever of the two or more antennas had the best reception. In a high data rate system such as an IEEE 802.11a system, comparing the reception quality of received signals from two or more antennas is problematic because the time that the testing implies presents a drain on system resources and performance.

As for combining signals, the OFDM signals received in an IEEE 802.11a system present amplitude and phase responses that can be expected to vary widely from each other across multiple antennas. In fact, as described above, given sufficient separation distance between antennas, the received signals are completely independent of each other. Combining completely independent signals is troublesome as the signals may cancel each other out. Combining received signals individually at the sub-channel level would be a brute force solution for managing multiple antennas—but a prohibitively expensive and complex solution in most cases.

Ideally, antenna diversity techniques are used when a particular channel is fading due to multipath effects so that changing from one antenna to another antenna provides another communication channel that in all probability is not fading. In many cases, however, the errors with packets might not be due to a fading channel. The antenna might be receiving or transmitting over a good channel that is not fading, but packets may still be lost due to noise or to a variety of other factors that can cause errors from transmitter or receiver. If the antenna is already using a good channel, it would be desirable for obvious reasons not to switch or change the antenna to another antenna.

According to one aspect of the present invention, a presently preferred embodiment leverages retransmission of packets to provide intelligent antenna switch diversity in an IEEE 802.11a compliant, 5 to 6 GHz environment. The decision to switch antennas is preferably made according to the signal from one antenna.

Depending on the type of packet being sent or received, i.e., broadcast and multicast, or unicast, and the particular transmission device 300, such as an access point, a mobile station in a network with an access point, or a mobile station in an ad hoc network, different antenna switch diversity scenarios are employed and is be discussed in more detail below.

Preferably, rather than switching antennas at the receiver, the antenna that is used to retransmit a packet is switched at the transmitter. In nearly all instances, switching the antenna at the transmitter is just as effective as switching the antenna at the receiver. In addition, once a transmit antenna is found that can successfully transmit a packet to a receive antenna, antenna reciprocity usually holds. That is, a packet that is transmitted from the receive antenna can usually be received well by the antenna that had been used to transmit the previous packet. Therefore, once an antenna pair is found that works in one direction it is very likely to work in the other direction as well.

For switch diversity to work properly, one entity that is receiving packets from another cannot switch its receive antenna if the other entity is also going to switch its transmit antenna, because the possibility exists that both entities might switch antennas and fall into, or maintain, a fading channel. The assumption is made that the one entity only switches and the other entity fixes the receive antennas (or the transmit antennas, as the case may be). Preferably, the transmitter switches its transmit antenna and the receiver maintains its receive antenna.

Preferably, at the receiver, slow antenna switch diversity is employed. A receiver is preferably configured to decide to try switching antennas if certain periodic signals are missed or received in error. This helps the long term learning of the best receive antenna.

For example, referring to FIG. 1, in an access point network, for transmission of a unicast packet to any given mobile station of the mobile stations 110, . . . , 116, the AP 120 switches its transmit antenna in the event of a failure to receive an acknowledgement packet in response to the unicast packet. The mobile station, by contrast, maintains its receive antenna unless after a period of time the mobile station learns that it is missing packets from the AP 120, at which time the mobile station switches the receive antenna.

A path is a link between two antennas. In the simplest example of an antenna at a receiver and an antenna at a transmitter, there is one path. Path diversity is the number of paths available from the transmitter to the receiver. If the transmitter has n antennas and the receiver has m antennas, then there is a path diversity of n*m. For the case above, according to FIG. 1, the AP 120 has, for example, two antennas and any one of the mobile stations 110, . . . , 116 has, for example, two antennas—so that there is a path diversity of four (2*2=4).

The systems and methods are structured so that, even if a mobile station with two antennas encounters an AP that has only one antenna, there is still a path diversity of two (2*1=2), and the mobile stations perform receive antenna switch diversity for broadcast packets from the AP.

Analysis of wave behavior of channel models for 5 GHz radiation in an indoor environment yields the observation that the reception behaviors of two antennas separated by at least half a wavelength are completely independent of each other. The wavelength for a 5 GHz wave is on the order of centimeters. If observations are made of the signal receivers of the two antennas separated by half a wavelength (approximately 3 cm) at 5 GHz, no correlation is found between the receive signals so that the signals are clearly being received over separate, independent channels. Based on statistical expectation, if one of two channels received by respective antennas separated by at least half a wavelength is fading, then the probability of the other channel being in fade is rather small.

The basic theory behind antenna switch diversity at the transmitter rather than the receiver is that if two antennas can be assumed to receive independently of each other, then if one is receiving a fading channel, the other is not likely to be receiving a fading channel, depending on the level of coverage in the wireless system. Once confident that the antenna is indeed receiving a fading channel, based on statistics, the transmit antenna can be switched to a new antenna and presumably a channel that is not fading.

Referring to FIG. 1, assume that the AP 120 is attempting to send a unicast packet to the mobile station STA 3 114. Assuming a data rate, a given transmit power, and a given receiver sensitivity, the likelihood of receiving a channel can be estimated. These estimates can serve as a prediction for the overall coverage and thus the outage of a particular system. Although the A IEEE 802.11 standard does not specify an outage parameter value, assume that a desirable outage for the particular system is 10 percent, that is, a design goal of 90 percent coverage. This is a comfortable estimate based on historical analyses of 5 GHz channel environments. The outage of 10 percent means that 10 percent of the time a single antenna might not be sufficient to pick up a channel that is not fading.

Assume that the AP 120 begins to send the unicast packet to the mobile station 114 on the AP's 120 antenna 138. The AP's 120 antennas 138, 140 are placed at a separation distance greater than half a wavelength so that the antennas 138, 140 can be assumed to receive signals independently. The AP 120 listens for an acknowledgement packet from the mobile station 114 on the AP's 120 antenna 138 for a period of time. Assume that an acknowledgement packet is received in error, or that the packet is missed outright, meaning that, for example, the mobile station 114 did receive the packet at all, or that the acknowledgement packet failed to reach the AP 120. At any rate, the initial transmission of the unicast packet is not successful. Then, the AP 120 resends the unicast packet to the mobile station 114 on the same antenna 138. The AP 120 listens for an acknowledgement packet from the mobile station 114 on the same antenna 138 for a period of time. Assume again that an acknowledgement packet is received in error, or that the packet is missed outright, meaning that, for example, the mobile station 114 did receive the packet at all, or that the acknowledgement packet failed to reach the AP 120.

Now, the AP 120 has sent and resent the unicast packet to the mobile station 114 with no successful result. The IEEE 802.11 standard specifies that systems be designed to meet a packet error rate (PER) of 10 percent, on average. The statistical estimate of 90 percent coverage is based on the target PER of 10 percent and the delay spread behavior of the signal environment. A coverage rate of 90 percent for a given environment means that, within the coverage area of, for example, an access point transmitting signals into space in that environment, 90 percent of the time a device can definitely receive signals with a PER of 10 percent, while 10 percent of the time signals might be missed by the device due to a bad or fading channel. Assuming that the IEEE 802.11 system has been designed to meet a PER of 10 percent, the chance of two packets in a sequence being received in error is 1 percent, that is, $\frac{1}{10}*\frac{1}{10}=\frac{1}{100}$. Since the probability of receiving two consecutive packets in error is 1 percent, and the probability of outage has been designed to be 10 percent, there is a higher chance that failure is caused by outage. It is more likely (by a factor of ten) that it is the outage that is dominant—that is, it is a bad or fading channel that is causing the errors.

Of course, although experimentally attempting transmission for a third time on the same antenna made no meaningful difference in the ultimate result, more than two attempts at transmission of the same packet by the same antenna may be attempted.

Statistically, if one of the antennas has a fading channel, the chances of the other antenna receiving a fading channel is very small. Assuming antennas receiving independently and a probability of outage of 10 percent, there is approximately one percent chance, that is, $\frac{1}{10}*\frac{1}{10}=\frac{1}{100}$, of both channels being in fade. By that logic, the transmit antenna should be switched and the packet resent on another antenna. The AP 120 switches its transmit antenna from the antenna 138 to the other antenna 140. Assume that the AP 120 resends the same unicast packet to the mobile station 114 on the AP's 120 other antenna 140. The AP 120 listens for an acknowledgement packet from the mobile station 114 on the AP's 120 antenna 140 for a period of time. Note that the AP 120 uses the same antenna to listen for an acknowledgement packet that it does to transmit a unicast packet. Assume that transmission of the unicast packet by the antenna 140 is not successful, that is, that the third overall attempt at transmission fails. Then, the AP 120 resends the unicast packet to the mobile station 114 on the same antenna 140. The AP 120 listens for an acknowledgement packet from the mobile station 114 on the antenna 140 for a period of time. Finally, assume that the retransmission of the unicast packet by the AP's 120 antenna 140, i.e., the fourth send overall, is not successful. At this point, it can be inferred with 99 percent confidence that the data rate is too high and that the transmission of the packet should be aborted. Lower data rates require a lower signal to noise ratio, so a signal with worse quality can typically be successfully transmitted if the data rate is low enough. The AP 120 then aborts transmission of the unicast packet and attempts to send the unicast packet at a lower data rate at a later time.

Of course, although experimentally attempting transmission on a third antenna (if available) made no meaningful difference in the ultimate result, any number of attempts at transmission of the same packet by additional antennas beyond the first two antennas, or by either or both of the first two antennas may be performed as suitable, depending on the environment and the coverage rate.

For example, the frequency of collisions, the suspicion of collision, or the overall load in a particular system, might dictate that a higher number of retries be performed using the first antenna, as well as a higher overall number of retries on all antennas. Preferably, the general rule for unicast packets, however, is to attempt transmission twice on each antenna, starting with the default antenna, and alternating antennas on every other attempt, until the number of retries is exhausted.

Of course, in this example, the AP 120 has two antennas, although the AP 120 is not limited to two antennas, an multiple antennas may be used as suitable. Theoretically, the strategies described apply to any number of antennas. However, in a presently preferred embodiment, the antennas are typically spaced at a minimum of one-half wavelength from each other to ensure that the antennas receive independently of each other. Practically, environmental, technological, and process considerations dictate an upper limit on the number of antennas that may be used.

For example, in a 5 GHz implementation, the wavelength is about 6 cm and a half-wavelength is about 3 cm. Three or four antennas might fit on an access point, while on mobile stations there is generally be less space and typically two antennas are used. However, manufacturers are integrating antennas into laptops so that in the future mobile stations are expected to fit more antennas.

While many of the examples used herein refer to two antennas per transmission device, it will be evident to those skilled in the art that the antenna diversity systems and methods described herein according to the presently preferred embodiments can easily be extended to, applied to, and used with any number of antennas per transmission device as suitable.

The Hardware/Software Unit (HSU) 330

One issue with switching between two or more antennas is how to implement the switching decision process. Preferably, the decision process is controlled both at the software level and the hardware level of the HSU 330. Preferably, the hardware controls the switch 350, and the software supplements the hardware role with long-term learning of which antenna to use as the default antenna. The HSU 330 may, for example, create and maintain the antenna table 370, described in more detail below, to associate different antennas with different destination nodes.

An implication of switching antennas in software is that software has major delays relative to the processing time of packets. For example, it may take 10 to 20 packets to switch between antennas using software. In many instances, faster switching of the antennas is desirable. Preferably, the devices are capable of switching antennas at one or two packets, so that it is disadvantageous to rely solely on software to make the decision to switch antennas. If the antennas are switched in response to a decision structure implemented in hardware and based on immediate results of packet sends and receptions, the antennas can be switched much faster, for example, in the time it takes to process a packet, on up to the processing time for four or five or more packets.

In a presently preferred embodiment, the antennas are switched in accordance with hardware processes executed in the short-term, and based on the immediate results of attempts to send or receive packets. As used herein, the terms short-term and immediate are intended broadly to refer to the times needed to process a number of packets, the number of packets ranging anywhere from a fraction of a packet on up to nine packets.

The hardware preferably includes control logic such as registers that, for example, count the number of packets received in error, or that store the number of attempts to retry sending a packet, or that store a value that indicates the most recently successful antenna in transmission or reception. Preferably, the control logic and registers provide feedback data that inform the decisions of whether or not to switch the antennas on a short-term basis.

In a presently preferred embodiment, the antennas are switched in accordance with software processes executed in the long-term, and based on the results of attempts to send or receive packets over an extended time. As used herein, the terms long-term and extended time are intended broadly to refer to the time needed to process ten or more packets.

Preferably, the software tracks data over the long-term that inform the decisions of whether or not to switch the antennas on a long-term basis. For example, in the case of an access point, if the access point determines that it is having difficulty reaching destination mobile stations, the access point may switch between antennas after a time period preferably set in software. The length of the time period can be decided upon empirically in accordance with testing. Preferably, the long-term software learning scheme overlaps the short-term hardware learning scheme in deciding whether to change between the two or more antennas.

In a presently preferred embodiment, the HSU 330 performs a variety of functions. The HSU 330 implements antenna switch diversity techniques, transfers packets from the BIU 340 into the memory 320, determines whether a transmission of a packet was successful, or whether a packet was received successfully, generates interrupts at the T/R 310, and requeues, manipulates, and stores packets in the memory 320. Several tasks and functions are preferably assigned to one or the other of the hardware and software portions of the HSU 330. For example, in a presently preferred embodiment, the HSU 330 software device driver that executes on the device 300 can queue packets, or form a queue of packets for transmission. The HSU 330 software device driver preferably can control the order in which packet are sent and decide whether or not to send a packet. The HSU 330 software device driver preferably can requeue, discard, perform manipulations on, or store packets in memory for later processing. The HSU 330 software device driver preferably can create transmit and receive descriptors, and set or clear the value of a field, for example a bit value, in a transmit descriptor. The fields preferably contain instructions to the hardware for processing of the packets.

Similarly, in a presently preferred embodiment, the HSU 330 hardware preferably can operate the switch 350 to cause the antennas to be switched. Depending on the situation, the decision to switch between antennas is determined responsively to hardware processes or to software processes of the HSU 330. The HSU 330 hardware preferably can process or attempt to process or transmit a packet from a queue. The HSU 330 hardware preferably can analyze packets, including inspecting and examining the fields of a transmit descriptor corresponding to the packet, for example, to determine whether a transmit antenna, a receive antenna, or both is to be changed or switched using the switch 350. The HSU 330 hardware preferably can block or allow the transmit of the packet to the destination.

In describing the operation of the transmission device 300, functions are attributed to the hardware and the software portions of the HSU 330. It will be understood by those skilled in the arts of computer organization, communications, and networking, that other implementations are possible. For example, hardware may perform a function that herein is attributed to the HSU 330 software or to a device driver executing on the device 300, for example. Similarly, software may perform a function that herein is attributed to the HSU 330 hardware.

The Antenna Table In Ad Hoc Mode

In an ad hoc network such as the system 200, the HSU 330 preferably, for each particular destination mobile station, identifies a corresponding individual antenna of the multiple antennas that is empirically known to communicate successfully with the particular destination mobile station. Preferably, the HSU 330 changes which of the multiple antennas is the destination default antenna based on the identified corresponding individual antenna and the particular mobile station. The HSU 330 preferably creates the antenna table 370 of identified corresponding individual antennas and consults the antenna table 370 to change which of the multiple antennas is designated as the destination default antenna for a particular destination mobile station. Similarly, the HSU 330 preferably consults the antenna table 370 to change the transmit antenna for a particular destination mobile station. In one embodiment, the antenna table 370 indicates for a given destination mobile station, which antenna of the multiple antennas has been most successful, preferably most recently successful, in communicating with the given destination mobile station via unicast packets. That antenna then preferably becomes the destination default antenna. The antenna table 370 is preferably updated for a given destination mobile station after every successful transmission of a unicast packet to, or successful reception of a unicast packet from, a destination mobile station of a unicast packet.

In a preferred embodiment, a software process of the HSU 330 creates the antenna table 370. The antenna table 370 is updated with the last successful transmit or receive antenna. Before sending the transmit descriptor to the HSU 330 hardware, the software device driver of the HSU 330 performs a look up into the table to choose the best transmit antenna for the destination mobile station, that is, the destination default antenna and loads the bit value or values corresponding to the destination default antenna into a field in the transmit descriptor. From the perspective of an ad hoc mobile station, it is as if the mobile station is transmitting to multiple access points—although of course the destinations are other mobile stations—and the ad hoc mobile station has a separate destination default antenna for each destination for transmission of unicast packets. For broadcast packets, the default antenna is the same for all destinations and is termed the broadcast default antenna. From the perspective of the ad hoc mobile station, broadcast packets are sent to all destinations, so there is no rationale for changing the broadcast default antenna for individual destinations over the short term. In addition, from the perspective of an ad hoc mobile station listening for broadcast packets, the receiving mobile station does not know from which mobile station a broadcast packet will next be received so there is little point in changing the broadcast default antenna for receiving from individual destinations over the short term.

The antenna bit values stored as entries in the antenna table 370 preferably indicate, for each destination or for each address that identifies the destination, which antenna is to be used to send to that destination. When a packet is to be sent to a particular destination in ad hoc mode, the bit field in the transmit descriptor is populated with the antenna bit value from the antenna table 370 corresponding to that particular destination. In this exemplary embodiment, the antenna bit values, each corresponding to a particular destination node, are stored in the antenna table 370.

In a presently preferred embodiment, the antenna table 370 for the transmission device 300, here representing a mobile station in an ad hoc network, stores M−1 entries, the M corresponding to the total number of ad hoc mobile stations and the M−1 corresponding to the destination node mobile stations to which the ad hoc mobile station is capable of transmitting packets. In one embodiment, $M-1=2^6=64$. Of course, this value is exemplary, and M may take on other values. From the perspective of the transmission device 300, if there are M destination nodes 1, 2, . . . M, then any individual one destination node is referred to as the Pth destination node or destination node P.

Although in a preferred embodiment the antenna table 370 is created and implemented in software, in other embodiments, the antenna table 370 can be implemented in hardware. For example, the transmit descriptors of unicast packets awaiting transmission to particular destinations can be examined by hardware and used to index into an antenna table in hardware to determine which antenna to use for a particular destination. The hardware could store the antenna table as, for example, an on-chip array. The hardware could also update bit values in the antenna table responsively to transmit or receive descriptors.

Overview Of The Antenna Switch Diversity Algorithm

The basic theory of the antenna switch diversity algorithm is that at any given time, there is a default antenna and one or more alternate antennas. Assuming for purposes of an example that there are two antennas, there would be a default antenna and an alternate antenna. Default and alternate are designations in the algorithm given to physical antennas. Whichever antenna is the default (or the alternate) at any given time has particular functions assigned to it. For example, in a device 300 with two antennas, antenna 0 and antenna 1, at one time, the default and the alternate would be the antennas 0 and 1, respectively, while at another point in time the default and the alternate would be the antennas 1 and 0, respectively.

Preferably, in ad hoc networks, there is a default antenna and an alternate antenna for broadcast packet transmission and for listening for packets, while for each destination mobile station there is a destination default antenna and a destination alternate antenna. For example, in an device 300 with two antennas, antenna 0 and antenna 1, in an ad hoc system, at one time, the broadcast default and the broadcast alternate would be the antennas 0 and 1, respectively, while simultaneously the destination default and the destination alternate for a destination P would be the antennas 1 and 0, respectively.

The transmit antenna refers to the antenna that is used to send any given packet at any given time. If a packet was just sent by antenna 0, antenna 0 was the transmit antenna. If a packet was just sent by antenna 1, antenna 1 was the transmit antenna. The receive antenna refers to the antenna that is used to wait for, listen for, attempt to receive, or receive any given packet at any given time. If a packet was just received by antenna 0, antenna 0 was the receive antenna. If a packet was just received by antenna 1, antenna 1 was the receive antenna. If an antenna is waiting for or listen for a packet, that antenna is the receive antenna.

The antenna switch diversity algorithm is preferably based on the following principles:

1). At any given time there is a default antenna for the given mobile station or AP (a broadcast and destination default for ad hoc mobile stations). All first sends of packets and first attempts to listen for packets other than acknowledgement and CTS packets (if applicable) occur on the default antenna.

2). The antenna that was just used to transmit a packet is always used to listen for any packet that is expected to be received in response to that packet, for example, acknowledgement and CTS packets (if applicable), regardless of the default antenna.

3). The antenna that was just used to successfully receive a packet is always used to send any packets that are expected to be sent in response to that packet, for example, acknowledgement and CTS packets (if applicable), regardless of the default antenna. That is, a packet acknowledging a received packet is sent with the same antenna that was used for reception. Similarly, a CTS packet is sent with the same antenna that an RTS was received on.

4). Once an RTS packet/CTS packet/data packet/acknowledgement exchange sequence is under way, the transmit and the receive antennas should not be changed, regardless of the default antenna.

5) When transmitting a unicast packet, change the transmit antenna on every other attempt until a maximum number of retries is exhausted or an acknowledgement is received.

Preferably, in accordance with these principles, the antenna that is designated as the default antenna is used as the following:

a). as the first antenna on which transmission of a packet is attempted;

b). as the antenna that is used to wait and listen for packets other than acknowledgement packets and CTS packets (if applicable); and c). as the antenna with which acknowledgement packets and CTS packets (if applicable) are sent when packet are received, since generally packets are received on the default antenna.

Preferably, the antenna that is designated as the alternate antenna is used as the following:

a). as the antenna on which transmission of a unicast packet is attempted after the default antenna has failed in the transmitting the unicast packet at least twice in a row, that is, after the default antenna failed to successfully receive any acknowledgement packet in response to the unicast packet;

b). as the antenna that is used to wait and listen for any packet that is expected to be received in response to a packet that was just sent using the alternate antenna, for example, acknowledgement and CTS packets (if applicable).

Preferably, which of the antennas is designated as the default antenna and which is designated as the alternate antenna can be swapped according to different methods. Preferably, the current value of the default antenna is readable by the HSU 330 software driver at all times. Preferably, the HSU 330 software driver can change the default and alternate antennas designations at any time. Practically, however, the software driver is preferably forbidden from changing antenna designations when transmissions are taking place, or when an antenna that just sent a packet is waiting for an acknowledgement or a CTS packet (if applicable) of a sent packet. Generally, the software driver changes the default and alternate designations following long-term software learning.

In a preferred embodiment, the HSU 330 software driver selects one of the following two modes for selecting the default antenna on a more packet by packet basis. In one mode, the antenna that is the default antenna is selected based on a field, AntModeXmit, in the transmit descriptor that comes with each packet to be transmitted to a destination, as described above. The field value is retained as the default antenna, at least for a given destination, until the next transmit packet, at which time the new descriptor value is used. This mode is preferably used by the AP 120 of FIG. 1 and mobile stations 210, ..., 216 in the ad-hoc network of FIG. 2. In the case of the AP 120, transmit descriptors all have the same default antenna value, until it is decided that the default antenna should be switched following long-term software learning, for example. In that case, the HSU 330 software driver changes the value in the descriptor so that a transmit packet is sent on a new default antenna specified in the transmit descriptor. In the ad hoc network, broadcast packet transmit descriptors all have the same broadcast default antenna value, until it is decided that the broadcast default antenna should be switched following long-term software learning, for example. In that case, the HSU 330 software driver changes the value in the descriptor so that a broadcast packet is sent on a new default antenna specified in the transmit descriptor. In the ad-hoc network, the HSU 330 software driver preferably builds the antenna table 370 that, for each destination mobile station, indicates which antenna was most recently successful in transmission and/or reception of a unicast packet. In a preferred embodiment, the antenna table 370 indicates for a given destination mobile station which antenna was most recently successful in transmission of a unicast packet, i.e., that received, for example, an acknowledgement packet from the given destination mobile station. As the antenna table 370 is built and updated, the antenna table 370 preferably specifies the destination default antenna in the transmit descriptor for each unicast packet to be sent.

In another mode, a field value, AntModeXmit, in the transmit descriptor is preferably ignored. Instead, the antenna that was last successful in transmitting a unicast packet or receiving a unicast packet is designated as the default antenna. Since the default antenna receives packets, receiving a unicast packet typically results in maintaining the value of the default antenna. This mode is preferably used by the mobile stations 110, ..., 116 in the access point network of FIG. 1, since any mobile station of the mobile stations 110, ..., 116 sends packets only to the AP 120 and can thus quickly benefit from assigning the default antenna based on the last successful transmission. Preferably, the default antenna is not updated if all attempts at transmitting a unicast packet fail; rather, the default antenna is maintained from the last successful transmission. Preferably, in cases of hardware or software reset, where no prior information is available, preferably default values are used to indicate the default antenna, for example, programmed into hardware, and the AntModeXmit field is initially used to determine the transmit antenna.

Fields Values in the Transmit and Receive Descriptors

Preferably, every packet to be queued for the T/R 310 includes fields in one or more corresponding transmit descriptors to be utilized by the HSU 330 in processing packets according to the decision structures 500, 600, 700 of FIGS. 4–10. Similarly, preferably every received packet to be processed by the HSU 330 includes fields in one or more corresponding receive descriptors. The transmit or receive descriptors are preferably updated to report completion status information. Some examples of transmit descriptor fields in a presently preferred embodiment include the AntModeXmit field and the XmitRate field. The AntModeXmit field for a packet to a particular destination is preferably used in some embodiments to identify the transmit antenna that is used to send the packet to the destination. In other embodiments, the AntModeXmit field is ignored and does not affect the choice of the antenna that is used to send the packet. In some cases, the AntModeXmit field designates the default antenna. How the AntModeXmit field is populated depends on the particular type of transmission device 300 that is used, i.e., an access point or a mobile station in an ad hoc network. Preferably, the XmitRate field specifies the rate at which a packet is to be transmitted. The PktXmitOK field is a transmit descriptor completion status field value that preferably indicates whether or not a packet was transmitted successfully. If this field indicates a valid transmission, then the AntModeXmit preferably indicates the antenna that successfully transmitted the packet. If the AntModeXmit does not determine the antenna that is used to transmit the packet, such as in the case of a mobile station in a network with an access point, the field value is preferably updated to indicate the antenna that successfully transmitted the packet as completion status information. Some examples of receive descriptor fields in a presently preferred embodiment include the Rcv Antenna field and the PktRcvOk field, both completion status field values. Preferably, the RcvAntenna field of a received packet indicates the antenna that the packet was received on, regardless of whether the packet was received successfully. In most cases, the RcvAntenna field value effectively amounts to reporting the value of the default antenna at the time the packet was received, unless, for example, an acknowledgement packet was received by the alternate antenna in response to a packet sent by the alternate antenna. Preferably, the PktRcvOK field of a receive packet indicates whether or not packet reception was successful. If set, for example, the packet was received successfully. If clear, for example, an error occurred during packet reception.

Exemplary Implementations Of The Antenna Switch Diversity Algorithm

The exemplary wireless communication systems 100 of FIG. 1 and 200 of FIG. 2 both embody aspects of the presently preferred method and systems described herein. The methods and systems are described with reference to the exemplary systems 100, 200 and the transmission device 300.

A presently preferred embodiment of the antenna switch diversity algorithm implements switch diversity on the transmit antenna side for unicast packet transmission for the AP 120, the mobile stations 110, ..., 116 in the AP 120 system 100 of FIG. 1, and the ad hoc mobile stations 210, ..., 216 of the system 200 of FIG. 2. The algorithm preferably implements switch diversity on the receive antenna side at the mobile stations 110, ..., 116 in the system 100 for receiving broadcast packets from the AP 120.

As described above, the antenna that is designated as the default antenna is preferably switched according to long-term learning by HSU 330 software and short-term learning by HSU 330 hardware. In a preferred embodiment, timers and some counters that relate to long-term or short-term learning are reinitialized or restarted when the default antenna is switched. Values such as the number of resends of a packet, or the maximum time without a successful reception prior to the switching of the default antenna, are programmed into the HSU 330 and are generally independent of switching the default antenna.

The Access Point: The Antenna Switch Diversity Algorithm

The AP 120 of FIG. 1 is configured to communicate with the mobile stations 110, . . . , 116 via broadcast, multicast, and unicast packets using two antennas 138, 140. The algorithm is described for the case of two antennas at the AP 120, although any number antennas may be used as suitable.

The Access Point: Broadcast And Multicast Packet Transmission

The AP 120 has a default antenna and an alternate antenna. Broadcast and multicast packets are sent exclusively on the default antenna. The AP 120 does not resend the same broadcast packet. The default antenna is preferably maintained for an extended period of time to aid in long-term HSU 330 software learning by the mobile stations 110 . . . , 116. For example, sending broadcast and multicast packets on the AP's 120 default antenna gives the mobile station 110 the chance to learn which of its antennas 122, 124 works best for receiving broadcast packets from the AP 120. Without consistency in the transmit antenna, this learning is impossible and it is difficult to insure that all mobile stations 110 . . . , 116 are able to receive broadcast messages.

Preferably, the AP 120 changes which of its antennas 138, 140 is designated as the default antenna only in response to long-term HSU 330 software learning by the AP 120.

The Access Point: Unicast Packet Transmission

Preferably, the AP 120 uses transmit diversity during transmission of unicast packets to the mobile stations 110, . . . , 116. The AP 120 preferably changes the transmit antenna if consecutive transmission attempts of the same unicast packet are unsuccessful. This helps if the environment changes, and since the mobile stations 110, . . . , 116 do not normally switch their default antennas for receive.

For example, when the AP 120 sends unicast packets to the mobile station 110, the AP 120 sends the unicast packets on the default antenna first. The AP 120 then listens for an acknowledgement packet from the mobile station 110 on the default antenna, i.e., the antenna used for sending the unicast packet. If no acknowledgement packet is received, the AP 120 resends the unicast packet on the default antenna. If there is still no acknowledgement packet after the second transmission attempt, the AP 120 changes its transmit antenna from the default antenna to the alternate antenna. The AP 120 then makes two attempts to transmit the same unicast packet on the antenna that is designated as the alternate antenna, unless an acknowledgement packet is received in response to the first attempt on the alternate antenna. In most environments, if none of the attempts to transmit the same unicast packet are successful, it is best to abort the transmission and try at a lower data rate. Preferably, the general rule for unicast packets is to attempt transmission twice on each antenna, starting with the default antenna, and to change the transmit antenna on every other attempt, until the overall number of retries, for example, four, is exhausted or until an acknowledgement packet is received from the mobile station 110. Of course, as described above, for example, the frequency of collisions, the suspicion of collision, or the overall load in a particular system, might dictate that a higher number of retries be performed using the default antenna, as well as a higher overall number of retries on all antennas.

It should be understood that, for the AP 120, success or failure in transmission of the same unicast packet does not affect which antenna is designated as the default antenna. The default antenna setting or designation would be altered only after repeated failures of this type over an extended time, as described below.

Assume that a variable COUNTER1 counts the number of consecutive failed transmissions of the same unicast packet by the AP 120. Assume that a stored value VALUE1 serves as the maximum number of consecutive retries of the same unicast packet on a given antenna. In a presently preferred embodiment, the stored value VALUE1 is equal to two. Assume that a stored value VALUE2 serves as the overall maximum number of retries of the same unicast packet on all antennas and also serves as an upper limit on the variable COUNTER1. In a presently preferred embodiment, the stored value VALUE2 is equal to four. Assume that a stored value VALUE3 serves as the number of antennas available for transmit. In a presently preferred embodiment, the stored value VALUE3 is equal to two. Typically the stored value VALUE2 is greater than or equal to the product of the stored value VALUE3 and the stored value VALUE1 (VALUE3*VALUE1).

Preferably, the HSU 330 hardware compares the variable COUNTER1 with the stored values. As an example, assume that there are two antennas (VALUE3=2) and that the stored values VALUE1 and VALUE2 are equal to two and four, respectively (VALUE2=VALUE3*VALUE1=2*2=4). If the variable COUNTER1 is equal to the stored value VALUE1 (COUNTER1=2), then the transmit antenna is changed from the default antenna to the alternate antenna. Even if an acknowledgement packet is received on the alternate antenna, the default antenna is not changed. If the variable COUNTER1 is equal to the stored value VALUE2 (COUNTER1=4), then transmission of the same unicast packet is aborted and the unicast packet is returned for possible retransmission at a lower data rate and the COUNTER1 is restarted.

The Access Point: Unicast Packet Reception

For reception, the AP 120 uses the same antenna that it uses to transmit broadcast packets, the default antenna. This arrangement works because of reciprocity. If an antenna pairing works well for broadcast packets going from the AP 120 to the mobile stations 110, . . . , 116, then it typically works well for unicast packets going from the mobile stations 110, . . . , 116 to the AP 120. Since all of the mobile stations 110, . . . , 116 are learning which of their antennas works best for receiving broadcast packets and beacon broadcast packets, the mobile stations 110, . . . , 116 can use the better antenna to transmit back to the AP's 120 default antenna with have a high likelihood of success. Thus the AP 120 should only change which antenna is designated as the default antenna occasionally, as described above.

The default antenna is used to wait and listen for unicast packets. If, however, the AP 120 expects to receive an acknowledgement packet or a CTS packet after having changed the transmit antenna in an attempt to make a unicast packet succeed, the receive antenna should be the antenna that was just used to send the packet, regardless of which antenna is designated as the default antenna. Regardless of whether an acknowledgement or a CTS packet is received, the AP 120 should return to listening with the default antenna when any exchanges are complete. If the receive antenna receives a unicast packet, the acknowledgement packet should be sent on the same antenna that was used as the receive antenna, regardless of which antenna is designated as the default antenna. In nearly all cases, however, the receive antenna will be the default antenna.

Preferably, the AP 120 changes which of its antennas 138, 140 is designated as the default antenna only in response to long-term HSU 330 software learning by the AP 120. Over a long-term time scale, the AP 120 may change the default antenna designation if, for example, the AP 120 senses that it is unable to communicate with the mobile stations 110, ..., 116. For example, if the AP 120 discovers that it has lost the mobile stations 110, ..., 116, has consistently missed packets from the mobile stations 110, ..., 116, or has consistently received packets in error from the mobile stations 110, ..., 116 over an extended time.

Assume that a variable TIMER1 marks the time since the AP 120 received any packet successfully from the mobile stations 110, ..., 116. Of course, the AP 120 only receives unicast packets. The variable TIMER1 is restarted by and begins from the last successful reception of a unicast packet by the AP 120. Further assume that a stored value PERIOD1 is a time period that serves as an upper limit for the variable TIMER1. Preferably, the stored value PERIOD1 is on the order of hundreds of milliseconds ($10^{-3}$ seconds), although any suitable time may be used. The stored value PERIOD1 is preferably set at HSU 330 software level and is proportional to the number of packets unsuccessfully received by the AP 120. For example, if packets are very long, then the stored value PERIOD1 may be more appropriately set on the order of seconds. In other embodiments, the HSU 330 software may also count the number of unsuccessfully received packets and periodically compare this number to a stored value representing a maximum number of unsuccessfully received packets and change which antenna is the default antenna or maintain the current default antenna accordingly. For example, the HSU 330 software changes the default antenna after a number of packets are received unsuccessfully. In a preferred embodiment, the number of unsuccessfully received packets is on the order of ten, although any suitable number may be used.

Preferably, the HSU 330 software periodically compares the variable TIMER1 with the stored value PERIOD1. If the variable TIMER1 is greater than or equal to the stored value PERIOD1, then the current default antenna is maintained. If the variable TIMER1 is greater than or equal to the stored value PERIOD1, then the antenna that is designated as the default antenna is changed and the variable TIMER1 is restarted and reinitialized.

Mobile Stations In An Access Point Network: The Antenna Switch Diversity Algorithm The mobile stations 110, ..., 116 of FIG. 1 are each configured to communicate with the AP 120. The algorithm is described for the case of two antennas at each mobile station 110, ..., 116, although any number of antennas may be used as suitable. For clarity, at times the algorithm is described with respect to the mobile station STA 1 110 having the two antennas 122, 124, although the algorithm applies to any of the other mobile stations 112, ..., 116.

Mobile Stations In An Access Point Network: Unicast Packet Transmission

The mobile stations 110, ..., 116 each have a default antenna and an alternate antenna. Once a mobile station such as the mobile station 110 succeeds in transmitting a unicast packet, for example, receives an acknowledgement packet, the antenna that was used to transmit the unicast packet becomes the default antenna. The default antenna is the starting transmit and receive antenna.

Preferably, the mobile stations 110, ..., 116 use transmit diversity during transmission of unicast packets to the AP 120. The mobile stations 110, ..., 116 do not transmit broadcast or multicast packets. Each of the mobile stations 110, ..., 120 preferably changes its transmit antenna if consecutive transmission attempts of the same unicast packet are unsuccessful. This helps if the environment changes, and since the AP 120 does not normally switch its default antennas for receive.

For example, when the mobile station 110 sends unicast packets to the AP 120, the mobile station 110 sends the unicast packets on the default antenna first. The mobile station 110 then listens for an acknowledgement packet from the AP 120 on the default antenna, i.e., the antenna used for sending the unicast packet. If no acknowledgement packet is received, the mobile station 110 resends the unicast packet on the default antenna. If there is still no acknowledgement packet after the second transmission attempt, the mobile station 110 changes its transmit antenna from the default antenna to the alternate antenna. The mobile station 110 then makes two attempts to transmit the same unicast packet on the antenna that is designated as the alternate antenna, unless an acknowledgement packet is received in response to the first attempt on the alternate antenna. In most environments, if none of the attempts to transmit the same unicast packet are successful, it is best to abort the transmission and try at a lower data rate. Preferably, the general rule for unicast packets is to attempt transmission twice on each antenna, starting with the default antenna, and to change the transmit antenna on every other attempt, until the overall number of retries, for example, four, is exhausted or until an acknowledgement packet is received from the AP 120. Of course, as described above, for example, the frequency of collisions, the suspicion of collision, or the overall load in a particular system, might dictate that a higher number of retries be performed using the default antenna, as well as a higher overall number of retries on all antennas.

It should be understood that, for the mobile station 110, success in transmission of the same unicast packet affects which antenna is designated as the default antenna. Preferably, the default antenna setting or designation is changed to reflect the most recently successful antenna in transmission and reception. For example, if the mobile station 110 receives an acknowledgement packet after sending a unicast packet on the alternate antenna, the transmission of the unicast packet was successful and the mobile station 110 changes which antenna is the default antenna and which antenna is the alternate antenna. That is, the antenna that was previously designated as the alternate antenna becomes the default antenna. If neither the default antenna nor the alternate antenna is successful in transmitting the same unicast packet, then the default antenna is preferably maintained.

Assume that a variable COUNTER2 counts the number of consecutive failed transmissions of the same unicast packet by the mobile station 110. Assume that a stored value VALUE4 serves as the maximum number of consecutive retries of the same unicast packet on a given antenna. In a presently preferred embodiment, the stored value VALUE4 is equal to two. Assume that a stored value VALUE5 serves as the overall maximum number of retries of the same unicast packet on all antennas and also serves as an upper limit on the variable COUNTER2. In a presently preferred embodiment, the stored value VALUE5 is equal to four. Assume that a stored value VALUE6 serves as the number of antennas available for transmit. In a presently preferred embodiment, the stored value VALUE6 is equal to two. Typically the stored value VALUE5 is greater than or equal to the product of the stored value VALUE6 and the stored value VALUE4 (VALUE6*VALUE4).

Preferably, the HSU 330 hardware compares the variable COUNTER2 with the stored values. As an example, assume that there are two antennas (VALUE6=2) and that the stored values VALUE4 and VALUE5 are equal to two and four, respectively (VALUE5=VALUE6*VALUE4=2*2=4). If the variable COUNTER2 is equal to the stored value VALUE4 (COUNTER2=2), then the transmit antenna is changed from the default antenna to the alternate antenna. If an acknowledgement packet is received on the alternate antenna, then the antenna that is the alternate antenna (i.e., the antenna most recently successful in transmission) becomes the new default antenna. That is, the antenna that is designated as the default antenna is changed to the new alternate antenna. If the variable COUNTER2 is equal to the stored value VALUE5 (COUNTER2=4), then transmission of the same unicast packet is aborted and the unicast packet is returned for possible retransmission at a lower data rate at a lower time and the COUNTER2 is restarted.

Mobile Stations In An Access Point Network: Broadcast, Multicast, and Unicast Packet Reception For reception, each of the mobile stations 110, ..., 116 begin with the default antenna. The mobile stations 110, ..., 116 can learn which antenna is best for receiving broadcast packets and beacon broadcast packets from the AP 120, and can use that antenna for sending unicast packets as well. This helps packets get through with high probability on the default antenna.

The default antenna is used to wait and listen for unicast packets. If, however, the mobile station 110 (for example) expects to receive an acknowledgement packet or a CTS packet after having changed the transmit antenna in an attempt to make a unicast packet succeed, the receive antenna should be the antenna that was just used to send the packet, regardless of which antenna is designated as the default antenna. Regardless of whether an acknowledgement or a CTS packet is received, the mobile station 110 should return to listening with the default antenna when any exchanges are complete. If the receive antenna receives a unicast packet, the acknowledgement packet should be sent on the same antenna that was used as the receive antenna, regardless of which antenna is designated as the default antenna. In nearly all cases, however, the receive antenna will be the default antenna.

In addition, if the mobile station 110 detects successive failures on broadcast or multicast packets, which can be identified as broadcast or multicast packets by their addressing or packet types, the mobile station 110 should change the default antenna. Of course, the mobile station 110 can identify broadcast packets from the AP 120. Over a short-term time scale, the mobile station 110 may change the default antenna designation if a number of consecutive broadcast packets are received in error by the mobile station 110. In a presently preferred embodiment, two successive broadcast packets received in error are sufficient to change the antenna that is designated as the default antenna, although any number of consecutive broadcast packets may be used as suitable.

Over time, the mobile station 110 has the opportunity to learn which of its antennas 122, 124 works best for receiving broadcast packets from the AP 120. Learning which antenna works well has to be relearned at the rate that the mobile station 110 moves, and the previously selected antenna ends up with poor performance. Preferably, the default antenna is not changed following every failed reception. Many of the packets that a mobile station such as mobile station 110 hears are from other mobile stations 112, ..., 116 in the network. Also, since unicast packets from the AP 120 are tried with both antennas, switching on unicast packets could be detrimental to reception of broadcast packets from the AP 120. By switching the default antenna only on packets that are broadcast packets, the mobile station 110 can insure that it is reacting only to packets from the AP 120, transmitted from the AP's 120 own designated default antenna.

Assume that a variable COUNTER3 counts the number of consecutive broadcast packets received in error by the mobile station 110. Assume that a stored value VALUE7 serves as an upper limit on the variable COUNTER3. In a presently preferred embodiment, the stored value VALUE7 is equal to two, although any suitable value may be used. Preferably, the HSU 330 hardware compares the variable COUNTER3 with the stored value VALUE7. If the variable COUNTER3 is equal to the stored value VALUE7 (COUNTER3=2), then the antenna that is designated as the default antenna is changed and the variable COUNTER3 is restarted and reinitialized.

Over a long-term time scale, the mobile station 110 may change the default antenna designation if, for example, no beacon broadcast packets are received for an extended time from the AP 120. This helps when the environment changes and the last successful antenna is no more the best selection. This is to make sure the mobile station 110 receives all broadcast signals, since the AP 120 does not change the default antenna for transmitting broadcast signals except over the long-term. Beacon packets are expected at regular intervals and thus if these packets are consistently missed by the mobile station 110, the default antenna may be changed with some confidence that the antenna is receiving on a fading channel.

Assume that a variable TIMER2 marks the time since the mobile station 110 received a beacon broadcast packet from the AP 120. The variable TIMER2 is restarted by and begins from the last reception of a beacon broadcast packet by the mobile station 110. Further assume that a stored value PERIOD2 is a time period that serves as an upper limit for the variable TIMER2. Preferably, the stored value PERIOD2 is on the order of milliseconds, although any suitable time may be used. In a presently preferred embodiment, the stored value PERIOD2 is 10 milliseconds. The normal interval between beacons informs the expected time of arrival of a beacons and, preferably, to some extent informs the choice of the stored value PERIOD2. For example, in a preferred embodiment, assuming a minimum duration TU between beacons of 1.024 milliseconds, then the stored value PERIOD2 is approximately 10 TUs, or around 10 milliseconds. Preferably, the stored value PERIOD2 is variable in the system on up to tens of seconds in duration, for example, although practically, the stored value PERIOD2 is advantageously set on the order of milliseconds.

Preferably, the HSU 330 software periodically compares the variable TIMER2 with the stored value PERIOD2. If the variable TIMER2 is less than the stored value PERIOD2, then the current default antenna is maintained. If the variable TIMER2 is greater than or equal to the stored value PERIOD2, then the antenna that is designated as the default antenna is changed and the variable TIMER2 is restarted and reinitialized.

Mobile Stations In An Ad Hoc Network: The Antenna Switch Diversity Algorithm

The ad hoc mobile stations 210, ..., 216 of FIG. 1 are each configured to communicate with each other via broadcast, multicast, and unicast packets. The algorithm is described for the case of two antennas at each mobile stations 210, ..., 216, although any number antennas may be used as suitable. For clarity, at times the algorithm is described with respect to the mobile station STA 210 having the two antennas 218, 220, although the algorithm applies to any of the other mobile stations 212, ..., 216.

Mobile Stations In An Ad Hoc Network: Broadcast And Multicast Packet Transmission Each of the mobile stations 210, . . . , 216 in the ad hoc network have a broadcast default antenna and an broadcast alternate antenna. In an ad hoc network, mobile stations alternate in sending broadcast packets, such as beacon broadcast packets, which are sent by a different one of the mobile stations 210, . . . 216 each time. Broadcast and multicast packets are sent exclusively on the broadcast default antenna. The mobile stations 210, . . . , 216 do not resend the same broadcast packet.

Preferably, the mobile stations 210 changes which of its antennas 218, 220 is designated as the broadcast default antenna in response to long-term HSU 330 software and short-term HSU 330 hardware learning by the mobile stations 210.

Mobile Stations In An Ad Hoc Network: Unicast Packet Transmission

The ad hoc mode mobile stations 210, . . . , 216 each have destination-specific default antennas and alternate antennas. The last successful antenna for transmit to or receive from a particular destination becomes the destination default antenna for unicast packet transmission. Once an ad hoc mode mobile station such as the mobile stations 210 succeeds in transmitting a unicast packet to a destination mobile station 212, for example, receives an acknowledgement packet from the destination mobile station 212, the antenna that was used to transmit the unicast packet becomes the destination default antenna for that destination mobile station 212.

As described above, the HSU 330 software long-term learning process preferably creates the antenna table 370 that indicates, for each destination mobile station 212, . . . , 216, the antenna that was most recently successful in transmission of a unicast packet to the given mobile station, i.e. the destination default antenna. The antenna table 370 is updated following a successful reception of a unicast packet, or a successful transmission of a unicast packet by the ad hoc mode mobile station 210. In a preferred embodiment, the mobile station 210 is able to determine the source of a received broadcast packet and thus will update the antenna table 370 in the event of a successful reception of a broadcast packet.

Preferably, the ad hoc mode mobile stations 210, . . . , 216 use transmit diversity during transmission of unicast packets. Each of the mobile stations 210, . . . , 216 preferably changes its transmit antenna if consecutive transmission attempts of the same unicast packet are unsuccessful.

For example, when the ad hoc mode mobile station 210 sends unicast packets to the ad hoc mobile station 212, the mobile stations 210 consults the antenna table 370 and sends the unicast packets on the destination default antenna corresponding to the ad hoc mobile station 212 first. The mobile stations 210 then listens for an acknowledgement packet from the mobile station 212 on the destination default antenna, i.e., the antenna used for sending the unicast packet. If no acknowledgement packet is received, the mobile station 210 resends the unicast packet on the destination default antenna. If there is still no acknowledgement packet after the second transmission attempt, the mobile stations 210 changes its transmit antenna from the destination default antenna to the destination alternate antenna. The mobile station 210 then makes two attempts to transmit the same unicast packet on the antenna that is designated as the destination alternate antenna, unless an acknowledgement packet is received in response to the first attempt on the destination alternate antenna. In most environments, if none of the attempts to transmit the same unicast packet are successful, it is best to abort the transmission and try at a lower data rate. Preferably, the general rule for unicast packets is to attempt transmission twice on each antenna, starting with the destination default antenna, and to change the transmit antenna on every other attempt, until the overall number of retries, for example, four, is exhausted or until an acknowledgement packet is received from the mobile station 210. Of course, as described above, for example, the frequency of collisions, the suspicion of collision, or the overall load in a particular system, might dictate that a higher number of retries be performed using the destination default antenna, as well as a higher overall number of retries on all antennas.

It should be understood that, for the ad hoc mobile station 210, success in transmission of the same unicast packet affects which antenna is designated as the destination default antenna. Preferably, the destination default antenna setting or designation is changed to reflect the most recently successful antenna in transmission or reception. For example, if the mobile station 210 receives an acknowledgement packet from the destination mobile station 212 after sending a unicast packet on the destination alternate antenna to the destination mobile station 212, the transmission of the unicast packet was successful and the mobile station 210 updates the antenna table 370 so that in effect the antenna that was previously designated as the destination alternate antenna becomes the new destination default antenna for the destination mobile station 212. If neither the destination default antenna nor the destination alternate antenna are successful in transmitting the same unicast packet, then the destination default antenna is preferably maintained.

Assume that a variable COUNTER4 counts the number of consecutive failed transmissions of the same unicast packet by the ad hoc mode mobile stations 210. Assume that a stored value VALUE8 serves as the maximum number of consecutive retries of the same unicast packet on a given antenna. In a presently preferred embodiment, the stored value VALUE8 is equal to two. Assume that a stored value VALUE9 serves as the overall maximum number of retries of the same unicast packet on all antennas and also serves as an upper limit on the variable COUNTER4. In a presently preferred embodiment, the stored value VALUE9 is equal to four. Assume that a stored value VALUE10 serves as the number of antennas available for transmit. In a presently preferred embodiment, the stored value VALUE10 is equal to two. Typically the stored value VALUE9 is greater than or equal to the product of the stored value VALUE10 and the stored value VALUE8 (VALUE10*VALUE8).

Preferably, the HSU 330 hardware compares the variable COUNTER4 with the stored values. As an example, assume that there are two antennas (VALUE10=2) and that the stored values VALUE8 and VALUE9 are equal to two and four, respectively (VALUE9=VALUE10*VALUE8=2*2=4). If the variable COUNTER4 is equal to the stored value VALUE8 (COUNTER4=2), then the transmit antenna is changed from the destination default antenna to the destination alternate antenna. If an acknowledgement packet is received on the destination alternate antenna, the mobile station 210 updates the antenna table 370 so that in effect the antenna that was previously designated as the destination alternate antenna becomes the new destination default antenna. If the variable COUNTER4 is equal to the stored value VALUE9 (COUNTER4=4), then transmission of the same unicast packet is aborted and the unicast packet is returned for possible retransmission at a lower data rate at a lower time and the COUNTER4 is restarted.

Mobile Stations In An Ad Hoc Network: Broadcast and Unicast Packet Reception

For reception, each of the ad hoc mode mobile stations 210, . . . , 216 begin with the broadcast default antenna. The broadcast default antenna is used to wait and listen for unicast packets. If, however, the mobile station 210 (for example) expects to receive an acknowledgement packet or a CTS packet after having changed the transmit antenna in an attempt to make a unicast packet succeed, the receive antenna should be the antenna that was just used to send the packet, regardless of which antenna is designated as the default antenna. Regardless of whether an acknowledgement or a CTS packet is received, the mobile station 210 should return to listening with the broadcast default antenna when any exchanges are complete. In a preferred embodiment, the antenna that is designated as the broadcast default antenna is the most recently successful antenna for reception or transmission is designated as the broadcast default antenna. Of course, in other embodiments, the broadcast default antenna designation may be maintained and changed independently of the most recently successful antenna for reception.

If the receive antenna receives a unicast packet, the acknowledgement packet should be sent on the same antenna that was used as the receive antenna, regardless of which antenna is designated as the broadcast default antenna. In nearly all cases, however, the receive antenna will be the default antenna.

Preferably, the ad hoc mode mobile station 210 changes which of its antennas 218, 220 is designated as the broadcast default antenna in response to long-term HSU 330 software learning and short-term HSU 330 hardware learning by the ad hoc mobile station 210.

Over a long-term time scale, the mobile station 210 may change the broadcast default antenna designation if, for example, the mobile station 210 senses that it is unable to communicate with the other mobile stations 212, . . . , 216. For example, if the mobile stations 210 discovers that it has lost the other mobile stations 212, . . . , 216, has consistently missed packets from the other mobile stations 212, . . . , 216, or has consistently received packets in error from the other mobile stations 212, . . . , 216 over an extended time.

Assume that a variable TIMER3 marks the time since the mobile stations 210 received any packet successfully from the other mobile stations 212, . . . , 216. The variable TIMER3 is restarted by and begins from the last successful reception of a packet by the mobile stations 210. Further assume that a stored value PERIOD3 is a time period that serves as an upper limit for the variable TIMER3. Preferably, the stored value PERIOD3 is on the order of hundreds of milliseconds, although any suitable time may be used. The stored value PERIOD3 is preferably set at HSU 330 software level and is proportional to the number of packets unsuccessfully received by the mobile stations 210. For example, if packets are very long, then the stored value PERIOD3 may be more appropriately set on the order of seconds. In other embodiments, the HSU 330 software may also count the number of unsuccessfully received packets and periodically compare this number to a stored value representing a maximum number of unsuccessfully received packets and change which antenna is the broadcast default antenna or maintain the current broadcast default antenna accordingly. For example, the HSU 330 software changes the default antenna after a number of packets are received unsuccessfully. In a preferred embodiment, the number of unsuccessfully received packets is on the order of ten, although any suitable number may be used.

Preferably, the HSU 330 software periodically compares the variable TIMER3 with the stored value PERIOD3. If the variable TIMER3 is greater than or equal to the stored value PERIOD3, then the current broadcast default antenna is maintained. If the variable TIMER3 is greater than or equal to the stored value PERIOD3, then the antenna that is designated as the broadcast default antenna is changed and the variable TIMER3 is restarted and reinitialized.

Over a long-term time scale, the ad hoc mode mobile stations 210 may change the broadcast default antenna designation if, for example, no beacon broadcast packets are received for an extended time. Beacon packets are expected at regular intervals and thus if these packets are consistently missed by the mobile stations 210, the broadcast default antenna may be changed with some confidence that the antenna is receiving on a fading channel.

Assume that a variable TIMER4 marks the time since the ad hoc mode mobile station 210 received a beacon broadcast packet from any of the other mobile stations 212, . . . , 216. The variable TIMER4 is restarted by and begins from the last reception of a beacon broadcast packet by the mobile stations 210. Further assume that a stored value PERIOD4 is a time period that serves as an upper limit for the variable TIMER4. Preferably, the stored value PERIOD4 is on the order of milliseconds, although any suitable time may be used. In a presently preferred embodiment, the stored value PERIOD4 is 10 milliseconds. The normal interval between beacons informs the expected time of arrival and, preferably, to some extent informs the choice of the stored value PERIOD4. For example, in a preferred embodiment, assuming a minimum duration TU between beacons of 1.024 milliseconds, then the stored value PERIOD4 is approximately 10 TUs, or around 10 milliseconds. Preferably, the stored value PERIOD4 is variable in the system on up to tens of seconds in duration, for example, although practically, the stored value PERIOD4 is advantageously set on the order of milliseconds.

Preferably, the HSU 330 software periodically compares the variable TIMER4 with the stored value PERIOD4. If the variable TIMER4 is less than the stored value PERIOD4, then the current broadcast default antenna is maintained. If the variable TIMER4 is greater than or equal to the stored value PERIOD4, then the antenna that is designated as the broadcast default antenna is changed and the variable TIMER4 is restarted and reinitialized.

In addition, if the ad hoc mode mobile station 210 detects successive failures on broadcast packets, it should change the broadcast default antenna. Over a short-term time scale, the ad hoc mode mobile station 210 may change the broadcast default antenna designation if a number of consecutive broadcast packets are received in error by the mobile station 210. In a presently preferred embodiment, two successive broadcast packets received in error are sufficient to change the antenna that is designated as the broadcast default antenna, although any number of consecutive broadcast packets may be used as suitable. Over time, the mobile station 210 has the opportunity to learn which of its antennas 218, 220 works best for receiving broadcast packets.

Assume that a variable COUNTER5 counts the number of consecutive broadcast packets received in error by the ad hoc mode mobile stations 210. Assume that a stored value VALUE11 serves as an upper limit on the variable COUNTER5. In a presently preferred embodiment, the stored value VALUE11 is equal to two, although any suitable value may be used. Preferably, the HSU 330 hardware compares the variable COUNTER5 with the stored value VALUE11. If the variable COUNTER5 is equal to the stored value VALUE11 (COUNTER5=2), then the antenna that is designated as the broadcast default antenna is changed and the variable COUNTER5 is restarted and reinitialized.

The Access Point: Exemplary Decision Structure

Figure 4:
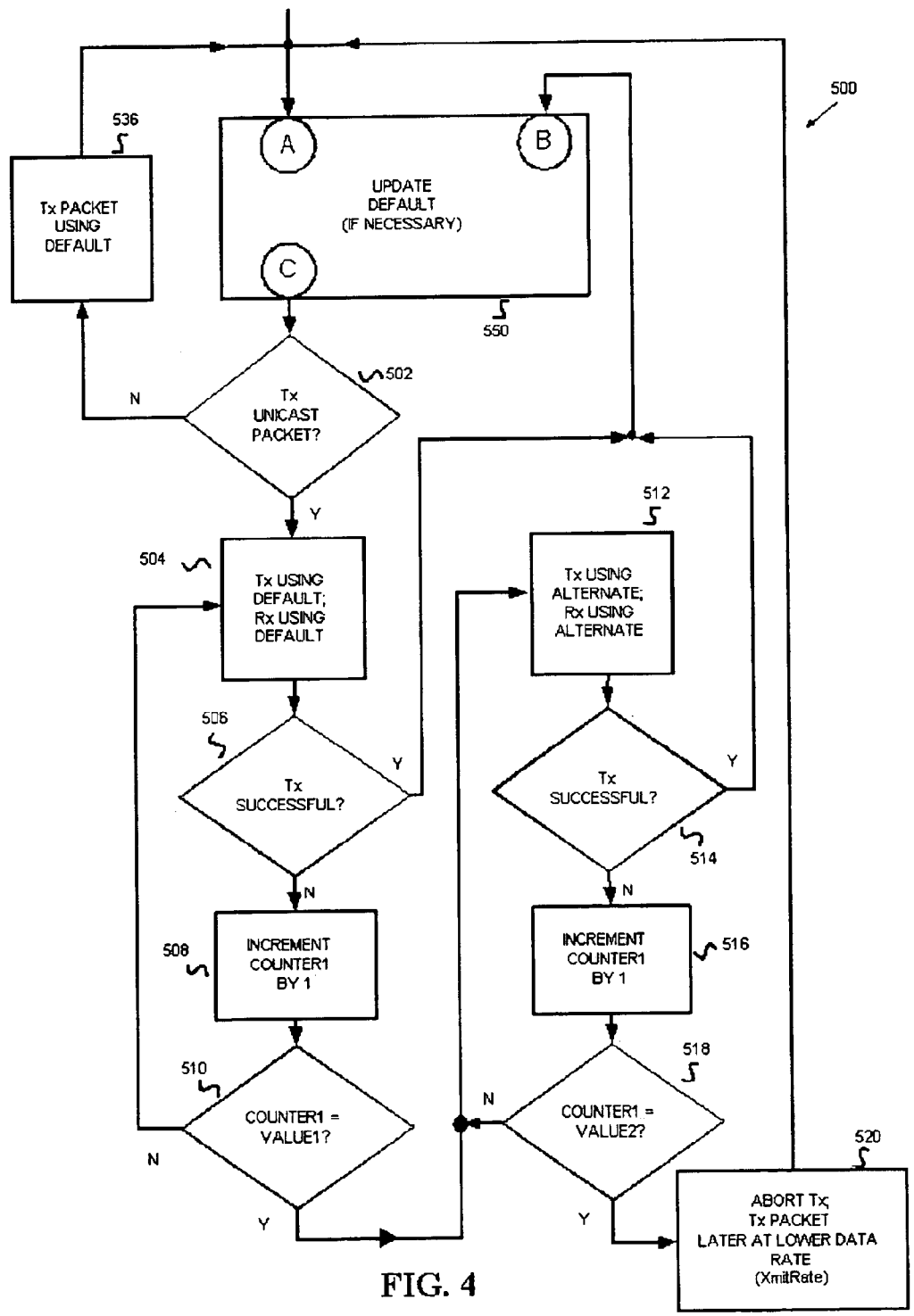
FIG. 4 is a flow diagram illustrating a first exemplary antenna switch diversity decision structure according to a presently preferred embodiment and implemented on an access point in a wireless network.
Figure 5:
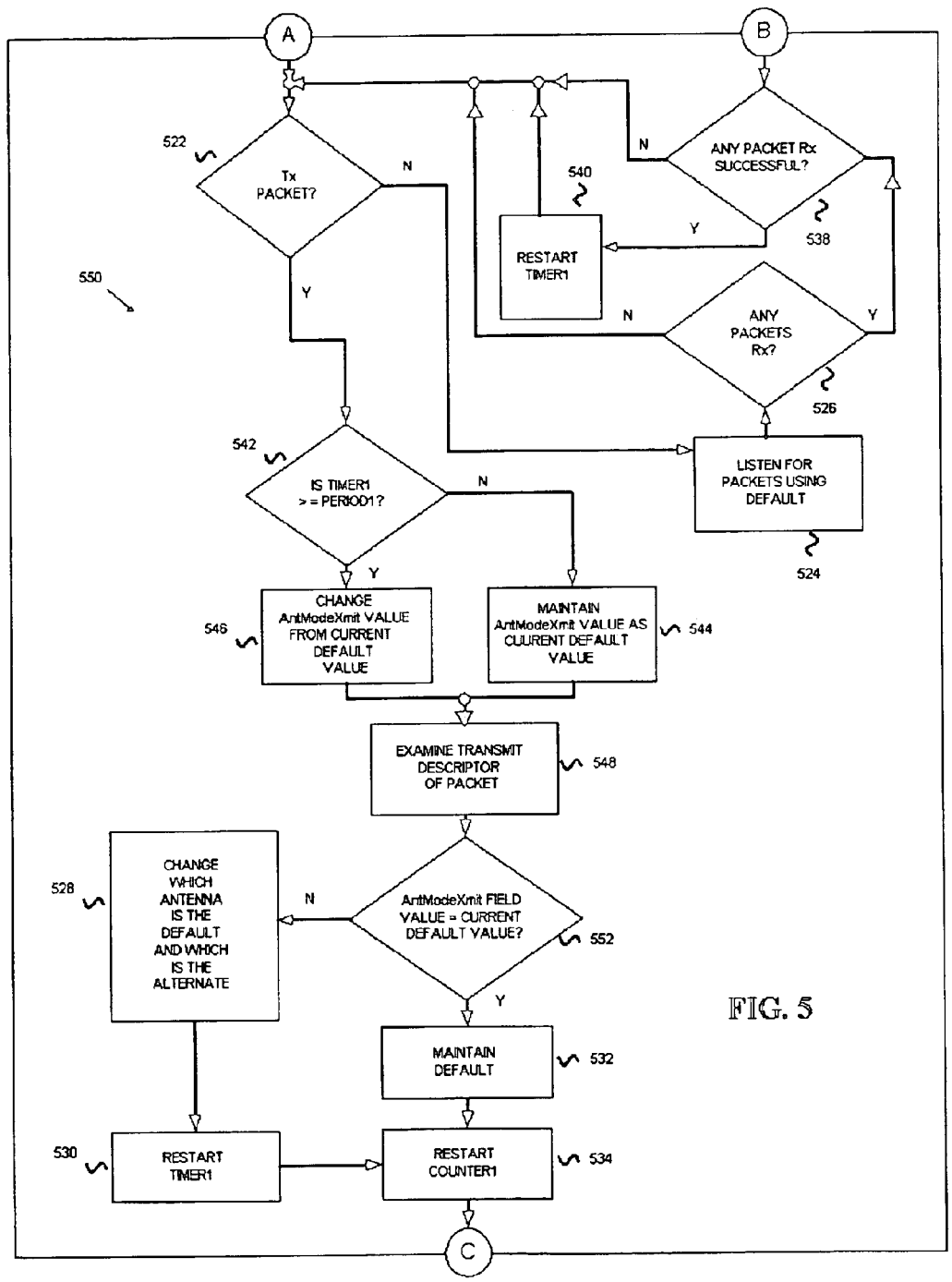
FIG. 5 is a flow diagram illustrating a portion of the first exemplary antenna switch diversity decision structure of FIG. 4.

The operation of the transmission device 300, here the AP 120 of FIG. 1, is now described in more detail with reference to FIGS. 4 and 5. FIG. 4 is a flow diagram illustrating a first exemplary antenna switch diversity decision structure 500 according to a presently preferred embodiment and implemented on the AP 120 of FIG. 1. FIG. 5 is a flow diagram illustrating a portion 550 of the first exemplary antenna switch diversity decision structure 500 of FIG. 4. The decision structure 500 of FIGS. 4 and 5 covers the fundamental antenna switch diversity situation for the AP 120 of FIG. 1.

Preferably, every packet to be queued for the T/R 310 includes fields in one or more corresponding transmit descriptors to be utilized by the HSU 330 in processing packets according to the decision structure 500 of FIGS. 4 and 5. Similarly, preferably every received packet to be processed by the HSU 330 includes fields in one or more corresponding receive transmit descriptors. The transmit or receive descriptors are preferably updated to report completion status information.

Referring to FIGS. 4 and 5, a packet begins processing at the entry point A of the portion 550 of the decision structure 500. At step 522 in FIG. 5, the HSU 330 on the AP 120 determines whether a packet is to be sent (Tx). Implicitly, the HSU 330 also asks whether the AP 120 should send an acknowledgement packet in response to a received unicast packet.

If there is no packet to be transmitted, then at step 524, the AP 120 waits and listens for packets, preferably unicast packets, using the antenna that is designated as the default antenna. At step 526, the HSU 330 determines whether the AP 120 has received (Rx) any packets.

If no packets have been received, then processing returns to step 522.

If any packet has been received, then at step 538, the HSU 330 determines whether the packet was received successfully. The step 538 is also accessed from the entry point B.

If a packet has been received, but not received successfully, then processing advances to step 522.

If a packet has been received successfully, then the variable TIMER1 is restarted at step 540 and processing advances to step 522. The variable TIMER1 marks the time since the AP 120 received any packet successfully from the mobile stations 110, . . . , 116. The variable TIMER1 is restarted by and begins from the last successful reception of a unicast packet by the AP 120. The successfully received packet will generally be a unicast packet and the AP 120 preferably sends an acknowledgement packet to the mobile station of the mobile stat ions 100, . . . , 116 that sent the unicast packet. The acknowledgement packet is sent on the antenna that received the unicast packet, in this case the default antenna.

Returning to step 522, if there is a packet to be transmitted by the AP 120, then processing advances to step 542. At step 542, the HSU 330 software determines whether the variable TIMER1 is greater than or equal to the stored value PERIOD1. Preferably, the stored value PERIOD1 is on the order of hundreds of milliseconds, although any suitable time may be used.

If the variable TIMER1 is less than the stored value PERIOD1, then at step 544 the field value AntModeXmit in the transmit descriptor of the packet to be transmitted is maintained as the current value of the default antenna and processing advances to step 548. The AntModeXmit field for a packet to a particular destination is used to identify the transmit antenna that is used to send the packet to the destination. At step 548, the HSU 330 hardware examines the transmit descriptor of the packet to be sent by the AP 120 and processing advances to step 552. At step 552, the HSU 330 hardware determines whether the field value AntModeXmit is equal to the current default antenna value. Since the field value AntModeXmit was maintained as the current default antenna value at step 544, processing continues to step 532. At step 532, the antenna that is designated as the default antenna is maintained as the default antenna and processing advances to step 534 where the variable COUNTER1 is restarted. The variable COUNTER1 counts the number of consecutive failed transmissions of the same unicast packet by the AP 120. The variable COUNTER1 is brought to a value of zero prior to the mobile stations 210 attempting to send a particular unicast packet for the first time. Processing continues to the exit point C.

If the variable TIMER1 is greater than or equal to the stored value PERIOD1, then at step 546 the field value AntModeXmit in the transmit descriptor of the packet to be transmitted is changed from the current value of the default antenna and processing advances to step 548. At step 548, the HSU 330 hardware examines the transmit descriptor of the packet to be sent by the AP 120 and processing advances to step 552. At step 552, the HSU 330 hardware determines whether the field value AntModeXmit is equal to the current default antenna value. Since the field value AntModeXmnit was changed from the current default antenna value at step 546, processing continues to step 528. At step 528, the HSU 330 hardware changes which antenna is designated as the default antenna and which antenna is designated as the alternate antenna. At step 530, the variable TIMER1 is restarted, since the antenna that is designated as the default has been changed. Processing continues to step 534 where the variable COUNTER1 is restarted, and to the exit point C.

Processing exits at the exit point C of the portion 550 of the decision structure 500 and advances to step 502 in FIG. 4, where the HSU 330 determines whether the packet to be sent is a unicast packet.

If the packet to be sent is not a unicast packet, then the packet is a broadcast packet, a multicast packet, or an acknowledgement packet, and processing advances to step 536. At step 536, the broadcast packet, multicast packet, or acknowledgement packet is sent on the default antenna. Processing returns to the entry point A of the portion 550 of the decision structure 500. An acknowledgement packet is sent to one destination but does not need to be acknowledged by the destination.

If the packet to be sent is a unicast packet, then processing advances to step 504, where the unicast packet is sent to the destination mobile station, for example, mobile station 110, using the antenna that is designated as the default antenna. The AP 120 listens for an acknowledgement packet from the destination on its default antenna. At step 506, the HSU 330 hardware determines whether the packet was successfully transmitted to the destination.

If an acknowledgement packet is received on the default antenna from the destination, then the transmission is successful and processing advances to the entry point B of the portion 550 of the decision structure 500. The acknowledgement packet was received successfully (step 538), so the variable TIMER1 is restarted and processing advances to step 522.

If no acknowledgement packet is received on the default antenna, then the transmission is not successful, and processing advances to step 508. At step 508, the variable COUNTER1 is incremented by one. At this point the variable COUNTER1 is equal to one since the variable COUNTER1 was restarted at step 534. At step 510, the HSU 330 hardware determines whether the variable COUNTER1 is equal to the stored value VALUE1. The stored value VALUE1 serves as the maximum number of consecutive retries of the same unicast packet on a given antenna, in this case the default antenna. In a presently preferred embodiment, the stored value VALUE1 is equal to two.

Assuming that the stored VALUE1 is equal to two, the variable COUNTER1 is not equal to the stored value VALUE1 and processing returns to step 504. At step 504, the AP 120 retries transmitting the same unicast packet to the destination using the default antenna. The AP 120 listens for an acknowledgement packet from the destination on its default antenna. At step 506, the HSU 330 hardware determines whether the packet was successfully transmitted to the destination.

Again, if an acknowledgement packet is received on the default antenna from the destination, then the transmission is successful, and processing advances to the entry point B of the portion 550 of the decision structure 500.

If no acknowledgement packet is received on the default antenna, then the transmission is not successful, and processing advances to step 508. At step 508, the variable COUNTER1 is incremented by one, and at this point the variable COUNTER1 is equal to two. At step 510, the HSU 330 hardware determines whether the variable COUNTER1 is equal to the stored value VALUE1

Again assuming that the stored VALUE1 is equal to two, the variable COUNTER1 is now equal to the stored value VALUE1 and processing advances to step 512. At step 512, the same unicast packet is sent to the destination using the antenna that is designated as the alternate antenna. That is, the transmit antenna is changed from the default antenna to the alternate antenna. The AP 120 listens for an acknowledgement packet from the destination on the alternate antenna. At step 514, the HSU 330 hardware determines whether the packet was successfully transmitted to the destination.

If an acknowledgement packet is received on the alternate antenna from the destination, then the transmission is successful, and processing advances to the entry point B of the portion 550 of the decision structure 500. The acknowledgement packet was received successfully (step 538), so the variable TIMER1 is restarted and processing advances to step 522. As described above, the AP 120 preferably does not change the antenna that is designated as the default antenna, even though the acknowledgement packet was received successfully on the alternate antenna.

If no acknowledgement packet is received on the alternate antenna, then the transmission is not successful, and processing advances to step 516. At step 516, the variable COUNTER1 is incremented by one. At this point the variable COUNTER1 is equal to three. At step 518, the HSU 330 hardware determines whether the variable COUNTER1 is equal to the stored value VALUE2. The stored value VALUE2 serves as the overall maximum number of retries of the same unicast packet on all antennas and also serves as an upper limit on the variable COUNTER1. In a presently preferred embodiment, the stored value VALUE2 is equal to four.

Assuming that the stored VALUE2 is equal to four, the variable COUNTER1 is not equal to the stored value VALUE2 and processing returns to step 512. At step 512, the AP 120 retries transmitting the same unicast packet to the destination using the alternate antenna. The AP 120 listens for an acknowledgement packet from the destination on its alternate antenna. At step 514, the HSU 330 hardware determines whether the packet was successfully transmitted to the destination.

Again, if an acknowledgement packet is received on the alternate antenna from the destination, then the transmission is successful, and processing advances to the entry point B of the portion 550 of the decision structure 500.

If no acknowledgement packet is received on the alternate antenna, then the transmission is not successful, and processing advances to step 516. At step 516, the variable COUNTER1 is incremented by one, and at this point the variable COUNTER1 is equal to four. At step 518, the HSU 330 hardware determines whether the variable COUNTER1 is equal to the stored value VALUE2.

Again assuming that the stored VALUE2 is equal to four, the variable COUNTER1 is now equal to the stored value VALUE1 and processing advances to step 520. At step 520, the HSU 330 aborts transmission and sends the packet back to the HSU 330 software. Preferably, the packet is resent later at a lower data rate specified in the field value XmitRate. Processing returns to the entry point A of the portion 550 of the decision structure 500.

It will be evident to one skilled in the art how to extend the principles described in FIGS. 4 and 5 to accommodate more antennas, more overall retries of the same unicast packet, more consecutive retries of the same unicast packet on the same antenna, and alternations between antennas and back again.

The exemplary decision structure 500 is described above with regard to handling of unicast packets, acknowledgement packets, broadcast packets, and multicast packets by the AP 120. Preferably, the exemplary decision structure 500 can be extended to support RTS/CTS/unicast packet/acknowledgement exchanges. For example, at step 524 in FIG. 5, the default antenna listens for packets. If an RTS packet is received successfully by the AP 120 on its am default antenna, at steps 526 and 538, processing eventually advances to step 536 in FIG. 4, where the AP 120 sends a CTS packet on its default antenna to the destination that sent the RTS packet. At step 524 in FIG. 5, the AP 120 resumes listening on its default antenna for the unicast packet from the destination in response to the CTS packet. If, as expected, the unicast packet is received successfully by the AP 120 at step 538, processing eventually advances to step 536 in FIG. 4, where the AP 120 sends an acknowledgement packet on its default antenna to the destination that sent the unicast packet and that first sent the RTS packet. Preferably, the AP 120 maintains the same antenna is maintained as the default antenna throughout the RTS/CTS/unicast packet/acknowledgement exchange.

Similarly, the AP 120 transmits an RTS packet like a unicast packet, using transmit diversity on the RTS packet if necessary. The AP 120 preferably maintains the same antenna that successfully transmitted the RTS packet, i.e., the default antenna or the alternate antenna, throughout the RTS/CTS/unicast packet/acknowledgement exchange.

Mobile Stations In An Access Point Network: Exemplary Decision Structure

Figure 6:
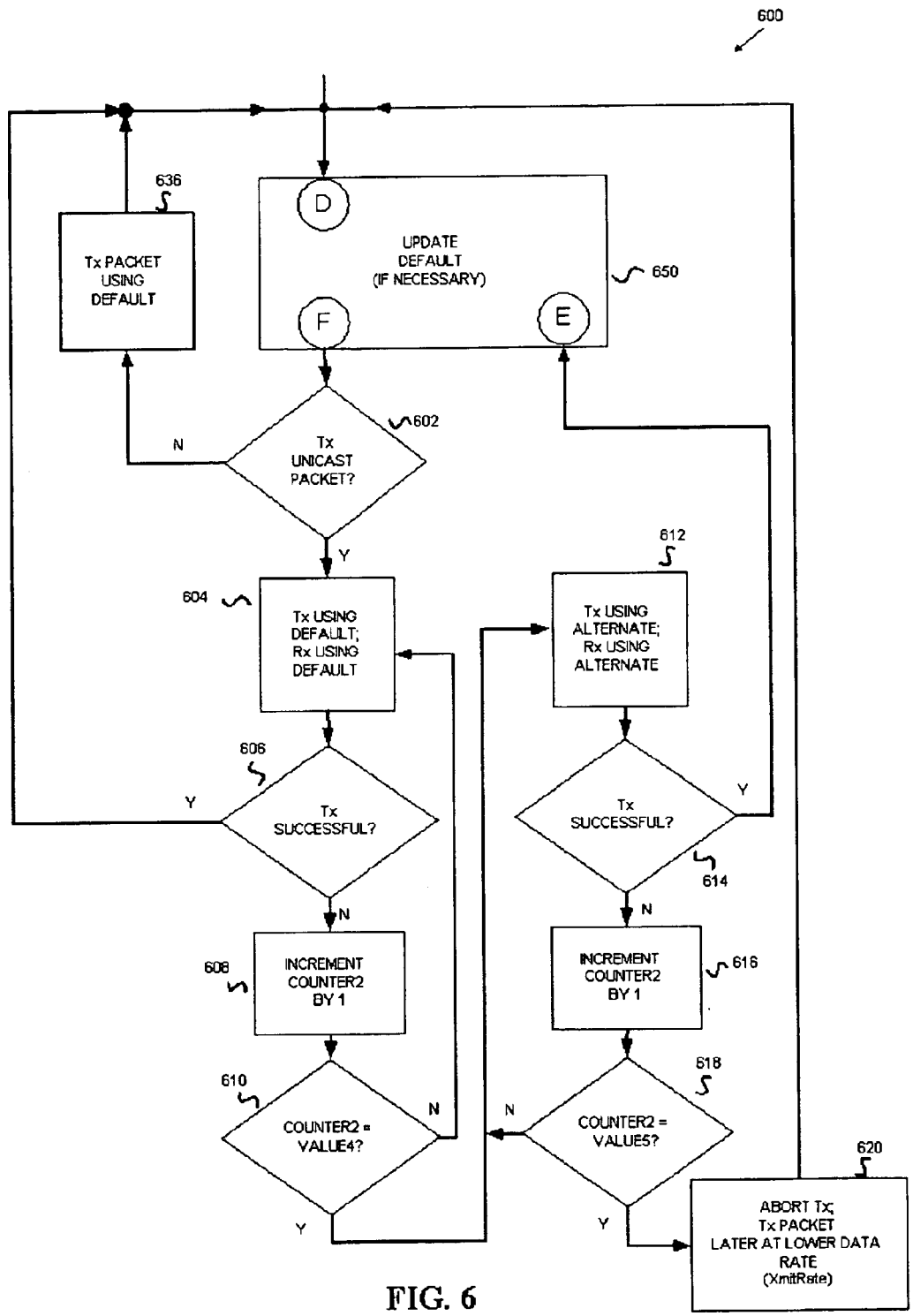
FIG. 6 is a flow diagram illustrating a second exemplary antenna switch diversity decision structure according to a presently preferred embodiment and implemented on a mobile station in a wireless network that includes an access point.
Figure 7:
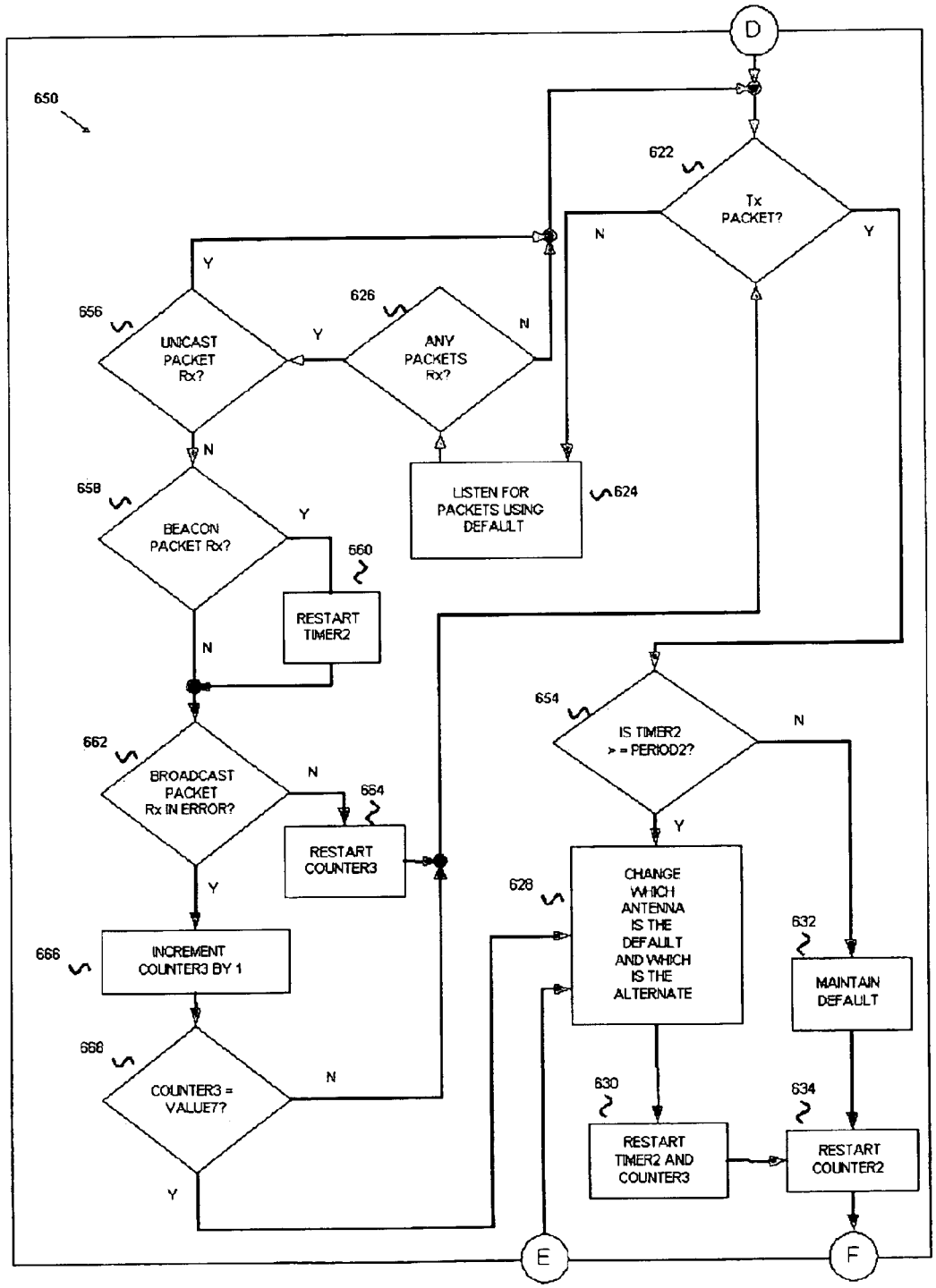
FIG. 7 is a flow diagram illustrating a portion of the second exemplary antenna switch diversity decision structure of FIG. 6.

The operation of the transmission device 300, here the mobile station STA 1 110 of FIG. 1, is now described in more detail with reference to FIGS. 6 and 7. FIG. 6 is a flow diagram illustrating a second exemplary antenna switch diversity decision structure 600 according to a presently preferred embodiment and implemented on the mobile station STA 1 110 of the AP 120 network of FIG. 1. FIG. 7 is a flow diagram illustrating a portion 650 of the second exemplary antenna switch diversity decision structure 600 of FIG. 6. The decision structure 600 of FIGS. 6 and 7 covers the fundamental antenna switch diversity situation for the mobile station 110 as well as the other mobile stations 112, . . . , 116 of FIG. 1.

Preferably, every packet to be queued for the T/R 310 includes fields in one or more corresponding transmit descriptors to be utilized by the HSU 330 in processing packets according to the decision structure 600 of FIGS. 6 and 7. Similarly, preferably every received packet to be processed by the HSU 330 includes fields in one or more corresponding receive transmit descriptors. The transmit or receive descriptors are preferably updated to report completion status information.

Referring to FIGS. 6 and 7, a packet begins processing at the entry point D of the portion 650 of the decision structure 600. At step 622 in FIG. 7, the HSU 330 on the mobile station 110 determines whether a packet is to be sent (Tx). Implicitly, the HSU 330 also asks whether the mobile station 110 should send an acknowledgement packet in response to a received unicast packet.

If there is no packet to be transmitted, then at step 624 the mobile station 110 waits and listens for packets using the antenna that is designated as the default antenna. At step 626, the HSU 330 determines whether the mobile station 110 has received (Rx) any packets.

If no packets have been received, then processing returns to step 622.

If any packet has been received, then at step 656 the HSU 330 determines whether a unicast packet has been received, that is, whether the received packet is a unicast packet.

If a unicast packet has been received, then processing returns to step 622. If the unicast packet was received successfully, the mobile station 110 preferably sends an acknowledgement packet to the AP 120 that sent the unicast packet. The acknowledgement packet is sent on the antenna that received the unicast packet, in this case the default antenna.

If a unicast packet has not been received, that is, the received packet is not a unicast packet, then at step 658 the HSU 330 determines whether a beacon broadcast packet has been received, that is, whether the received packet is a beacon broadcast packet.

If the mobile station 110 identifies the received packet as a beacon broadcast packet, then the variable TIMER2 is restarted at step 660 and processing advances to step 662. The variable TIMER2 marks the time since the mobile station 110 received a beacon broadcast packet from the AP 120. The variable TIMER2 is restarted by and begins from the last reception of a beacon broadcast packet by the mobile station 110.

If the received packet is not identified as a beacon broadcast packet, then processing continues to step 662.

At step 662, the HSU 330 determines whether a broadcast packet has been received in error.

If a broadcast packet has not been received in error, that is, the broadcast packet has been received successfully, then at step 664 the variable COUNTER3 is restarted and processing returns to step 622. The variable COUNTER3 counts the number of consecutive broadcast packets received in error by the mobile station 110.

If a broadcast packet has been received in error, then processing advances to step 666. At step 666, the variable COUNTER3 is incremented by one. At step 668, the HSU 330 hardware determines whether the variable COUNTER3 is equal to the stored value VALUE7. The stored value VALUE7 serves as an upper limit on the variable COUNTER3. In a presently preferred embodiment, the stored value VALUE7 is equal to two.

Assume, for example, that a broadcast packet immediately previous to the present broadcast packet was not received in error and therefore that the variable COUNTER3 was previously restarted, at step 664. Then, following step 666, the variable COUNTER3 is equal to one. Assuming that the stored VALUE7 is equal to two, the variable COUNTER3 is not equal to the stored value VALUE7 and processing returns to step 622.

Assume, for example, that a broadcast packet immediately previous to the present broadcast packet was received in error and that therefore the variable COUNTER3 is equal to one prior to the step 666. Then, following step 666, the variable COUNTER3 is equal to two. Assuming that the stored VALUE7 is equal to two, the variable COUNTER3 is equal to the stored value VALUE7. This equality indicates that two consecutive broadcast packets have been received in error by the mobile station 110, and processing advances to step 628.

At step 628, the HSU 330 changes which antenna is designated as the default antenna and which antenna is designated as the alternate antenna. In this instance, the HSU 330 changes the default antenna based on short-term learning by the HSU 330 hardware. At step 630, the variables TIMER2 and COUNTER3 are restarted, since the antenna that is designated as the default has been changed. Processing advances to step 634 where the variable COUNTER2 is restarted. The variable COUNTER2 counts the number of consecutive failed transmissions of the same unicast packet by the mobile station 110. The variable COUNTER2 is brought to a value of zero prior to the mobile station 110 attempting to send a particular unicast packet for the first time.

It should be understood that when the default antenna is changed in step 628 based on short-term learning by the HSU 330 hardware, such as in response to step 666 or the entry point E, the next processing step for the mobile station 110 is not necessarily transmitting a packet. Preferably, in these instances, no packet will be sent and processing will quickly return (not shown) from step 634 to step 622. When the default antenna is changed in step 628 based on long-term learning by the HSU 330 software, such as in response to step 654, it is clear from step 622 that a packet is to be transmitted by the mobile station 110, and processing will continue from step 634 to the exit point F.

Returning to step 622, if there is a packet to be transmitted by the mobile station 110, then processing advances to step 654. At step 654, the HSU 330 software determines whether the variable TIMER2 is greater than or equal to the stored value PERIOD2. Preferably, the stored value PERIOD2 is on the order of milliseconds, although any suitable time may be used. In a presently preferred embodiment, the stored value PERIOD2 is 10 milliseconds.

If the variable TIMER2 is less than the stored value PERIOD2, then processing continues to step 632. At step 632, the antenna that is designated as the default antenna is maintained as the default antenna and processing advances to step 634 where the variable COUNTER2 is restarted, and to the exit point F.

If the variable TIMER2 is greater than or equal to the stored value PERIOD2, then at step 628 the HSU 330 changes which antenna is designated as the default antenna and which antenna is designated as the alternate antenna. In this instance, the HSU 330 changes the default antenna based on long-term learning by the HSU 330 software. At step 630, the variables TIMER2 and COUNTER3 are restarted and processing continues to step 634 where the variable COUNTER2 is restarted, and to the exit point F.

Processing exits at the exit point F of the portion 650 of the decision structure 600 and advances to step 602 in FIG. 6, where the HSU 330 determines whether the packet to be sent is a unicast packet.

If the packet to be sent is not a unicast packet, then the packet is an acknowledgement packet, and processing advances to step 636. The mobile station 110 does not send broadcast or multicast packets. At step 636, the acknowledgement packet is sent on the default antenna. Processing returns to the entry point D of the portion 650 of the decision structure 600. An acknowledgement packet is sent to the AP 120 but does not need to be acknowledged by the AP 120.

If the packet to be sent is a unicast packet, then processing advances to step 604, where the unicast packet is sent to the AP 120, using the antenna that is designated as the default antenna. The mobile station 110 listens for an acknowledgement packet from the AP 120 on its default antenna. At step 606, the HSU 330 hardware determines whether the packet was successfully transmitted to the AP 120.

If an acknowledgement packet is received on the default antenna from the AP 120, then the transmission is successful and the mobile station 110 maintains the current default antenna. Processing advances to the entry point D of the portion 650 of the decision structure 600.

If no acknowledgement packet is received on the default antenna, then the transmission is not successful, and processing advances to step 608. At step 608, the variable COUNTER2 is incremented by one. At this point the variable COUNTER2 is equal to one since the variable COUNTER2 was restarted at step 634. At step 610, the HSU 330 hardware determines whether the variable COUNTER2 is equal to the stored value VALUE4. The stored value VALUE4 serves as the maximum number of consecutive retries of the same unicast packet on a given antenna, in this case the default antenna. In a presently preferred embodiment, the stored value VALUE4 is equal to two.

Assuming that the stored VALUE4 is equal to two, the variable COUNTER2 is not equal to the stored value VALUE4 and processing returns to step 604. At step 604, the mobile station 110 retries transmitting the same unicast packet to the AP 120 using the default antenna. The mobile station 110 listens for an acknowledgement packet from the AP 120 on its default antenna. At step 606, the HSU 330 hardware determines whether the packet was successfully transmitted to the AP 120.

Again, if an acknowledgement packet is received on the default antenna from the AP 120, then the transmission is successful, the current default antenna is maintained, and processing advances to the entry point D of the portion 650 of the decision structure 600.

If no acknowledgement packet is received on the default antenna, then the transmission is not successful, and processing advances to step 608. At step 608, the variable COUNTER2 is incremented by one, and at this point the variable COUNTER2 is equal to two. At step 610, the HSU 330 hardware determines whether the variable COUNTER2 is equal to the stored value VALUE4.

Again assuming that the stored VALUE4 is equal to two, the variable COUNTER2 is now equal to the stored value VALUE4 and processing advances to step PERIOD 612. At step 612, the same unicast packet is sent to the AP 120 using the antenna that is designated as the alternate antenna. That is, the transmit antenna is changed from the default antenna to the alternate antenna. The mobile station 110 listens for an acknowledgement packet from the AP 120 on the alternate antenna. At step 614, the HSU 330 hardware determines whether the packet was successfully transmitted to the AP 120.

If an acknowledgement packet is received on the alternate antenna from the AP 120, then the transmission is successful, and the antenna that is designated as the alternate antenna is the most recently successful antenna in transmission and reception. Processing advances to the entry point E of the portion 650 of the decision structure 600, and continues to step 628. At step 628, the HSU 330 changes which antenna is designated as the default antenna and which antenna is designated as the alternate antenna. In this instance, the HSU 330 changes the default antenna based on short-term learning by the HSU 330 hardware. At step 630, the variables TIMER2 and COUNTER3 are restarted and processing continues to step 634 where the variable COUNTER2 is restarted. As described above, preferably, in this instance, no packet will be sent and processing will quickly return (not shown) from step 634 to step 622.

If no acknowledgement packet is received on the alternate antenna, then the transmission is not successful, and processing advances to step 616. At step 616, the variable COUNTER2 is incremented by one. At this point the variable COUNTER2 is equal to three. At step 618, the HSU 330 hardware determines whether the variable COUNTER2 is equal to the stored value VALUE5. The stored value VALUE5 serves as the overall maximum number of retries of the same unicast packet on all antennas and also serves as an upper limit on the variable COUNTER2. In a presently preferred embodiment, the stored value VALUE5 is equal to four.

Assuming that the stored VALUE5 is equal to four, the variable COUNTER2 is not equal to the stored value VALUE5 and processing returns to step 612. At step 612, the mobile station 110 retries transmitting the same unicast packet to the AP 120 using the alternate antenna. The mobile station 110 listens for an acknowledgement packet from the AP 120 on its alternate antenna. At step 614, the HSU 330 hardware determines whether the packet was successfully transmitted to the AP 120.

Again, if an acknowledgement packet is received on the alternate antenna from the AP 120, then the transmission is successful, and processing advances to the entry point E of the portion 650 of the decision structure 600, and continues to step 628. At step 628, the HSU 330 changes which antenna is designated as the default antenna and which antenna is designated as the alternate antenna. In this instance, the HSU 330 changes the default antenna based on short-term learning by the HSU 330 hardware. At step 630, the variables TIMER2 and COUNTER3 are restarted and processing continues to step 634 where the variable COUNTER2 is restarted. As described above, preferably, in this instance, no packet will be sent and processing will quickly return (not shown) from step 634 to step 622.

If no acknowledgement packet is received on the alternate antenna, then the transmission is not successful, and processing advances to step 616. At step 616, the variable COUNTER2 is incremented by one, and at this point the variable COUNTER2 is equal to four. At step 618, the HSU 330 hardware determines whether the variable COUNTER2 is equal to the stored value VALUE5.

Again assuming that the stored VALUE5 is equal to four, the variable COUNTER2 is now equal to the stored value VALUE4 and processing advances to step 620. At step 620, the HSU 330 aborts transmission and sends the packet back to the HSU 330 software. Preferably, the packet is resent later at a lower data rate specified in the field value XmitRate. Processing returns to the entry point D of the portion 650 of the decision structure 600.

It will be evident to one skilled in the art how to extend the principles described in FIGS. 6 and 7 to accommodate more antennas, more overall retries of the same unicast packet, more consecutive retries of the same unicast packet on the same antenna, and alternations between antennas and back again.

The exemplary decision structure 600 is described above with regard to handling of unicast packets, acknowledgement packets, broadcast packets, and multicast packets by the mobile station 110. Preferably, the exemplary decision structure 600 can be extended to support RTS/CTS/unicast packet/acknowledgement exchanges. For example, at step 624 in FIG. 7, the default antenna listens for packets. If an RTS packet is received successfully by the mobile station 110 on its default antenna, at steps 626 and 656, processing eventually advances to step 636 in FIG. 6, where the mobile station 110 sends a CTS packet on its default antenna to the AP 120 that sent the RTS packet. At step 624 in FIG. 7, the mobile station 110 resumes listening on its default antenna for the unicast packet from the AP 120 in response to the CTS packet. If, as expected, the unicast packet is received successfully by the mobile station 110 at steps 626 and 656, processing eventually advances to step 636 in FIG. 6, where the mobile station 110 sends an acknowledgement packet on its default antenna to the AP 120 that sent the unicast packet and that first sent the RTS packet. Preferably, the mobile station 110 maintains the same antenna is maintained as the default antenna throughout the RTS/CTS/unicast packet/acknowledgement exchange.

Similarly, the mobile station 110 transmits an RTS packet like a unicast packet, using transmit diversity on the RTS packet if necessary. The mobile station 110 preferably maintains the same antenna that successfully transmitted the RTS packet, i.e., the default antenna or the alternate antenna, throughout the RTS/CTS/unicast packet/acknowledgement exchange.

Mobile Stations In An Ad Hoc Network: Exemplary Decision Structure

Figure 8:
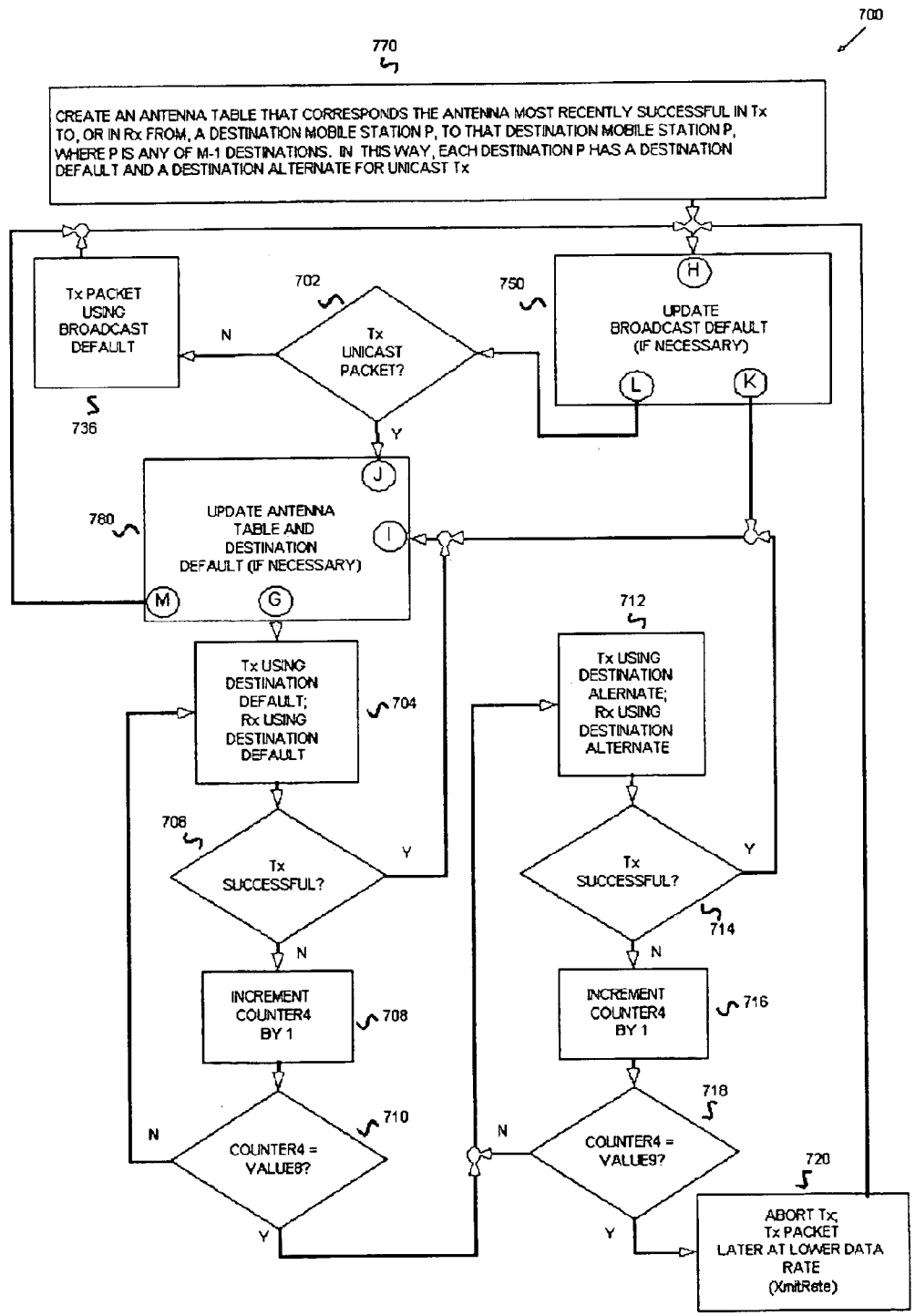
FIG. 8 is a flow diagram illustrating a third exemplary antenna switch diversity decision structure according to a presently preferred embodiment and implemented on a mobile station in a wireless ad hoc network.
Figure 9:
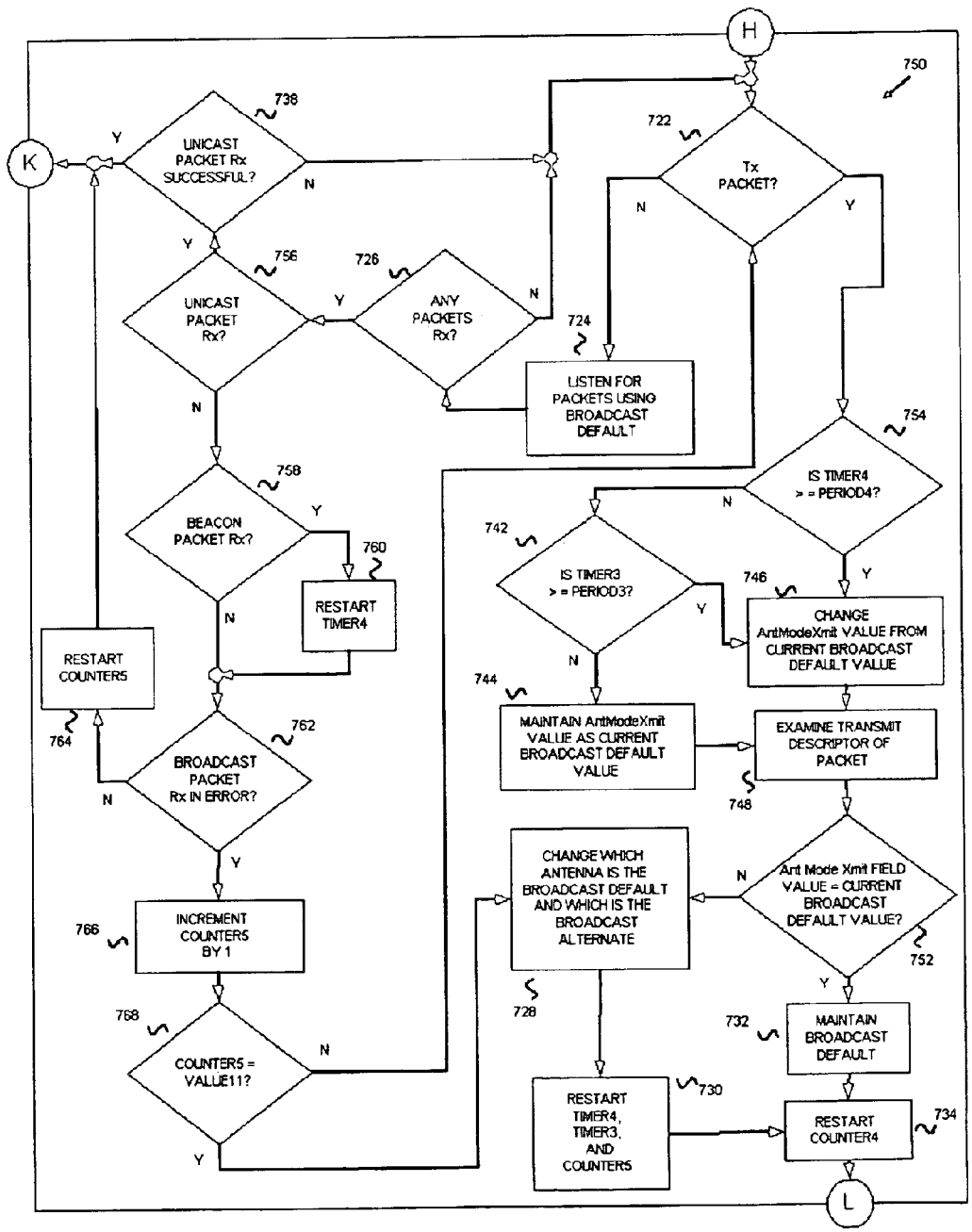
FIG. 9 is a flow diagram illustrating a portion of the third exemplary antenna switch diversity decision structure of FIG. 8.
Figure 10:
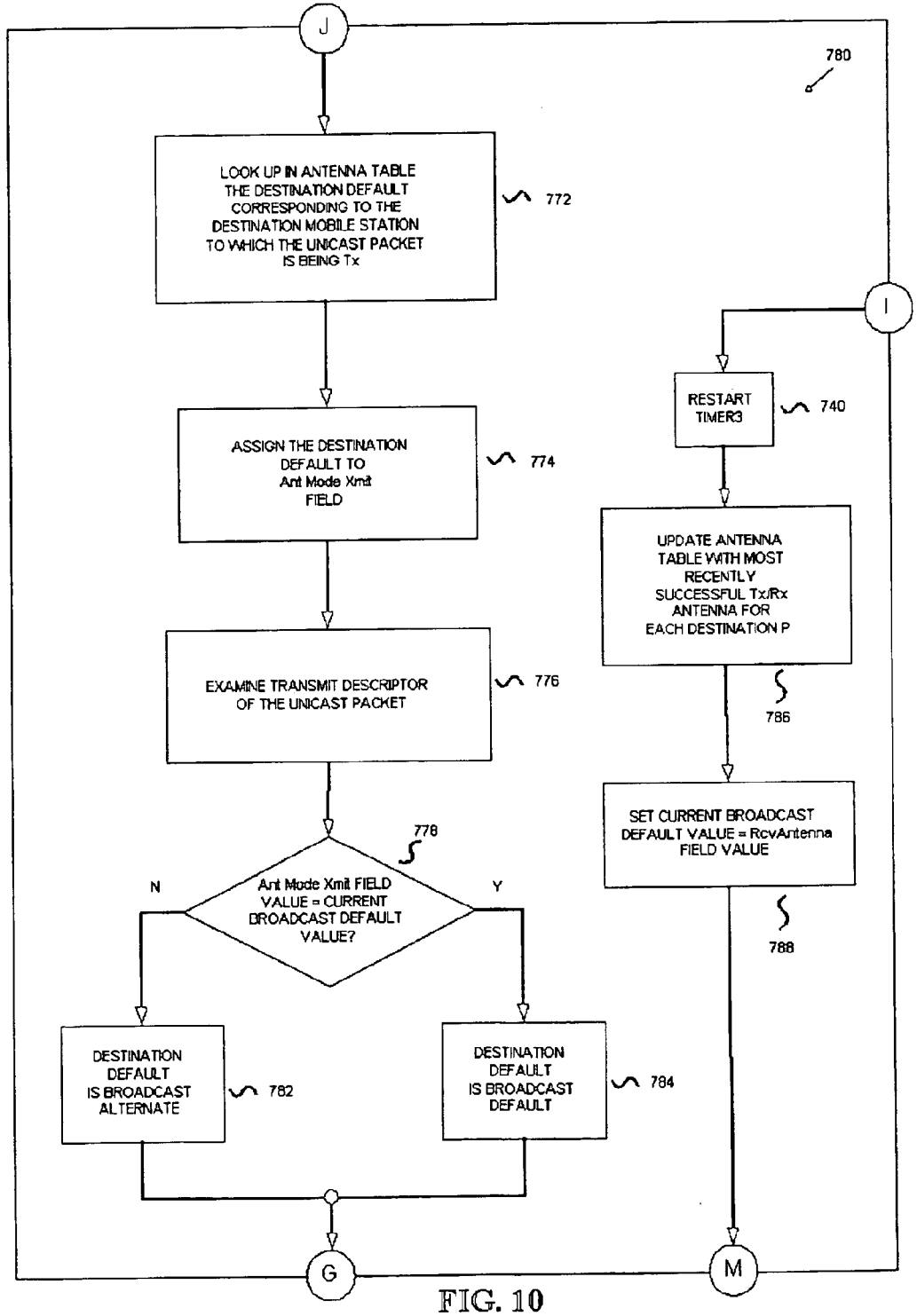
FIG. 10 is a flow diagram illustrating another portion of the third exemplary antenna switch diversity decision structure of FIG. 8.

The operation of the transmission device 300, here the ad hoc mode mobile station STA 1 210 of FIG. 2, is now described in more detail with reference to FIGS. 8–10. FIG. 8 is a flow diagram illustrating a third exemplary antenna switch diversity decision structure 700 according to a presently preferred embodiment and implemented on the mobile station STA 1 210 of the ad hoc network of FIG. 2. FIG. 9 is a flow diagram illustrating a portion 750 of the third exemplary antenna switch diversity decision structure 700 of FIG. 8. FIG. 10 is a flow diagram illustrating another portion 780 of the third exemplary antenna switch diversity decision structure 700 of FIG. 8. The decision structure 700 of FIGS. 8–10 covers the fundamental antenna switch diversity situation for the mobile stations 210 as well as the other mobile stations 212, . . . , 216 of FIG. 2.

Preferably, every packet to be queued for the T/R 310 includes fields in one or more corresponding transmit descriptors to be utilized by the HSU 330 in processing packets according to the decision structure 700 of FIGS. 8–10. Similarly, preferably every received packet to be processed by the HSU 330 includes fields in one or more corresponding receive transmit descriptors. The transmit or receive descriptors are preferably updated to report completion status information.

Referring to FIG. 8, at step 770, the HSU 330 creates the antenna table 370 that corresponds the antenna most recently successful in transmission to, or in reception from, a destination mobile station P, to that destination mobile station P. In a preferred embodiment, the HSU 330 software creates the antenna table 370. In the system 100, there are M ad hoc mode mobile stations 210, . . . , 216. The destination mobile station P preferably represents one mobile station of any of M−1 destination mobile stations. In this way, each destination P has a corresponding destination default antenna and a destination alternate antenna for unicast packet transmission to that destination P. For example, from the perspective of an antenna table 370 on the mobile stations 210, there are M−1 destination mobile stations 212, . . . , 216.

Referring to FIGS. 8–10, a packet begins processing at the entry point H of the portion 750 of the decision structure 700. At step 722 in FIG. 9, the HSU 330 on the ad hoc mode mobile stations 210 determines whether a packet is to be sent (Tx). Implicitly, the HSU 330 also asks whether the mobile stations 210 should send an acknowledgement packet in response to a received unicast packet.

If there is no packet to be transmitted, then at step 724 the mobile stations 210 waits and listens for packets using the antenna that is designated as the broadcast default antenna. At step 726, the HSU 330 determines whether the mobile stations 210 has received (Rx) any packets.

If no packets have been received, then processing returns to step 722.

If any packet has been received, then at step 756 the HSU 330 determines whether a unicast packet has been received, that is, whether the received packet is a unicast packet.

If a unicast packet has been received, then at step 738, the HSU 330 determines whether the unicast packet was received successfully.

If the unicast packet was received, but not received successfully, then processing returns aft to step 722.

If a unicast packet was received successfully, then processing advances to the exit point K of the portion 750, and continues to the entry point I of the portion 780 of the decision structure 700, and to step 740 in FIG. 10. The mobile stations 210 preferably sends an acknowledgement packet to the mobile station of the mobile stations 212, . . . , 216 that sent the successfully received unicast packet. The acknowledgement packet is sent on the antenna that received the unicast packet, in this case the broadcast default antenna.

At step 740 in FIG. 10, the variable TIMER3 is restarted and processing advances to step 786. The variable TIMER3 marks the time since the mobile stations 210 received any packet successfully from the mobile stations 212, . . . , 216. The variable TIMER3 is restarted by and begins from the last successful reception of any packet by the mobile stations 210.

At step 786, the HSU 330 software updates the antenna table 370 with the most recently successful transmit or receive antenna for each destination P, and processing advances to step 788. In this case, a unicast packet was successfully received, for example, from the destination mobile station 212, and the HSU 330 software updates the antenna table 370 so that the destination default antenna for the destination mobile station 212 will be the antenna that successfully received the unicast packet, that is, in this case the broadcast default antenna.

At step 788, the HSU 330 sets the current value of the broadcast default antenna equal to the value of the RcvAntenna completion status field in the successfully received packet. Preferably, the RcvAntenna field of a received packet indicates the antenna that the packet was received on, regardless of whether the packet was received successfully. In this case, it is already been confirmed at step 738 that the unicast packet was received successfully on the antenna that was designated as the broadcast default antenna, and the broadcast default antenna is maintained. Processing advances to the exit point M of the portion 750, and continues to the entry point H of the decision structure 700, and to step 722 of FIG. 9. Eventually processing continues to step 736, at which point an acknowledgement packet is sent on the broadcast default antenna to the mobile station, for example, the mobile station 212, that sent the successfully received unicast packet.

Returning to step 756, if a unicast packet has not been received, that is, the received packet is not a unicast packet, then at step 758 the HSU 330 determines whether a beacon broadcast packet has been received, that is, whether the received packet is a beacon broadcast packet.

If the mobile stations 210 identifies the received packet as a beacon broadcast packet, then the variable TIMER4 is restarted at step 760 and processing advances to step 762. The variable TIMER4 marks the time since the mobile stations 210 received a beacon broadcast packet from one of the mobile stations 212, . . . , 210. The variable TIMER4 is restarted by and begins from the last reception of a beacon broadcast packet by the mobile stations 210.

If the received packet is not identified as a beacon broadcast packet, then processing continues to step 762.

At step 762, the HSU 330 determines whether a broadcast packet has been received in error.

If a broadcast packet has not been received in error, that is, the broadcast packet has been received successfully, then at step 764 the variable COUNTER5 is restarted and processing preferably advances to the exit point K of the portion 750, and continues to the entry point I of the portion 780 of the decision structure 700, and to step 740 in FIG. 10. The variable COUNTER5 counts the number of consecutive broadcast packets received in error by the mobile stations 210. The ad hoc mobile stations 210 does not acknowledge broadcast packets and multicast packets.

At step 740 in FIG. 10, the variable TIMER3 is restarted and processing advances to step 786.

At step 786, the HSU 330 software updates the antenna table 370 with the most recently successful transmit or receive antenna for each destination P, and processing advances to step 788. In this case, a broadcast (or a multicast) packet was successfully received, for example, from the destination mobile station 214, and the HSU 330 software updates the antenna table 370 so that the destination default antenna for the destination mobile station 214 will be the antenna that successfully received the broadcast packet, that is, in this case the broadcast default antenna.

In other embodiments, the processing advances directly from step 764 to step 722 rather than to the exit point K of the portion 750 and the HSU 330 does not update the antenna table 370. For example, the mobile stations 210 might not know the source of the broadcast packet.

At step 788, the HSU 330 sets the current value of the broadcast default antenna equal to the value of the RcvAntenna completion status field in the successfully received packet. In this case, it is already been confirmed at step 762 that the broadcast packet was received successfully on the antenna that was designated as the broadcast default antenna, and the broadcast default antenna is maintained. Processing advances to the exit point M of the portion 750, and continues to the entry point H of the decision structure 700, and to step 722 of FIG. 9.

Returning to step 762, if a broadcast packet has been received in error, then processing advances to step 766. At step 766, the variable COUNTER5 is incremented by one. At step 768, the HSU 330 hardware determines whether the variable COUNTER5 is equal to the stored value VALUE11. The stored value VALUE11 serves as an upper limit on the variable COUNTER5. In a presently preferred embodiment, the stored value VALUE11 is equal to two.

Assume, for example, that a broadcast packet immediately previous to the present broadcast packet was not received in error and therefore that the variable COUNTER5 was previously restarted, at step 764. Then, following step 766, the variable COUNTER5 is equal to one. Assuming that the stored VALUE11 is equal to two, the variable COUNTER5 is not equal to the stored value VALUE11 and processing returns to step 722.

Assume, for example, that a broadcast packet immediately previous to the present broadcast packet was received in error and that therefore the variable COUNTER5 is equal to one prior to the step 766. Then, following step 766, the variable COUNTER5 is equal to two. Assuming that the stored VALUE11 is equal to two, the variable COUNTER5 is equal to the stored value VALUE11. This equality indicates that two consecutive broadcast packets have been received in error by the mobile stations 210, and processing advances to step 728.

At step 728, the HSU 330 changes which antenna is designated as the broadcast default antenna and which antenna is designated as the broadcast alternate antenna. In this instance, the HSU 330 changes the broadcast default antenna based on short-term learning by the HSU 330 hardware. At step 730, the variables TIMER3, TIMER4, and COUNTER5 are restarted, since the antenna that is designated as the broadcast default has been changed. Processing advances to step 734 where the variable COUNTER4 is restarted. The variable COUNTER4 counts the number of consecutive failed transmissions of the same unicast packet by the mobile stations 210. The variable COUNTER4 is brought to a value of zero prior to the mobile stations 210 attempting to send a particular unicast packet for the first time.

It should be understood that when the broadcast default antenna is changed in step 728 based on short-term learning by the HSU 330 hardware, such as in response to step 766, the next processing step for the mobile stations 210 is not necessarily transmitting a packet. Preferably, in these instances, no packet will be sent and processing will quickly return (not shown) from step 734 to step 722. When the broadcast default antenna is changed in step 728 based on long-term learning by the HSU 330 software, such as in response to steps 742 and 754, it is clear from step 722 that a packet is to be transmitted by the mobile stations 210, and processing will continue from step 734 to the exit point L.

Returning to step 722, if there is a packet to be transmitted by the mobile stations 210, then processing advances to step 754. At step 754, the HSU 330 software determines whether the variable TIMER4 is greater than or equal to the stored value PERIOD4. Preferably, the stored value PERIOD4 is on the order of milliseconds, although any suitable time may be used. In a presently preferred embodiment, the stored value PERIOD4 is 10 milliseconds.

If the variable TIMER4 is less than the stored value PERIOD4, then processing continues to step 742. At step 742, the HSU 330 software determines whether the variable TIMER3 is greater than or equal to the stored value PERIOD3. Preferably, the stored value PERIOD3 is on the order of hundreds of milliseconds, although any suitable time may be used.

If the variable TIMER3 is less than the stored value PERIOD3, then at step 744 the field value AntModeXmit in the transmit descriptor of the packet to be transmitted is maintained as the current value of the broadcast default antenna and processing advances to step 748. The AntModeXmit field for a packet to a particular destination is used to identify the transmit antenna that is used to send the packet to the destination.

At step 748, the HSU 330 hardware examines the transmit descriptor of the packet to be sent by the mobile stations 210 and processing advances to step 752. At step PERIOD 752, the HSU 330 hardware determines whether the field value AntModeXmit is equal to the current broadcast default antenna value. Since the field value AntModeXmit was maintained as the current broadcast default antenna value at step 744, processing continues to step 732. At step 732, the antenna that is designated as the broadcast default antenna is maintained as the broadcast default antenna and processing advances to step 734 where the variable COUNTER4 is restarted. Processing continues to the exit point L of the portion 750 of the decision structure 700.

Returning to step 742, if the variable TIMER3 is greater than or equal to the stored value PERIOD3, then at step 746 the field value AntModeXmit in the transmit descriptor of the packet to be transmitted is changed from the current value of the broadcast default antenna and processing advances to step 748.

Returning to step 754, if the variable TIMER4 is greater than or equal to the stored value PERIOD4, then at step 746 the field value AntModeXmit in the transmit descriptor of the packet to be transmitted is changed from the current value of the broadcast default antenna and processing advances to step 748.

At step 748, the HSU 330 hardware examines the transmit descriptor of the packet to be sent by the mobile stations 210 and processing advances to step 752. At step PERIOD 752, the HSU 330 hardware determines whether the field value AntModeXmit is equal to the current broadcast default antenna value. Since the field value AntModeXmit was changed from the current broadcast default antenna value at step 746, processing continues to step 728. At step 728, the HSU 330 hardware changes which antenna is designated as the broadcast default antenna and which antenna is designated as the broadcast alternate antenna. In this instance, the HSU 330 changes the broadcast default antenna based on long-term learning by the HSU 330 software. At step 730, the variables TIMER3, TIMER4, and COUNTER5 are restarted, since the antenna that is designated as the broadcast default has been changed. Processing continues to step 734 where the variable COUNTER4 is restarted, and to the exit point L.

Processing exits at the exit point L of the portion 750 of the decision structure 700 and advances to step 702 in FIG. 8, where the HSU 330 determines whether the packet to be sent is a unicast packet.

If the packet to be sent is not a unicast packet, then the packet is a broadcast packet, a multicast packet, or an acknowledgement packet, and processing advances to step 736. At step 736, the broadcast packet, multicast packet, or acknowledgement packet is sent on the broadcast default antenna. Processing returns to the entry point H of the portion 750 of the decision structure 700. An acknowledgement packet is sent to one destination but does not need to be acknowledged by the destination.

If the packet to be sent is a unicast packet, then processing advances to the entry point J of the portion 780 of the decision structure 700 and continues to step 772 of FIG. 10.

At step 772, the HSU 330 software accesses the antenna table 370 and looks up the destination default antenna value, i.e. the value of the antenna most recently successful in transmission or reception, corresponding to the destination mobile station P to which the unicast packet is being sent, for example, the mobile station 212, and processing continues to step 774.

At step 774, the HSU 330 software assigns the destination default antenna value to the AntModeXmit field in the transmit descriptor of the unicast packet, and processing continues to step 776.

At step 776, the HSU 330 hardware examines the transmit descriptor of the unicast packet to be sent by the mobile stations 210 and processing advances to step 778. At step 778, the HSU 330 hardware determines whether the field value AntModeXmit is equal to the current broadcast default antenna value.

If the field value AntModeXmit is not equal to the current broadcast default antenna value, processing continues to step 782. At step 782, the destination default antenna for the destination mobile station 212 is the antenna that is currently designated as the broadcast alternate antenna, and processing advances to the exit point G of the portion 780 of the decision structure 700, and to step 704 of FIG. 8.

If the field value AntModeXmit is equal to the current broadcast default antenna value, processing continues to step 784. At step 784, the destination default antenna for the destination mobile station 212 is the antenna that is currently designated as the broadcast default antenna, and processing advances to the exit point G of the portion 780 of the decision structure 700, and to step 704 of FIG. 8.

At step 704, the unicast packet is sent to, according to the example, the destination mobile station 212, using the antenna that is designated as the destination default antenna for the mobile station 212. The mobile station 210 listens for an acknowledgement packet from the destination on the destination default antenna. At step 706, the HSU 330 hardware determines whether the packet was successfully transmitted to the destination.

If an acknowledgement packet is received on the destination default antenna from the destination, then the transmission is successful and the processing advances to the entry point I of the portion 780 of the decision structure 700 and continues to step 740, where the variable TIMER3 is restarted. At step 786, the HSU 330 software updates the antenna table 370 and at step 788 sets the current value of the broadcast default antenna to the destination default antenna corresponding to the mobile station 212, that is, the antenna that successfully received the acknowledgement packet from the mobile station 212 as indicated by the RcvAntenna field value of the acknowledgement packet. In this way, the HSU 330 has effectively maintained the current destination default antenna for the mobile station 212. Processing advances to the exit point M of the portion 780, and continues to the entry point H of the portion 750 of the decision structure 700, and to the step 722.

Returning to step 708, If no acknowledgement packet is received on the destination default antenna, then the transmission is not successful, and processing advances to step 708. At step 708, the variable COUNTER4 is incremented by one. At this point the variable COUNTER4 is equal to one since the variable COUNTER4 was restarted at step 734. At step 710, the HSU 330 hardware determines whether the variable COUNTER4 is equal to the stored value VALUE8. The stored value VALUE8 serves as the maximum number of consecutive retries of the same unicast packet on a given antenna, in this case the destination default antenna. In a presently preferred embodiment, the stored value VALUE8 is equal to two.

Assuming that the stored VALUE8 is equal to two, the variable COUNTER4 is not equal At to the stored value VALUE8 and processing returns to step 704. At step 704, the mobile station 210 retries transmitting the same unicast packet to the destination mobile station 212 using the destination default antenna. The mobile station 210 listens for an acknowledgement packet from the destination on the destination default antenna. At step 706, the HSU 330 hardware determines whether the packet was successfully transmitted to the destination.

Again, if an acknowledgement packet is received on the destination default antenna from the destination, then the transmission is successful and the processing advances to the entry point I of the portion 780 of the decision structure 700 and continues to step 740, where the variable TIMER3 is restarted. At step 786, the HSU 330 software updates the antenna table 370 and at step 788 sets the current value of the broadcast default antenna to the destination default antenna corresponding to the mobile station 212, that is, the antenna that successfully received the acknowledgement packet from the mobile station 212 as indicated by the RcvAntenna field value of the acknowledgement packet. In this way, the HSU 330 has effectively maintained the current destination default antenna for the mobile station 212. Processing advances to the exit point M of the portion 780, and continues to the entry point H of the portion 750 of the decision structure 700, and to the step 722.

Returning to step 708, if no acknowledgement packet is received on the destination default antenna, then the transmission is not successful, and processing advances to step 708. At step 708, the variable COUNTER4 is incremented by one, and at this point the variable COUNTER4 is equal to two. At step 710, the HSU 330 hardware determines whether the variable COUNTER4 is equal to the stored value 8.

Again assuming that the stored VALUE8 is equal to two, the variable COUNTER4 is now equal to the stored value VALUE8 and processing advances to step 712. At step 712, the same unicast packet is sent to, according to the example, the destination mobile station 212, using the antenna that is designated as the destination alternate antenna for the mobile station 212. That is, the transmit antenna is changed from the destination default antenna to the alternate default antenna. The mobile station 210 listens for an acknowledgement packet from the destination on the destination alternate antenna. At step 714, the HSU 330 hardware determines whether the packet was successfully transmitted to the destination.

If an acknowledgement packet is received on the destination alternate antenna from the destination mobile station 212, then the transmission is successful, and the antenna that is designated as the destination alternate antenna is the most recently successful antenna in transmission and reception. Processing advances to the entry point I of the portion 780 of the decision structure 700 and continues to step 740, where the variable TIMER3 is restarted. At step 786, the HSU 330 software updates the antenna table 370 with the antenna that is designated as the destination alternate antenna. At step 788 sets the current value of the broadcast default antenna to the destination alternate antenna corresponding to the mobile station 212, that is, the antenna that successfully received the acknowledgement packet from the mobile station 212 as indicated by the RcvAntenna field value of the acknowledgement packet. In this way, the HSU 330 has effectively changed the current destination default antenna for the mobile station 212, and has changed which antenna is designated as the broadcast default antenna and which antenna is designated as the broadcast alternate antenna, based on short-term learning by the HSU 330 hardware. Processing advances to the exit point M of the portion 780, and continues to the entry point H of the portion 750 of the decision structure 700, and to step 722. In a preferred embodiment, the variables TIMER4, COUNTER5, and COUNTER4 are restarted, since the broadcast default antenna has changed.

Returning to step 714, if no acknowledgement packet is received on the destination alternate antenna, then the transmission is not successful, and processing advances to step 716. At step 716, the variable COUNTER4 is incremented by one. At this point the variable COUNTER4 is equal to three. At step 718, the HSU 330 hardware determines whether the variable COUNTER4 is equal to the stored value VALUE9. The stored value VALUE9 serves as the overall maximum number of retries of the same unicast packet on all antennas and also serves as an upper limit on the variable COUNTER4. In a presently preferred embodiment, the stored value VALUE9 is equal to four.

Assuming that the stored VALUE 9 is equal to four, the variable COUNTER4 is not equal to the stored value VALUE9 and processing returns to step 712. At step 712, the mobile station 210 retries transmitting the same unicast packet to the destination mobile station 212 using the destination alternate antenna. The mobile station 210 listens for an acknowledgement packet from the destination on the destination alternate antenna. At step 714, the HSU 330 hardware determines whether the packet was successfully transmitted to the destination.

Again, if an acknowledgement packet is received on the destination alternate antenna from the destination mobile station 212, then the transmission is successful, and the antenna that is designated as the destination alternate antenna is the most recently successful antenna in transmission and reception. Processing advances to the entry point I of the portion 780 of the decision structure 700 and continues to step 740, where the variable TIMER3 is restarted. At step 786, the HSU 330 software updates the antenna table 370 with the antenna that is designated as the destination alternate antenna. At step 788 sets the current value of the broadcast default antenna to the destination alternate antenna corresponding to the mobile station 212, that is, the antenna that successfully received the acknowledgement packet from the mobile station 212 as indicated by the RcvAntenna field value of the acknowledgement packet. In this way, the HSU 330 has effectively changed the current destination default antenna for the mobile station 212, and has changed which antenna is designated as the broadcast default antenna and which antenna is designated as the broadcast alternate antenna, based on short-term learning by the HSU 330 hardware. Processing advances to the exit point M of the portion 780, and continues to the entry point H of the portion 750 of the decision structure 700, and to step 722. In a preferred embodiment, the variables TIMER4, COUNTER5, and COUNTER4 are restarted, since the broadcast default antenna has changed.

Returning to step 714, if no acknowledgement packet is received on the destination alternate antenna, then the transmission is not successful, and processing advances to step 716. At step 716, the variable COUNTER4 is incremented by one, and at this point the variable COUNTER4 is equal to four. At step 718, the HSU 330 hardware determines whether the variable COUNTER4 is equal to the stored value VALUE9.

Again assuming that the stored VALUE9 is equal to four, the variable COUNTER4 is now equal to the stored value VALUE8 and processing advances to step 720. At step 720, the HSU 330 aborts transmission and sends the packet back to the HSU 330 software. Preferably, the packet is resent later at a lower data rate specified in the field value XmitRate. Processing returns to the entry point H of the portion 750 of the decision structure 700.

It will be evident to one skilled in the art how to extend the principles described in FIGS. 8–10 to accommodate more antennas, more overall retries of the same unicast packet, more consecutive retries of the same unicast packet on the same antenna, and alternations between antennas and back again.

The exemplary decision structure 700 is described above with regard to handling of unicast packets, acknowledgement packets, broadcast packets, and multicast packets by the mobile station 210. Preferably, the exemplary decision structure 700 can be extended to support RTS/CTS/unicast packet/acknowledgement exchanges. For example, at step 724 in FIG. 9, the broadcast default antenna listens for packets. If an RTS packet is received successfully by the mobile station 210 on its broadcast default antenna, at step 738, processing eventually advances to step 736 in FIG. 8, where the mobile station 210 sends a CTS packet on its broadcast default antenna to the destination that sent the RTS packet. At step 724 in FIG. 9, the mobile station 210 resumes listening on its broadcast default antenna for the unicast packet from the destination in response to the CTS packet. If, as expected, the unicast packet is received successfully by the mobile station 210 at step 738, processing eventually advances to step 736 in FIG. 8, where the mobile station 210 sends an acknowledgement packet on its broadcast default antenna to the destination that sent the unicast packet and that first sent the RTS packet. Preferably, the mobile station 210 maintains the same antenna is maintained as the broadcast default antenna throughout the RTS/CTS/unicast packet/acknowledgement exchange.

Similarly, the mobile station 210 transmits an RTS packet like a unicast packet, using transmit diversity on the RTS packet if necessary. The mobile station 210 preferably maintains the same antenna that successfully transmitted the RTS packet, i.e., the broadcast default antenna or the broadcast default antenna, throughout the RTS/CTS/unicast packet/acknowledgement exchange.

Algorithm Design Issues

The algorithm preferably implements slow antenna switch diversity. That is, there is insufficient time to test both antennas at the beginning of a single packet as described above. Rather, slow antenna diversity is implemented when sending unicast packets at the transmitter. This is effective for testing the antennas since switching of the transmit antenna and retries of the packet continue until an acknowledgement packet is received and transmission is successful or until a maximum overall number of retries is reached so that transmission is aborted. An acknowledgement packet is only received if transmission is successful to and from the actual intended recipient of the packet.

By contrast, attempting to switch at the receiver based on failed receive packets has several problems. The channel can be so poor that, for example, a mobile station does not even know that packets are being missed. When a packet is missed, it may be difficult to tell if it was from another mobile station or from an AP in an overlapping cell. With slow receive diversity, it is easy for the antenna selection algorithm to get dragged around by nodes that are not even part of the network.

Of course, broadcast (including beacon packets) and multicast packets sent to a destination are not acknowledged by the destination, so slow antenna switch diversity on the transmit side cannot be performed. There is no way to tell if a broadcast packet sent to a destination was successful in reaching the destination or not. For the mobile stations 110, . . . , 116 of the AP 120 system 100 this does not present a problem because these mobile stations 110, . . . , 116 never send broadcast packets. The AP 120 regularly sends broadcast packets that are transmitted only once, from one antenna, and preferably must be received by all the mobile stations 110, . . . , 116 in the system 100. Therefore, a challenge is knowing precisely when a mobile station of the mobile stations 110, . . . , 116, for example STA-1 110, needs to switch its receive antenna in order to receive beacons from the AP 120. The AP 120 is not aware that broadcast packets are being missed.

For the AP 120 to send broadcast packets to the mobile stations 110, . . . , 116 with any degree of success, two path diversity between the AP 120 and any mobile station 110, . . . , 116 must be sufficient. That is, one side can switch its antennas over the short-term and the other side cannot. If more than one of the mobile station 110, . . . , 116 needs three or four path diversity to successfully receive broadcast packets, it becomes increasingly unlikely that all mobile stations are able to hear broadcast messages sent only once from one antenna.

Another issue is that if an exemplary mobile station 110 does not detect failing packets at all, or if the mobile station 110 cannot tell that a broadcast packet was intended for it, or even identify the packet as a broadcast packet, the mobile station 110 would become lost, be unable to change antennas, and would remain lost.

In a presently preferred embodiment, the exemplary mobile station 110 is programmed to become aware that it is lost and to in that event send a unicast packet to the AP 120. The mobile station 110 eventually tries both of its antennas and learns which of its antennas works well with the default receive antenna of the AP 120.

In another preferred embodiment, the AP 120 sends a unicast packet to the exemplary mobile station 110, to request that the mobile station 110 initiate an acknowledgement packet to the AP. In that case, the AP 120 eventually tries transmitting the unicast packet with its second antenna. It is likely that the mobile station 110 receives that packet, and in initiating an acknowledgement packet, the mobile station 110 learns which antenna works for the default receive antenna of the AP 120. Once the mobile station 110 uses the better antenna, the mobile station 110 is likely to be able to receive beacons from the AP 120.

The challenges increase in ad hoc networks such as the system 200 of FIG. 2. The mobile stations 210, . . . , 216 send beacon broadcast packets to one another, but the beacons are sent by a different one of the mobile stations 210, . . . 216 each time. In between beacons, any of the mobile stations 210, . . . , 216 can send packets to any other mobile stations 210, . . . , 216. In the system 100 the AP 120 needs only support one path to each one of the mobile stations 110, . . . , 116. In ad hoc mode, there are so many more paths that need to be supported because the mobile stations 210, . . . , 216 can all send packets to one another, it is unlikely that all required links can be satisfied with just two path diversity between the mobile stations 210, . . . , 216. Even if receive antennas are fixed and the mobile stations 210, . . . , 216 are allowed to learn the best antenna for each mobile station 210, . . . , 216, it is likely that at some of the mobile stations 210, . . . , 216 neither antenna is able to reach all other mobile stations to send beacons.

It will be understood by those skilled in the art that the antenna switch diversity algorithm discussed above for the BSS mode can be readily applied to a system that supports a centrally controlled access mechanism, for example, a polling mechanism. The centrally controlled access mechanism uses, for example, a poll and response protocol to eliminate the possibility of contention for the medium. In such a system, the coordination is controlled by the access point. Generally, mobile stations within the system request that the access point register them on a polling list stored at the access point. The access point then regularly polls the stations for traffic while also delivering traffic to the mobile stations. While support for polling is not required by 802.11 compliant access points, every 802.11 compliant mobile station needs to be able to respond to the operation of an access point that does support a polling mechanism.

As used herein, the term transmission device is used to intended to refer broadly to the means of transmission as well as to the network entity housing the means of transmission and can encompass a variety of other transmission related features. In accordance with the presently preferred embodiments described herein, a transmission device can be, for example, an access point, a mobile station in a wireless network with an access point, or a mobile station in an wireless ad hoc network. The transmission device can be, for example, the transmission device 300 of FIG. 3. The transmission device can be, for example, any of the AP 120 and the mobile stations 110, ..., 116 of the system 100 shown in FIG. 1, or any of the mobile stations 210, ..., 216 of the system 200 shown in FIG. 2. More broadly, a transmission device includes any IEEE 802.11 compliant device. Of course, the transmission device is not limited to wireless devices and wireless protocol and standard compliant devices, and the transmission device can encompass any device as suitable.

As used herein, the term failed transmission is most generally intended broadly to refer to an attempt at transmission of a packet from a first transmission device to one or more other transmission device that, for whatever reason, can be considered a less than acceptable transmission. In a presently preferred embodiment, a failed transmission occurs when the transmission device does not receive an acknowledgement, of receipt of a unicast packet, from a destination transmission device. A unicast packet is a packet that is sent directly to a unique destination and thus requires an acknowledgement. Other examples of failed transmission in other embodiments include instances in which a packet is transmitted from the first transmission device and fails to reach its target destination, or in which a packet reaches its target destination but is deemed by the error checking functionality at the target destination to include errors or to be otherwise unacceptable.

In a presently preferred embodiment, a failed transmission, a failed send, an unsuccessful transmission, or an unsuccessful send of a unicast packet occurs when a transmission device that transmitted or sent the unicast packet to a destination transmission device does not receive a packet that acknowledges receipt of the unicast packet, from the destination transmission device within a short period of time, preferably an allotted period of time, following the transmission attempt or the send. Conversely, a successful transmission or a successful send of a unicast packet occurs when a transmission device that transmitted or sent the unicast packet to a destination transmission device does receive a packet that acknowledges receipt of the unicast packet, from the destination transmission device. In a presently preferred embodiment, broadcast or multicast packets are not acknowledged, therefore is impossible to ascertain whether a transmission or a send was successful or not, except from the perspective of the destination transmission device, in which instance the destination transmission device can be said to successfully receive or to fail to receive a broadcast or a multicast packet (or any packet).

In a presently preferred embodiment, a failed reception occurs when a transmission device either does not receive a packet, i.e., misses a packet, or if a packet is received in error, or with errors. Conversely, a successful reception occurs when a transmission device receives a packet and that packet is received correctly, i.e. with no errors.

As used herein, the term transmit management interface is intended broadly to refer to a combination of hardware and software included with a transmission device and coupled or otherwise interfacing with transmissions means such as a transmitter, or a transmitter/receiver. For example, although in one embodiment the transmit management interface includes the HSU 330 of FIG. 3, other processors, processing arrangements, or software implementations, are possible. The transmit management interface may execute, for example, decision structures to change between antennas, including switching between antennas, in accordance with the methods described herein, such as in FIGS. 4–10, or the interface may utilize antenna switching functionality external to the transmit management interface. The transmit management interface may include an antenna table or may access, update, or select entries from an antenna table external to the transmit management interface.

As used herein, the term transmit antenna is intended broadly to refer to the physical antenna that is used, at any given point in time, to send a transmit packet. For example, consider a transmission device having two physical antennas, A and B. If the physical antenna A sends a first transmit packet to any destination transmission device, the physical antenna A is the transmit antenna. If, for example, following the send of the first transmit packet, the physical antenna B sends a second transmit packet to any destination transmission device, the physical antenna B has become the transmit antenna. If, for example, the physical antenna B sends a third transmit packet to any destination transmission device, the physical antenna B remains the transmit antenna. Any given physical antenna that sends any given transmit packet is, by definition, the transmit antenna at the time that the given transmit packet is sent.

As used herein, the term receive antenna is intended broadly to refer to the physical antenna that is used, at any given point in time, to listen for, or to receive, a receive packet. For example, consider a transmission device having two physical antennas, A and B. If the physical antenna A listens for receive packets from any source transmission device, the physical antenna A is the receive antenna. If the physical antenna A receives a first receive packet from any source transmission device, the physical antenna A is the receive antenna. If, for example, following the receipt of the first receive packet, the physical antenna B listens for receive packets from any source transmission device or receives a second receive packet from any source transmission device, the physical antenna B has become the receive antenna. If, for example, the physical antenna B receives a third receive packet from any source transmission device or continues to listen for receive packets from any source transmission device, the physical antenna B remains the receive antenna. Any given physical antenna that receives any given receive packet is, by definition, the receive antenna at the time that the given receive packet is received.

As used herein, the term transmit packet is intended broadly to refer to a packet sent from a transmission device to one or more destination transmission devices. As used herein, the term receive packet is intended broadly to a packet received at a transmission device from a source transmission device. A given packet is a transmit packet from the perspective of the transmission device sending the packet. The same packet is a receive packet from the perspective of the transmission device that listens for, or receives, the packet.

As used herein, the term antenna is intended broadly to refer to an antenna system capable of both transmitting and receiving electrical signals, for example, in the form of packetized data, using a physical antenna. This antenna system could of course include only one physical antenna although in the broadest sense the antenna system may include a transceiver unit coupled to a physical antenna.

As used herein, the term transceiver is intended broadly to refer to any communication system that is capable of both transmitting and receiving data in the form of electrical signals, for example, packetized data. The transceiver could of course include, for example, only one physical antenna. In the broadest sense the transceiver may include RF and baseband units to convert raw data to and from electrical signals.

The antenna diversity systems and methods described herein according to the presently preferred embodiments provide, at a reasonable level of complexity and cost, comparable diversity gain to traditional diversity techniques used in, for example, traditional narrowband signal environments. Of course, although the antenna diversity systems and methods described herein according to the presently preferred embodiments are particularly well-suited for IEEE 802.11a compliant environments, the systems and methods may be applied to manage antennas and other wireless transceivers operating at a wide variety of frequencies and in a wide range of environments.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method of providing antenna diversity in a communications system that contains a transmission device that sends and receives a plurality of transmit and receive packets, respectively, at a single location, the transmission device including at least two antennas, the method comprising:

designating one antenna of the at least two antennas as a default antenna, wherein an antenna of the at least two antennas other than the antenna that is designated as the default antenna is an alternate antenna;

sending each transmit packet a first time using the default antenna as a transmit antenna, wherein for any transmit packet, the transmit antenna is whichever antenna of the at least two antennas is used to send the transmit packet;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna after every other unsuccessful resend of the transmit unicast packet.

2. A method of providing antenna diversity in a communications system that contains a transmission device that sends and receives a plurality of transmit and receive packets, respectively, at a single location, the transmission device including at least two antennas, the method comprising:

designating one antenna of the at least two antennas as a default antenna, wherein an antenna of the at least two antennas other than the antenna that is designated as the default antenna is an alternate antenna;

sending each transmit packet a first time using the default antenna as a transmit antenna, wherein for any transmit packet, the transmit antenna is whichever antenna of the at least two antennas is used to send the transmit packet;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna from the default antenna to the alternate antenna after a number of unsuccessful sends of the transmit unicast packet wherein the number is adjusted prior to sending the transmit unicast packet a first time based on an expected collision rate in the communications system.

3. A method of providing antenna diversity in a communications system that contains a transmission device that sends and receives a plurality of transmit and receive packets, respectively, at a single location, the transmission device including at least two antennas, the method comprising:

designating one antenna of the at least two antennas as a default antenna, wherein an antenna of the at least two antennas other than the antenna that is designated as the default antenna is an alternate antenna;

sending each transmit packet a first time using the default antenna as a transmit antenna, wherein for any transmit packet, the transmit antenna is whichever antenna of the at least two antennas is used to send the transmit packet;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the default antenna as the receive antenna;

for any transmit unicast packet sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna from the default antenna to the alternate antenna after a number of unsuccessful sends of the transmit unicast packet, wherein the number is adjusted prior to sending the transmit unicast packet a first time based on an expected overall load rate of the communications system.

4. A method of providing antenna diversity in a communications system that contains a transmission device that sends and receives a plurality of transmit and receive packets, respectively, at a single location, the transmission device including at least two antennas, the method comprising:

designating one antenna of the at least two antennas as a default antenna, wherein an antenna of the at least two antennas other than the antenna that is designated as the default antenna is an alternate antenna;

sending each transmit packet a first time using the default antenna as a transmit antenna, wherein for any transmit packet the transmit antenna is whichever antenna of the at least two antennas is used to send the transmit packet;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna on every other send of the transmit unicast packet until an overall number of sends of the transmit unicast packet is reached or until a receive packet that acknowledges the transmit unicast packet is received.

5. A method of providing antenna diversity in a communications system that contains a transmission device that sends and receives a plurality of transmit and receive packets, respectively, at a single location, the transmission device including at least two antennas, the method comprising:

designating one antenna of the at least two antennas as a default antenna, wherein an antenna of the at least two antennas other than the antenna that is designated as the default antenna is an alternate antenna;

sending each transmit packet a first time using the default antenna as a transmit antenna, wherein for any transmit packet, the transmit antenna is whichever antenna of the at least two antennas is used to send the transmit packet;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets; and for any transmit unicast packet, attempting to send the transmit unicast packet twice on each antenna of the at least two antennas, beginning with the default antenna, until an overall number of sends of the transmit unicast packet is reached or until a receive packet that acknowledges the transmit unicast packet is received.

6. The method of claim 5 further comprising:

if no receive packets that acknowledge the transmit unicast packet are received in response to the sends of the transmit unicast packet, then
aborting transmission of the transmit unicast packet.

7. The method of claim 5 further comprising:

if no receive packets that acknowledge the transmit unicast packet are received in response to the sends of the transmit unicast packet, then
aborting transmission of the transmit unicast packet;
attempting to send the transmit unicast packet at a lower data rate; and
maintaining the present default antenna designation.

8. The method of claim 5 further comprising:

if any receive packet that acknowledges the transmit unicast packet is received in response to a send of the transmit unicast packet, then
if the receive packet that acknowledges the transmit unicast packet is received by the default antenna, then
maintaining the present default antenna designation; and otherwise, then
changing which antenna of the at least two antennas is designated as the default antenna to whichever antenna of the at least two antennas received the receive packet that acknowledges the transmit unicast packet.

9. The method of claim 5 further comprising:
if any receive packet that acknowledges the transmit unicast packet is received in response to a send of the transmit unicast packet, then
maintaining the present default antenna designation.

10. A method of providing antenna diversity in a communications system that contains an access point that sends and receives a plurality of transmit and receive packets, respectively, at a single location, the access point configured to communicate with a plurality of mobile stations via the transmit and receive packets, the access point including at least two antennas, the method comprising:
designating one antenna of the at least two antennas as a default antenna, wherein an antenna at the at least two antennas other than the antenna that is designated as the default antenna is an alternate antenna;
sending each transmit unicast packet a first time using the default antenna as a transmit antenna, wherein for any transmit packet, the transmit antenna is whichever antenna of the at least two antennas is used to send the transmit packet;
sending each transmit broadcast packet using the default antenna as the transmit antenna, wherein sending each transmit broadcast packet using the default antenna as the transmit antenna allows a first mobile station at another location, the first mobile station having at least two mobile station antennas, to learn which mobile station antenna of the at least two mobile station antennas receives transmit broadcast packets effectively from the access point;
listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;
listening for all other receive packets using the default antenna as the receive antenna;
for any transmit unicast packet, sending the transmit unicast packet on the alternate antenna if the transmit unicast packet is not successfully transmitted by the default antenna after one or more attempts; and
changing which antenna of the at least two antennas is the default antenna in response to predetermined criteria that take into account the success of the transmit antenna in transmission of transmit packets and the success of the receive antenna in reception of receive packets.

11. A method of providing antenna diversity in a communications system that contains an access point that sends and receives a plurality of transmit and receive packets, respectively, at a single location, the access point configured to communicate with a plurality of mobile stations via the transmit and receive packets, the access point including at least two antennas, the method comprising:
designating one antenna of the at least two antennas as a default antenna, wherein an antenna of the at least two antennas other than the antenna that is designated as the default antenna is an alternate antenna;
sending each transmit unicast packet a first time using the default antenna as a transmit antenna, wherein for any transmit packet, the transmit antenna is whichever antenna of the at least two antennas is used to send the transmit packet;
sending each transmit broadcast packet using the default antenna as the transmit antenna;
listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;
listening for all other receive packets using the default antenna as the receive antenna;
for any transmit unicast packet, sending the transmit unicast packet on the alternate antenna if the transmit unicast packet is not successfully transmitted by the default antenna after one or more attempts;
changing which antenna of the at least two antennas is the default antenna in response to predetermined criteria that take into account the success of the transmit antenna in transmission of transmit packets and the success of the receive antenna in reception of receive packets;
changing the transmit antenna by switching between the at least two antennas; and
for any transmit unicast packet, changing the transmit antenna on every other send of the transmit unicast packet until an overall number of sends of the transmit unicast packet is reached or until a receive packet that acknowledges the transmit unicast packet is received.

12. A method of providing antenna diversity in a communications system that contains an access point that sends and receives a plurality of transmit and receive packets, respectively, at a single location, the access point configured to communicate with a plurality of mobile stations via the transmit and receive packets, the access point including at least two antennas, the method comprising:
designating one antenna of the at least two antennas as a default antenna, wherein an antenna of the at least two antennas other than the antenna that is designated as the default antenna is an alternate antenna;
sending each transmit unicast packet a first time using the default antenna as a transmit antenna, wherein for any transmit packet, the transmit antenna is whichever antenna of the at least two antennas is used to send the transmit packet;
sending each transmit broadcast packet using the default antenna as the transmit antenna;
listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;
listening for all other receive packets using the default antenna as the receive antenna;
for any transmit unicast packet, sending the transmit unicast packet on the alternate antenna if the transmit unicast packet is not successfully transmitted by the default antenna after one or more attempts;
changing which antenna of the at least two antennas is the default antenna in response to predetermined criteria that take into account the success of the transmit antenna in transmission of transmit packets and the success of the receive antenna in reception of receive packets; and for any transmit unicast packet, attempting to send the transmit unicast packet twice on each antenna of the at least two antennas, beginning with the default antenna, until an overall number of sends of the transmit unicast packet is reached or until a receive packet that acknowledges the transmit unicast packet is received.

13. The method of claim 12 further comprising:

if no receive packets that acknowledge the transmit unicast packet are received in response to the sends of the transmit unicast packet, then
aborting transmission of the transmit unicast packet.

14. The method of claim 12 further comprising:

if no receive packets that acknowledge the transmit unicast packet are received in response to the sends of the transmit unicast packet, then
aborting transmission of the transmit unicast packet;
attempting to send the transmit unicast packet at a lower data rate; and
maintaining the present default antenna designation.

15. The method of claim 12 further comprising:

if any receive packet that acknowledges the transmit unicast packet is received in response to a send of the transmit unicast packet, then
maintaining the present default antenna designation.

16. A method of providing antenna diversity in a communications system that contains a mobile station that sends and receives a plurality of transmit and receive packets, respectively, at a single location, the mobile station configured to communicate with an access point via the transmit and receive packets, the mobile station including at least two antennas, the method comprising:

designating one antenna of the at least two antennas as a default antenna, wherein an antenna of the at least two antennas other than the antenna that is designated as the default antenna is an alternate antenna;

sending each transmit unicast packet a first time using the default antenna as a transmit antenna, wherein for any transmit packet, the transmit antenna is whichever antenna of the at least two antennas is used to send the transmit packet to the access point;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet from the access point;

listening for all other receive packets, using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna after every other unsuccessful resend of the transmit unicast packet.

17. A method of providing antenna diversity in a communications system that contains a mobile station that sends and receives a plurality of transmit and receive packets, respectively, at a single location, the mobile station configured to communicate with an access point via the transmit and receive packets, the mobile station including at least two antennas, the method comprising:

designating one antenna of the at least two antennas as a default antenna, wherein an antenna of the at least two antennas other than the antenna that is designated as the default antenna is an alternate antenna;

sending each transmit unicast packet a first time using the default antenna as a transmit antenna, wherein for any transmit packet, the transmit antenna is whichever antenna of the at least two antennas is used to send the transmit packet to the access point;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet from the access point;

listening for all other receive packets, using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets, wherein the receive packets include receive broadcast packets that respectively comprise receive beacon packets; and changing which of the at least two antennas is designated as the default antenna if two consecutive receive beacon packets have been missed based on the expected time of arrival of the receive beacon packets from the access point.

18. A method of providing antenna diversity in a communications system that contains a mobile station that sends and receives a plurality of transmit and receive packets, respectively, at a single location, the mobile station configured to communicate with an access point via the transmit and receive packets, the mobile station including at least two antennas, the method comprising:

designating one antenna of the at least two antennas as a default antenna, wherein an antenna of the at least two antennas other than the antenna that is designated as the default antenna is an alternate antenna;

sending each transmit unicast packet a first time using the default antenna as a transmit antenna, wherein for any transmit packet, the transmit antenna is whichever antenna of the at least two antennas is used to send the transmit packet to the access point;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet from the access point;

listening for all other receive packets, using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna on every other send of the transmit unicast packet until an overall number of sends of the transmit unicast packet is reached or until a receive packet that acknowledges the transmit unicast packet is received.

19. A method of providing antenna diversity in a communications system that contains a mobile station that sends and receives a plurality of transmit and receive packets, respectively, at a single location, the mobile station configured to communicate with an access point via the transmit and receive packets, the mobile station including at least two antennas, the method comprising:

designating one antenna of the at least two antennas as a default antenna, wherein an antenna of the at least two antennas other than the antenna that is designated as the default antenna is an alternate antenna;

sending each transmit unicast packet a first time using the default antenna as a transmit antenna, wherein for any transmit packet, the transmit antenna is whichever antenna of the at least two antennas is used to send the transmit packet to the access point;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet from the access point;

listening for all other receive packets, using the default antenna as the receive antenna;

for any transmit unicast packet, sending the transmit unicast packet on the alternate antenna if the transmit unicast packet is not successfully transmitted by the default antenna after one or more attempts;

changing which antenna of the at least two antennas is the default antenna in response to predetermined criteria that take into account the success of the transmit antenna in transmission of transmit packets and the success of the receive antenna in reception of receive packets; and for any transmit unicast packet, attempting to send the transmit unicast packet twice on each antenna of the at least two antennas, beginning with the default antenna, until an overall number of sends of the transmit unicast packet is reached or until a receive packet that acknowledges the transmit unicast packet is received.

20. The method of claim 19 further comprising:

if no receive packets that acknowledge the transmit unicast packet are received in response to the sends of the transmit unicast packet, then aborting transmission of the transmit unicast packet.

21. The method of claim 20 further comprising:

if no receive packets that acknowledge the transmit unicast packet are received in response to the sends of the transmit unicast packet, then aborting transmission of the transmit unicast packet;

attempting to send the transmit unicast packet at a lower data rate; and maintaining the present default antenna designation.

22. The method of claim 20 further comprising:

if any receive packet that acknowledges the transmit unicast packet is received in response to a send of the transmit unicast packet, then if the receive packet that acknowledges the transmit unicast packet is received by the default antenna, then maintaining the present default antenna designation; and otherwise, then changing which antenna of the at least two antennas is designated as the default antenna to whichever antenna of the at least two antennas received the receive packet that acknowledges the transmit unicast packet.

23. A method of providing antenna diversity in a communications system that contains a transmission device that sends and receives a plurality of transmit and receive packets, respectively, at a single location, the transmission device configured to communicate with a plurality of destination transmission devices via the transmit and receive packets, the transmission device including at least two antennas, the method comprising:

designating one antenna of the at least two antennas as a broadcast default antenna;

designating one antenna of the at least two antennas as a destination default antenna, wherein the destination default antenna and the broadcast default antenna are not necessarily the same antenna of the at least two antennas;

sending each transmit unicast packet a first time using the destination default antenna as a transmit antenna, wherein for any transmit packet, the transmit antenna is whichever antenna of the at least two antennas is used to send the transmit packet, wherein an antenna of the at least two antennas other than the antenna that is designated as the destination default antenna is a destination alternate antenna;

sending each transmit broadcast packet using the broadcast default antenna as the transmit antenna;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the broadcast default antenna as the receive antenna;

for any transmit unicast packet, sending the transmit unicast packet on the destination alternate antenna if the transmit unicast packet is not successfully transmitted by the destination default antenna after one or more attempts;

changing which antenna of the at least two antennas is the broadcast default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna after every other unsuccessful resend of the transmit unicast packet.

24. A method of providing antenna diversity in a communications system that contains a transmission device that sends and receives a plurality of transmit and receive packets, respectively, at a single location, the transmission device configured to communicate with a plurality of destination transmission devices via the transmit and receive packets, the transmission device including at least two antennas, the method comprising:

designating one antenna of the at least two antennas as a broadcast default antenna;

designating one antenna of the at least two antennas as a destination default antenna, wherein the destination default antenna and the broadcast default antenna are not necessarily the same antenna of the at least two antennas;

sending each transmit unicast packet a first time using the destination default antenna as a transmit antenna, wherein for any transmit packet, the transmit antenna is whichever antenna of the at least two antennas is used to send the transmit packet, wherein an antenna of the at least two antennas other than the antenna that is designated as the destination default antenna is a destination alternate antenna;

sending each transmit broadcast packet using the broadcast default antenna as the transmit antenna;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the broadcast default antenna as the receive antenna;

for any transmit unicast packet, sending the transmit unicast packet on the destination alternate antenna if the transmit unicast packet is not successfully transmitted by the destination default antenna after one or more attempts;

changing which antenna of the at least two antennas is the broadcast default antenna in response to predetermined criteria that take into account the success of the transmit antenna in transmission of transmit packets and the success of the receive antenna in reception of receive packets, wherein the receive packets include receive broadcast packets that respectively comprise receive beacon packets; and changing which of the at least two antennas is designated as the broadcast default antenna if two consecutive receive beacon packets have been missed based on the expected time of arrival of the receive beacon packets from the destination transmission devices.

25. A method of providing antenna diversity in a communications system that contains a transmission device that sends and receives a plurality of transmit and receive packets, respectively, at a single location, the transmission device configured to communicate with a plurality of destination transmission devices via the transmit and receive packets, the transmission device including at least two antennas, the method comprising:

designating one antenna of the at least two antennas as a broadcast default antenna;

designating one antenna of the at least two antennas as a destination default antenna, wherein the destination default antenna and the broadcast default antenna are not necessarily the same antenna of the at least two antennas;

sending each transmit unicast packet a first time using the destination default antenna as a transmit antenna, wherein for any transmit packet, the transmit antenna is whichever antenna of the at least two antennas is used to send the transmit packet, wherein an antenna of the at least two antennas other than the antenna that is designated as the destination default antenna is a destination alternate antenna;

sending each transmit broadcast packet using the broadcast default antenna as the transmit antenna, wherein sending each transmit broadcast packet using the broadcast default antenna as the transmit antenna allows a first destination transmission device at another location, the first destination transmission device having at least two destination antennas, to learn which destination antenna of the at least two destination receives transmit broadcast packets effectively from the transmission device;

listening for each receive packet that acknowledges a previously sent transmit packet using as a receive antenna the transmit antenna that was used to send the previously sent transmit packet, wherein for any receive packet, the receive antenna is whichever antenna of the at us to listen for the receive packet;

listening for all other receive packets using the broadcast default antenna as the receive antenna;

for any transmit unicast packet, sending the transmit unicast packet on the destination alternate antenna if the transmit unicast packet is not successfully transmitted by the destination default antenna after one or more attempts; and changing which antenna of the at least two antennas is the broadcast default antenna in response to predetermined criteria that take into account the success of the transmit antenna in transmission of transmit packets and the success of the receive antenna in reception of receive packets.

26. A method of providing antenna diversity in a communications system that contains a transmission device that sends and receives a plurality of transmit and receive packets, respectively, at a single location, the transmission device configured to communicate with a plurality of destination transmission devices via the transmit and receive packets, the transmission device including at least two antennas, the method comprising:

designating one antenna of the at least two antennas as a broadcast default antenna;

designating one antenna of the at least two antennas as a destination default antenna, wherein the destination default antenna and the broadcast default antenna are not necessarily the same antenna of the at least two antennas;

sending each transmit unicast packet a first time using the destination default antenna as a transmit antenna, wherein for any transmit packet, the transmit antenna is whichever antenna of the at least two antennas is used to send the transmit packet, wherein an antenna of the at least two antennas other than the antenna that is designated as the destination default antenna is a destination alternate antenna;

sending each transmit broadcast packet using the broadcast default antenna as the transmit antenna;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the broadcast default antenna as the receive antenna;

for any transmit unicast packet, sending the transmit unicast packet on the destination alternate antenna if the transmit unicast packet is not successfully transmitted by the destination default antenna after one or more attempts;

changing which antenna of the at least two antennas is the broadcast default antenna in response to predetermined criteria that take into account the success of the transmit antenna in transmission of transmit packets and the success of the receive antenna in reception of receive packets;

changing the transmit antenna by switching between the at least two antennas; and for any transmit unicast packet, changing the transmit antenna on every other send of the transmit unicast packet until an overall number of sends of the transmit unicast packet is reached or until a receive packet that acknowledges the transmit unicast packet is received.

27. A method of providing antenna diversity in a communications system that contains a transmission device that sends and receives a plurality of transmit and receive packets, respectively, at a single location, the transmission device configured to communicate with a plurality of destination transmission devices via the transmit and receive packets, the transmission device including at least two antennas, the method comprising:

designating one antenna of the at least two antennas as a broadcast default antenna;

designating one antenna of the at least two antennas as a destination default antenna, wherein the destination default antenna and the broadcast default antenna are not necessarily the same antenna of the at least two antennas;

sending each transmit unicast packet a first time using the destination default antenna as a transmit antenna, wherein for any transmit packet, the transmit antenna is whichever antenna of the at least two antennas is used to send the transmit packet, wherein an antenna of the at least two antennas other than the antenna that is designated as the destination default antenna is a destination alternate antenna;

sending each transmit broadcast packet using the broadcast default antenna as the transmit antenna;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the broadcast default antenna as the receive antenna;

for any transmit unicast packet, sending the transmit unicast packet on the destination alternate antenna if the transmit unicast packet is not successfully transmitted by the destination default antenna after one or more attempts;

changing which antenna of the at least two antennas is the broadcast default antenna in response to predetermined criteria that take into account the success of the transmit antenna in transmission of transmit packets and the success of the receive antenna in reception of receive packets; and for any transmit unicast packet to be sent to one destination transmission device of the destination transmission devices, attempting to send the transmit unicast packet twice on each antenna of the at least two antennas, beginning with the destination default antenna, until an overall number of sends of the transmit unicast packet is reached or until a receive packet that acknowledges the transmit unicast packet is received.

28. The method of claim 27 further comprising:
if no receive packets that acknowledge the transmit unicast packet are received in response to the sends of the transmit unicast packet, then
aborting transmission of the transmit unicast packet.

29. The method of claim 27 further comprising:
if any receive packet that acknowledges the transmit unicast packet is received in response to a send of the transmit unicast packet, then
using whichever antenna of the at least two antennas received the receive packet that acknowledges the transmit unicast packet as the destination default antenna the first time that any subsequent transmit unicast packet is sent to the one destination transmission device.

30. A method of providing antenna diversity in a communications system that contains a transmission device that sends and receives a plurality of transmit and receive packets, respectively, at a single location, the transmission device configured to communicate with a plurality of destination transmission devices via the transmit and receive packets, the transmission device including at least two antennas, the method comprising:

designating one antenna of the at least two antennas as a broadcast default antenna;

designating one antenna of the at least two antennas as a destination default antenna, wherein the destination default antenna and the broadcast default antenna are not necessarily the same antenna of the at least two antennas;

sending each transmit unicast packet a first time using the destination default antenna as a transmit antenna, wherein for any transmit packet, the transmit antenna is whichever antenna of the at least two antennas is used to send the transmit packet, wherein an antenna of the at least two antennas other than the antenna that is designated as the destination default antenna is a destination alternate antenna;

sending each transmit broadcast packet using the broadcast default antenna as the transmit antenna;

listening for each receive packet that acknowledges a previously sent transmit packet using as a receive antenna the transmit antenna that was used to send the previously sent transmit packet, wherein for any receive packet, the receive antenna is whichever antenna of the at least two antennas is used to listen for the receive packet;

listening for all other receive packets using the broadcast default antenna as the receive antenna;

for any transmit unicast packet, sending the transmit unicast packet on the destination alternate antenna if the transmit unicast packet is not successfully transmitted by the destination default antenna after one or more attempts;

changing which antenna of the at least two antennas is the broadcast default antenna in response to predetermined criteria that take into account the success of the transmit antenna in transmission of transmit packets and the success of the receive antenna in reception of receive packets; and for any destination transmission device of the destination transmission devices, identifying a corresponding individual antenna of the at least two antennas that is empirically known to communicate successfully with the destination transmission device.

31. The method of claim 30 further comprising:

changing which of the at least two antennas is designated as the destination default antenna based on the individual antenna and the destination transmission device.

32. The method of claim 30 further comprising:

for all individual antennas and destination transmission devices, creating an antenna table of the individual antennas and consulting the table to change which of the at least two antennas is designated as the destination default antenna for each respective destination transmission device.

33. The method of claim 30 further comprising:

for all individual antennas and destination transmission devices, creating an antenna table of the individual antennas and consulting the table to change the transmit antenna for each respective destination transmission device.

* * * * *